March 26, 1963  G. J. H. SAUSELE  3,082,670
TYPESETTING SYSTEM AND APPARATUS
Filed Sept. 25, 1957  22 Sheets-Sheet 1
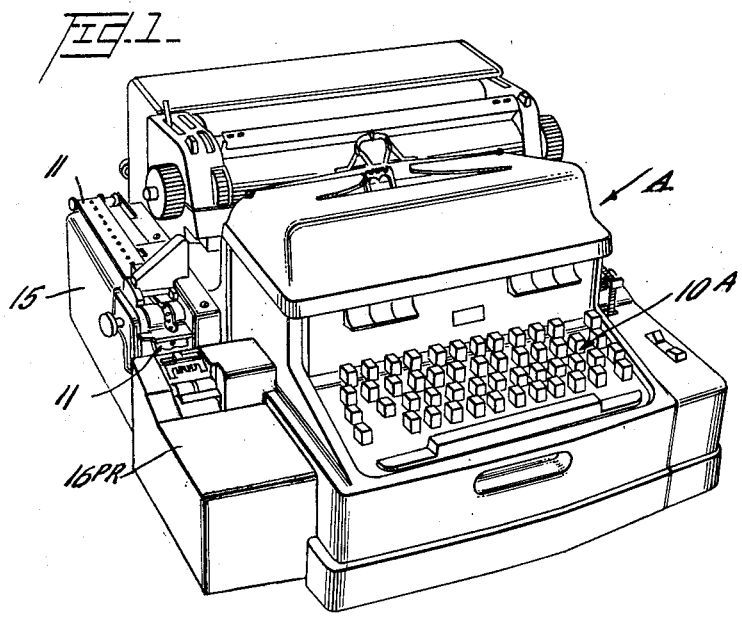
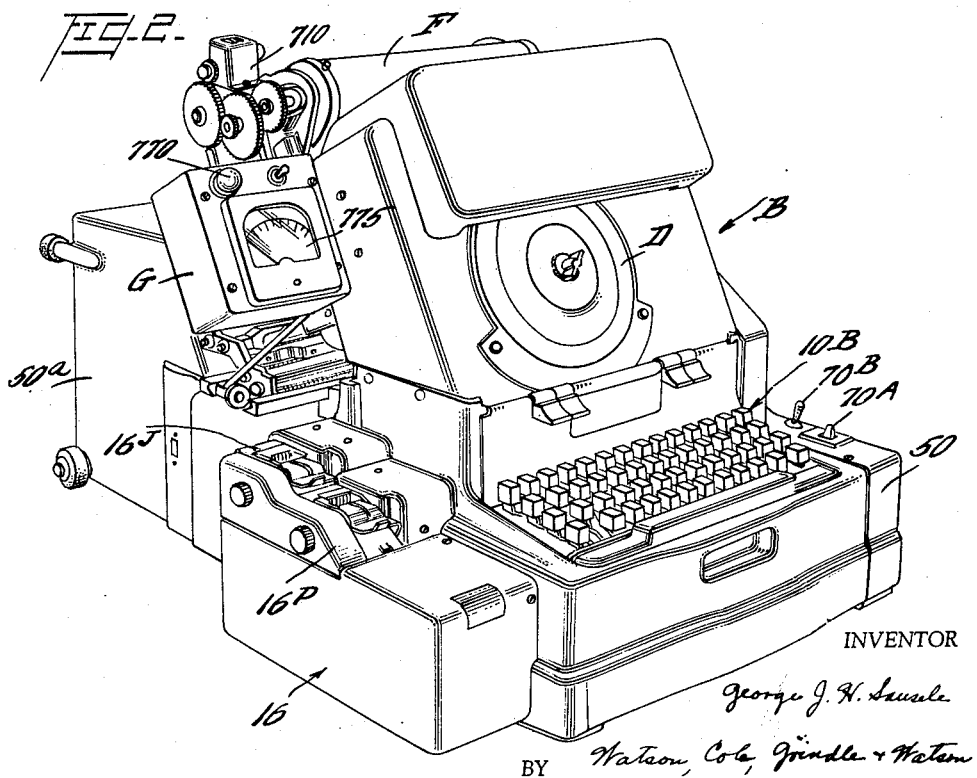
INVENTOR
George J. H. Sausele
BY Watson, Cole, Grindle & Watson
ATTORNEYS

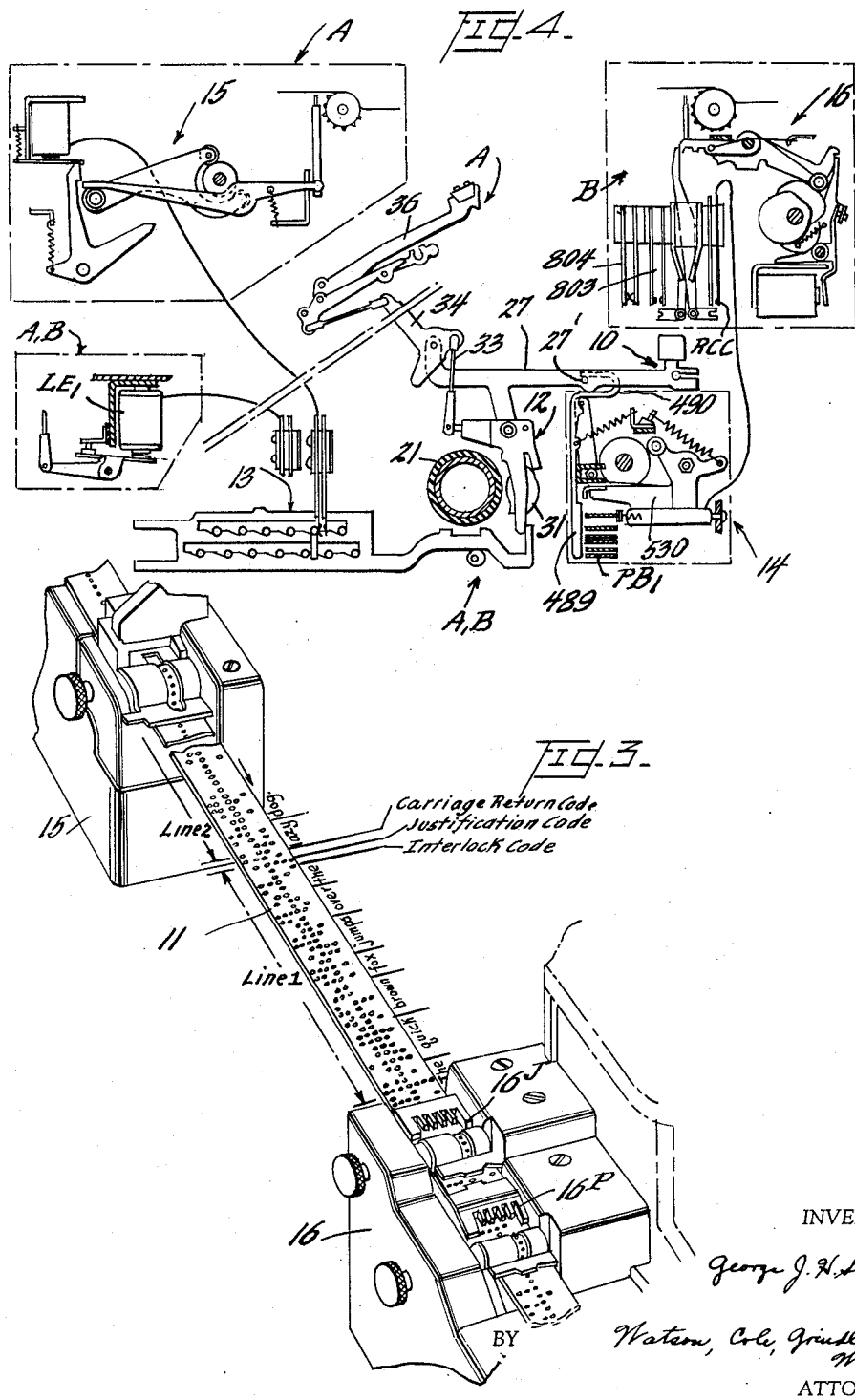

March 26, 1963  G. J. H. SAUSELE  3,082,670
TYPESETTING SYSTEM AND APPARATUS
Filed Sept. 25, 1957  22 Sheets-Sheet 3

INVENTOR
George J. H. Sausele

BY Watson, Cole, Grindle & Watson
ATTORNEYS

March 26, 1963 G. J. H. SAUSELE 3,082,670
TYPESETTING SYSTEM AND APPARATUS
Filed Sept. 25, 1957 22 Sheets-Sheet 4
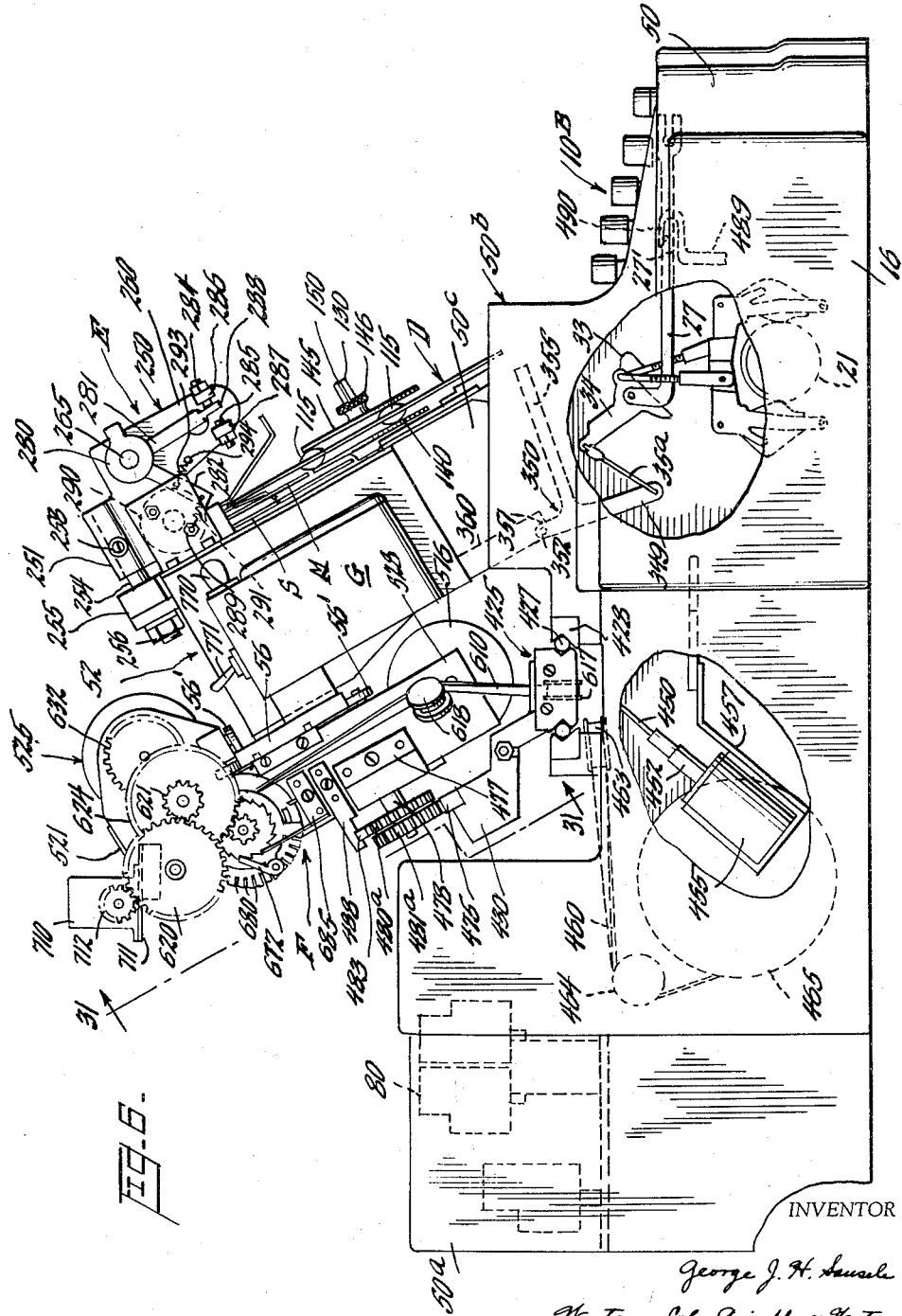
INVENTOR
George J. H. Sausele
BY Watson, Cole, Grindle & Watson
ATTORNEYS March 26, 1963   G. J. H. SAUSELE   3,082,670
TYPESETTING SYSTEM AND APPARATUS
Filed Sept. 25, 1957   22 Sheets-Sheet 5
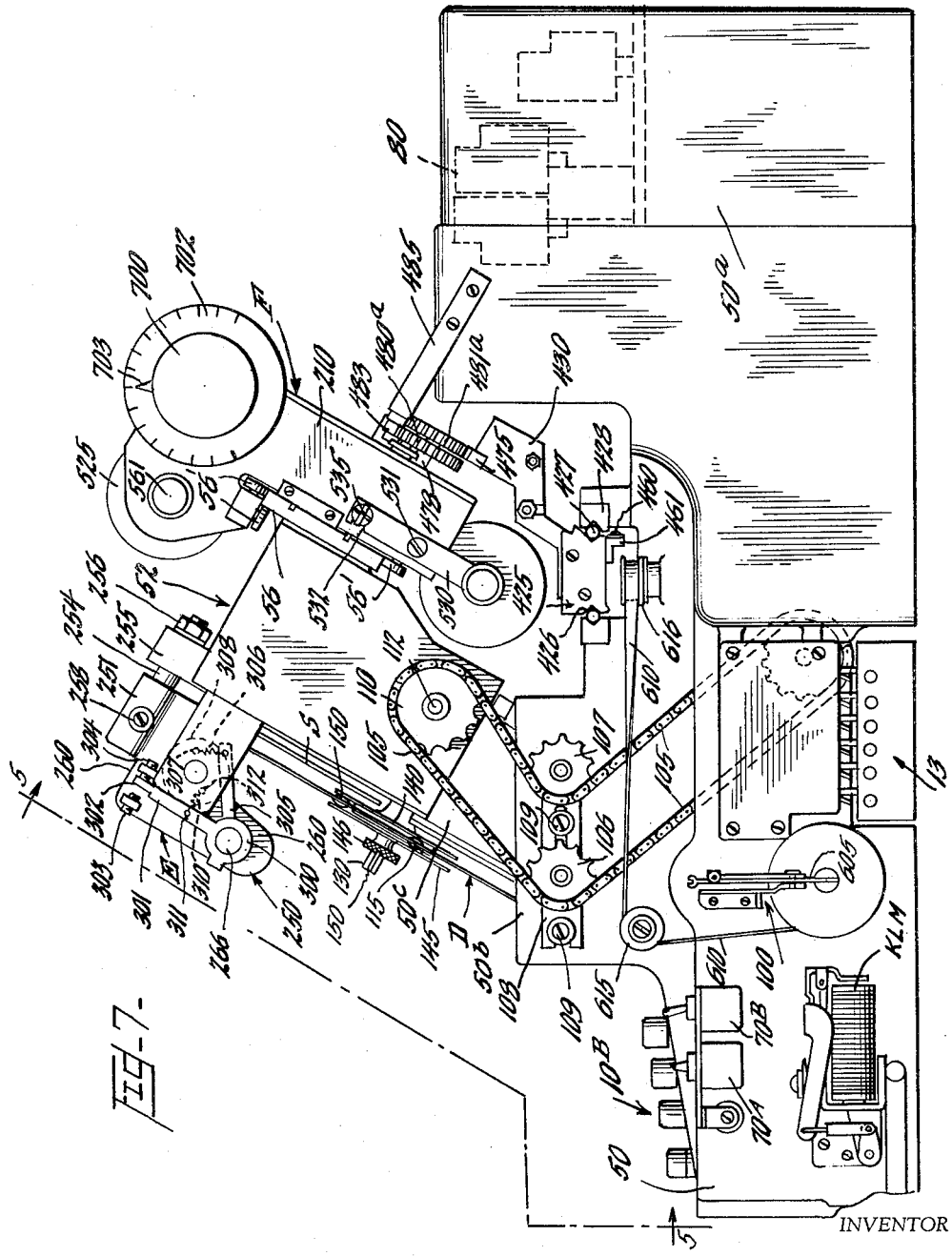
INVENTOR
George J. H. Sausele
BY Watson, Cole, Grindle & Watson
ATTORNEYS

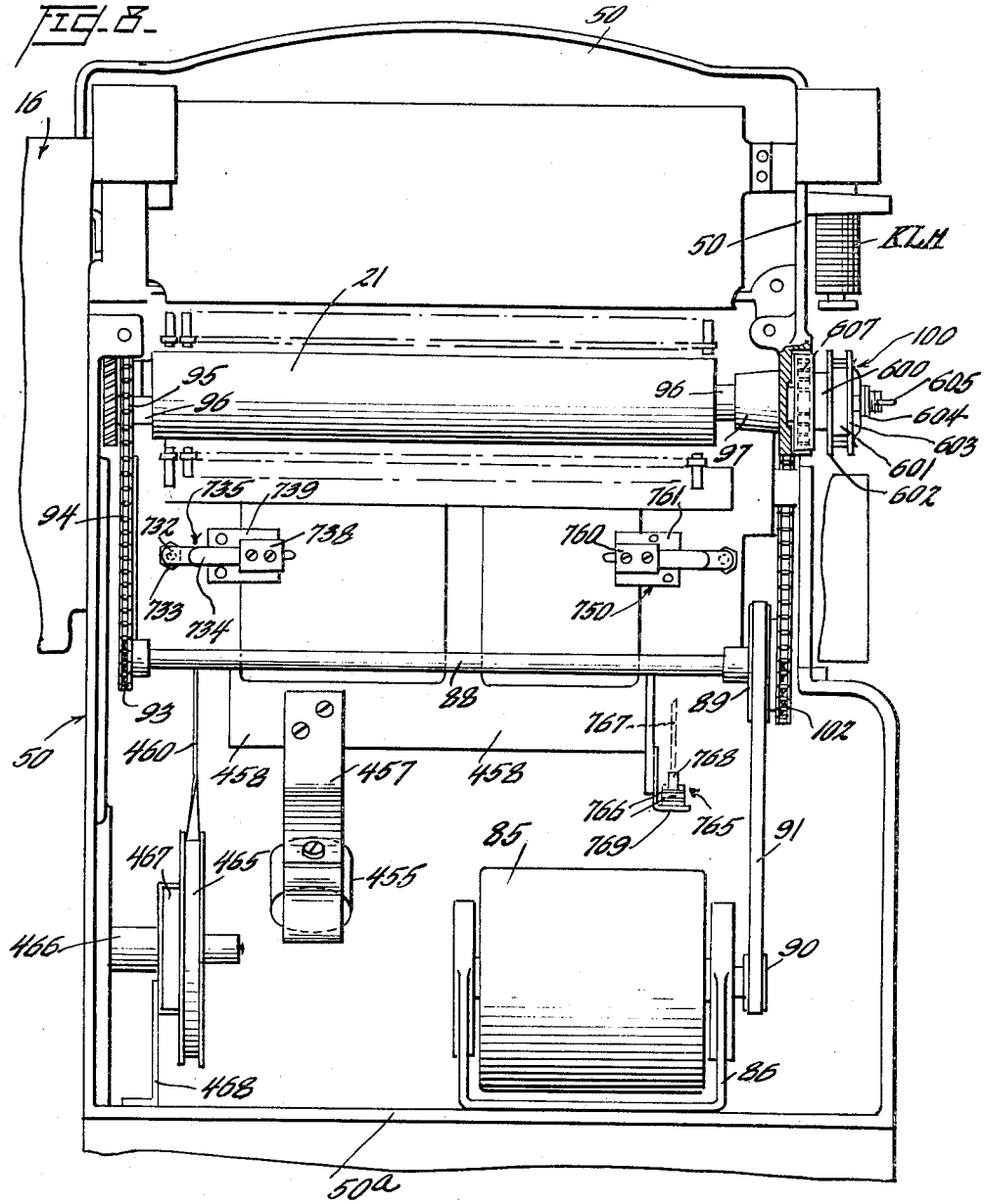

March 26, 1963 G. J. H. SAUSELE 3,082,670
TYPESETTING SYSTEM AND APPARATUS
Filed Sept. 25, 1957 22 Sheets-Sheet 7
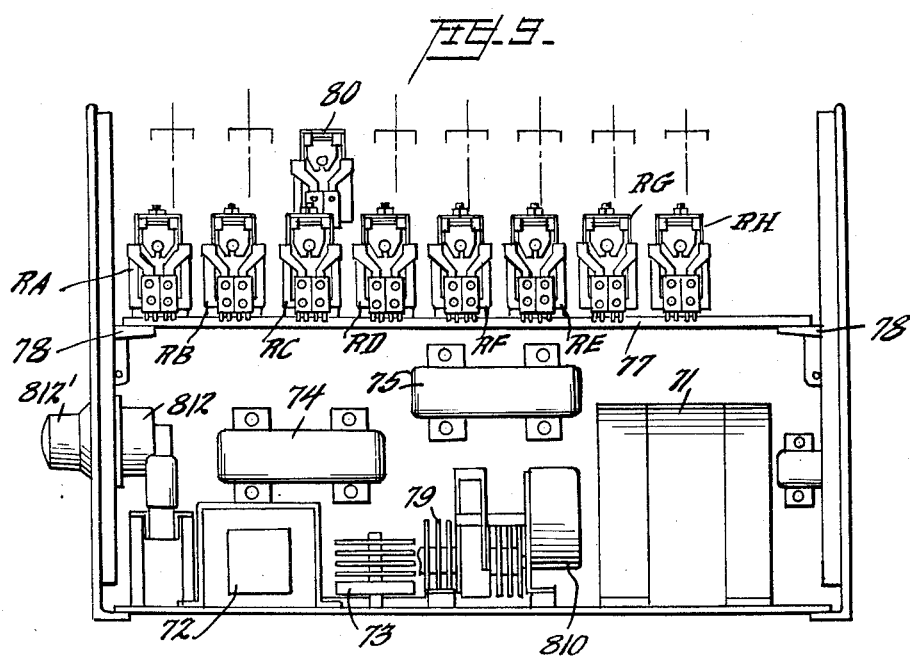
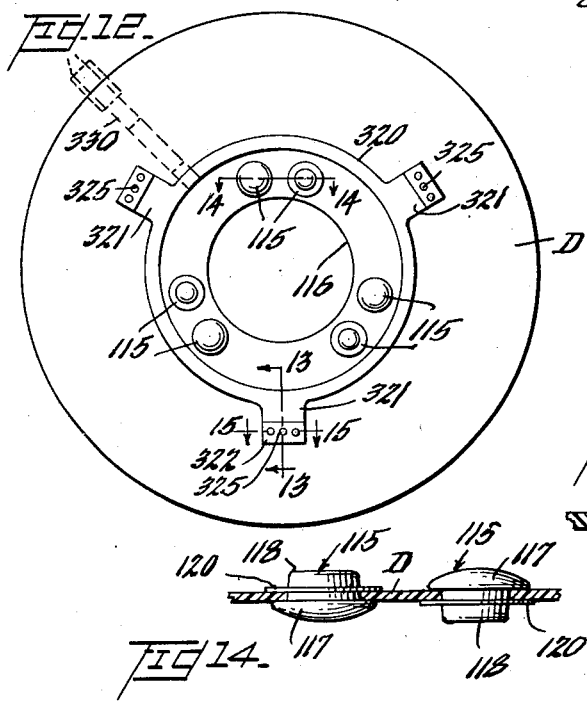
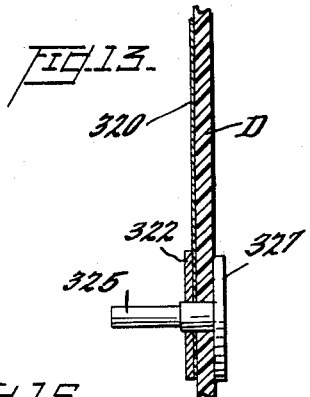
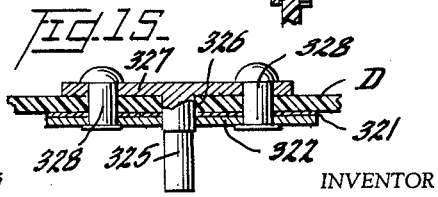
INVENTOR
George J. H. Sausele
BY Watson, Cole, Grindle & Watson
ATTORNEYS March 26, 1963 G. J. H. SAUSELE 3,082,670
TYPESETTING SYSTEM AND APPARATUS
Filed Sept. 25, 1957 22 Sheets-Sheet 8

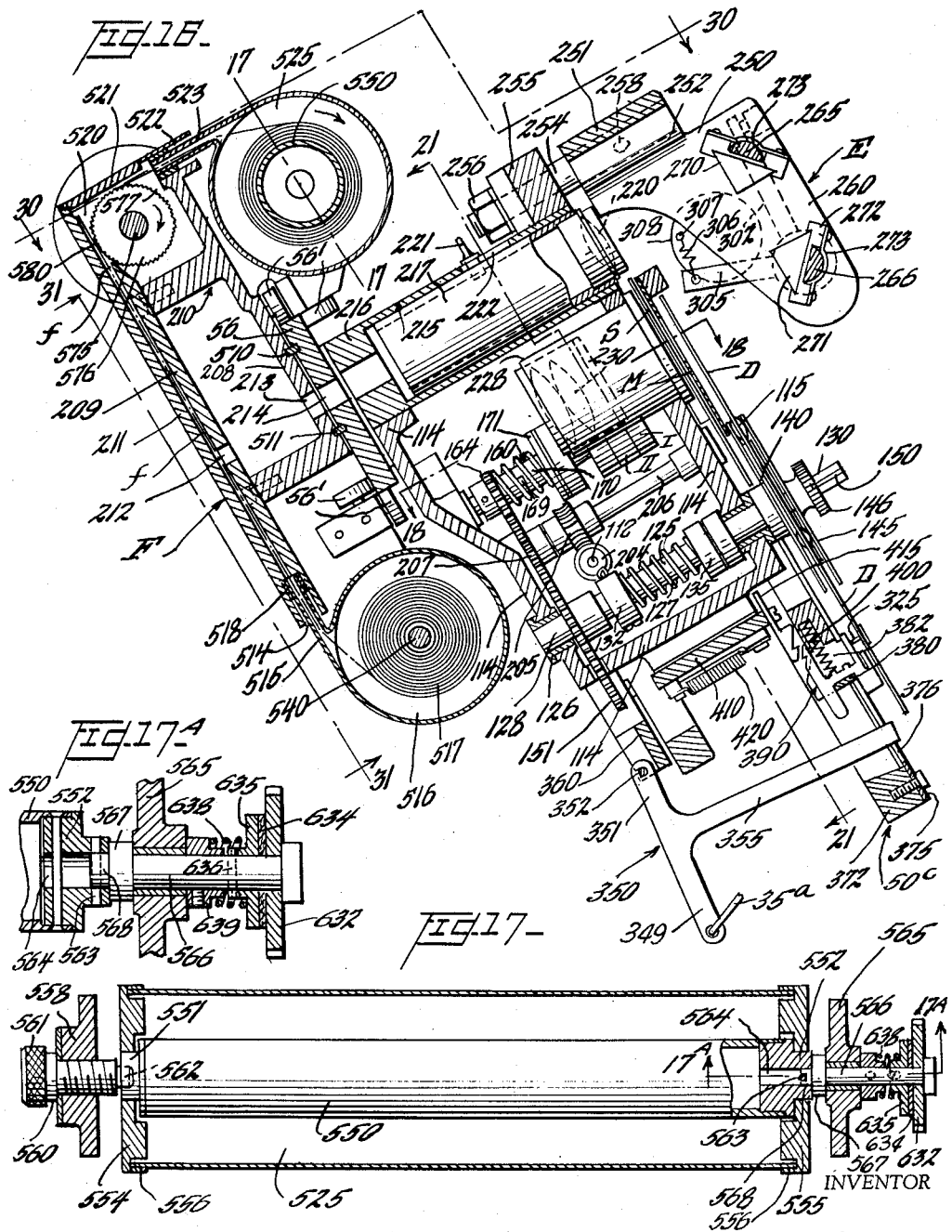

March 26, 1963 G. J. H. SAUSELE 3,082,670
TYPESETTING SYSTEM AND APPARATUS
Filed Sept. 25, 1957 22 Sheets-Sheet 10
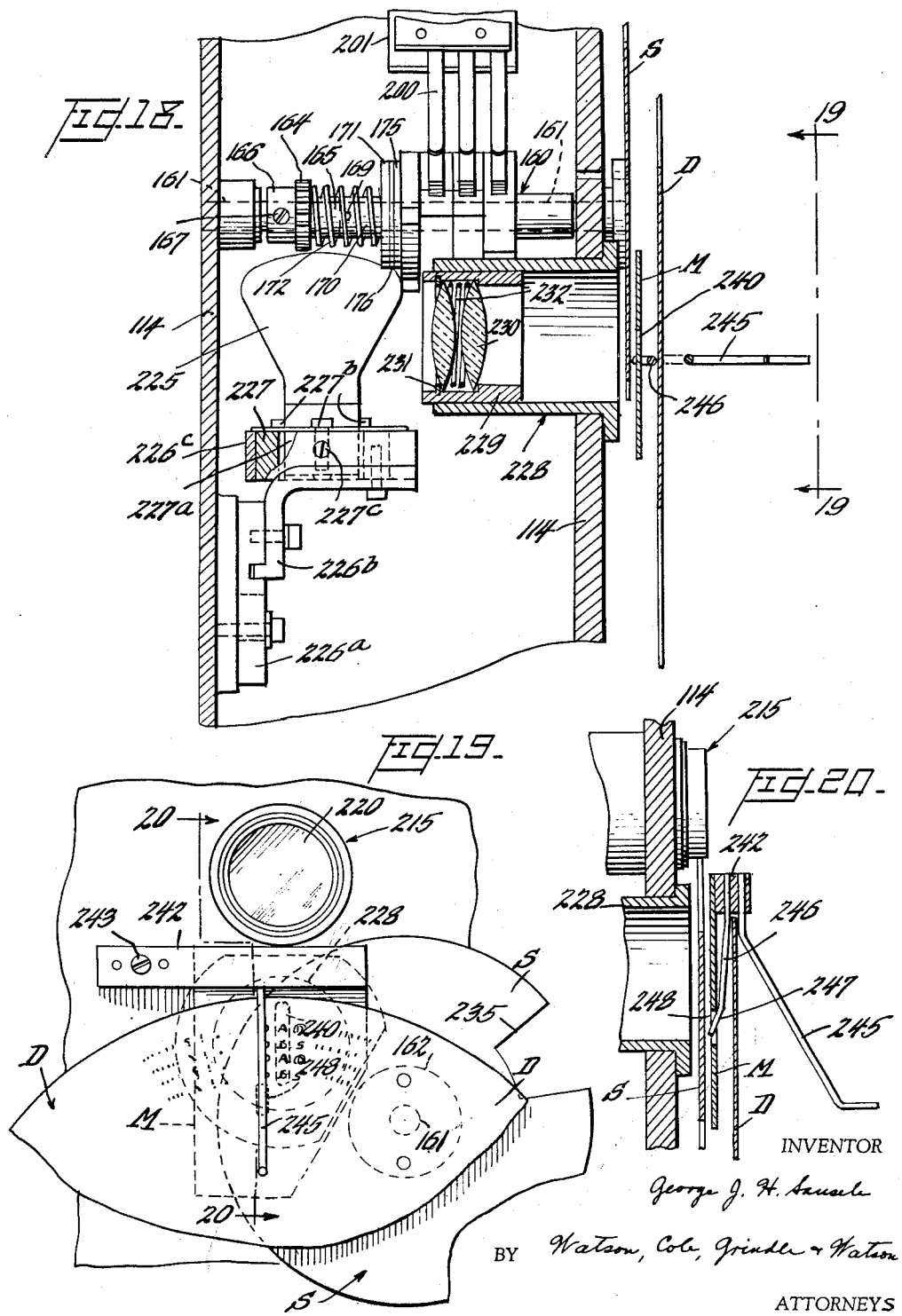
INVENTOR
George J. H. Sausele
BY Watson, Cole, Grindle & Watson
ATTORNEYS March 26, 1963 G. J. H. SAUSELE 3,082,670
TYPESETTING SYSTEM AND APPARATUS
Filed Sept. 25, 1957 22 Sheets-Sheet 11
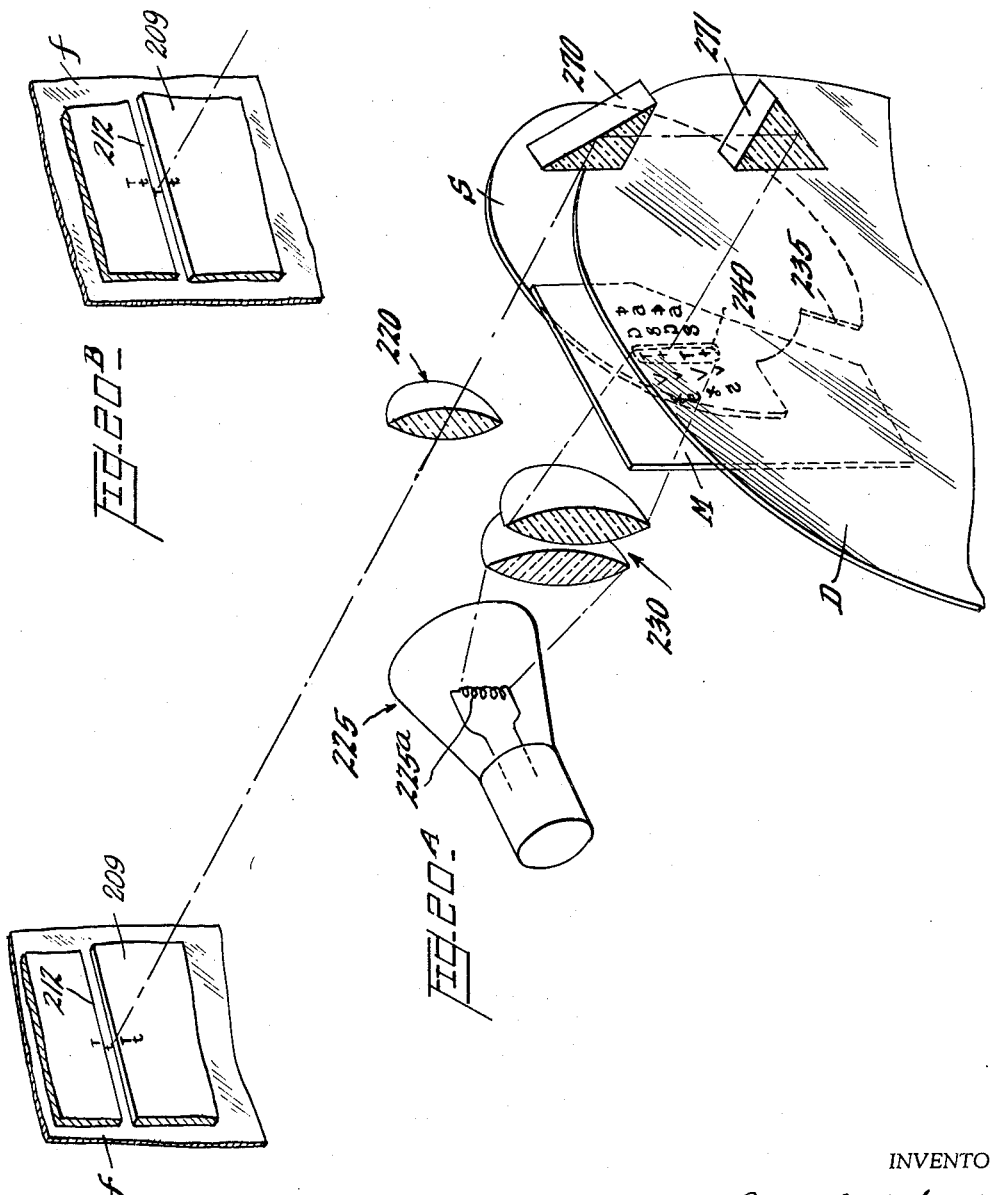
INVENTOR
George J. H. Sausele
BY Watson, Cole, Grindle & Watson
ATTORNEYS

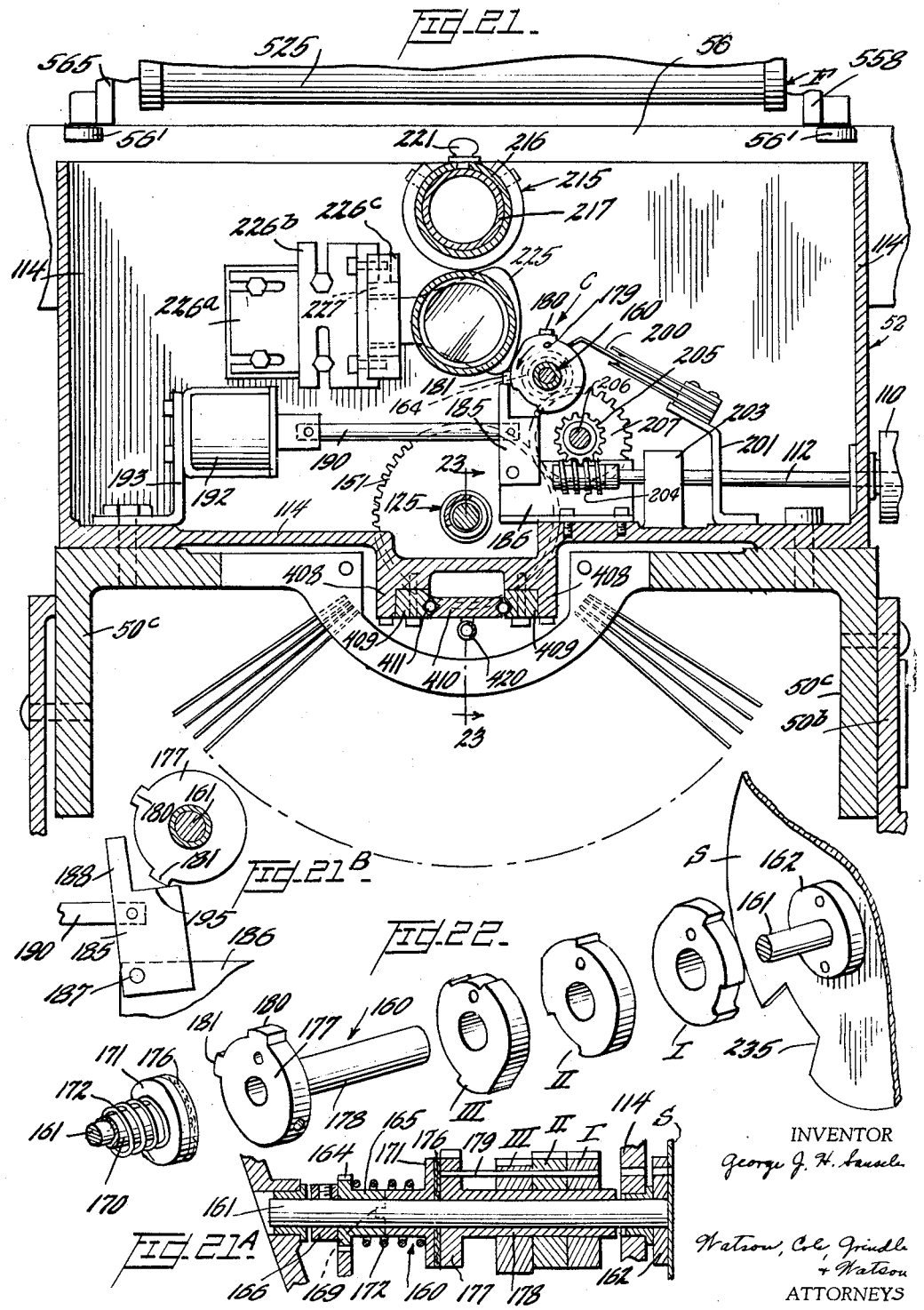

March 26, 1963 G. J. H. SAUSELE 3,082,670
TYPESETTING SYSTEM AND APPARATUS
Filed Sept. 25, 1957 22 Sheets-Sheet 13
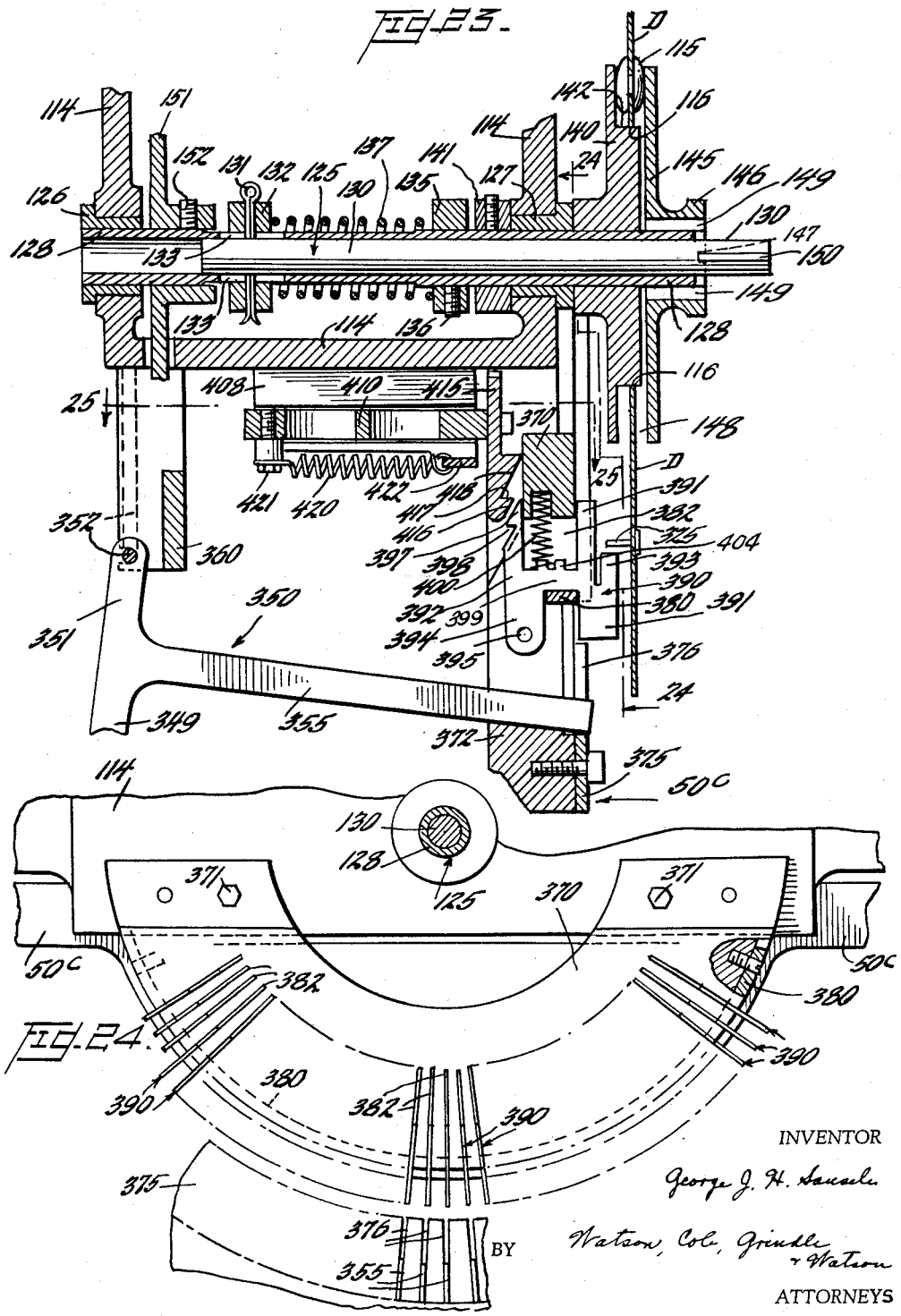
INVENTOR
George J. H. Sausele
BY Watson, Cole, Grindle & Watson
ATTORNEYS

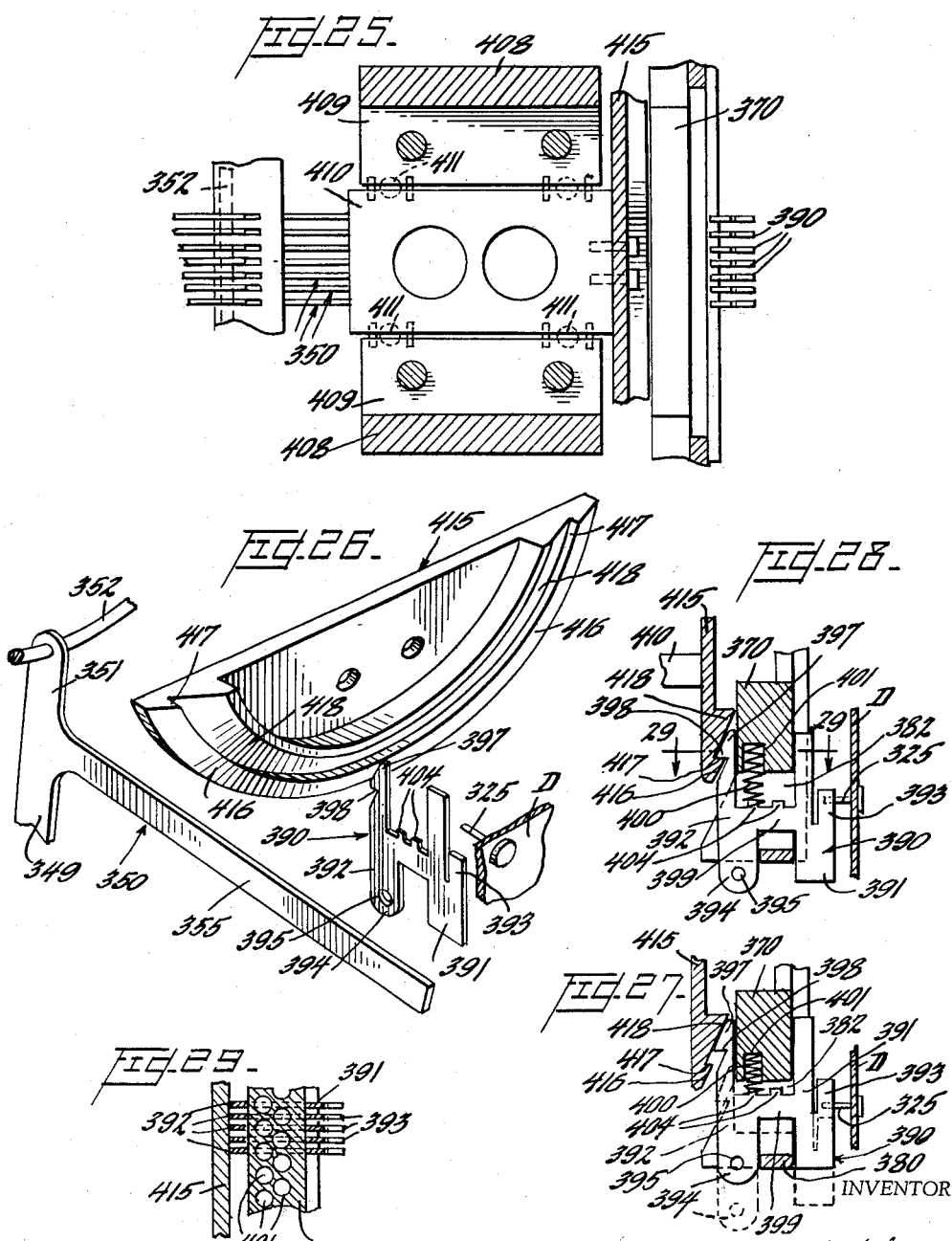

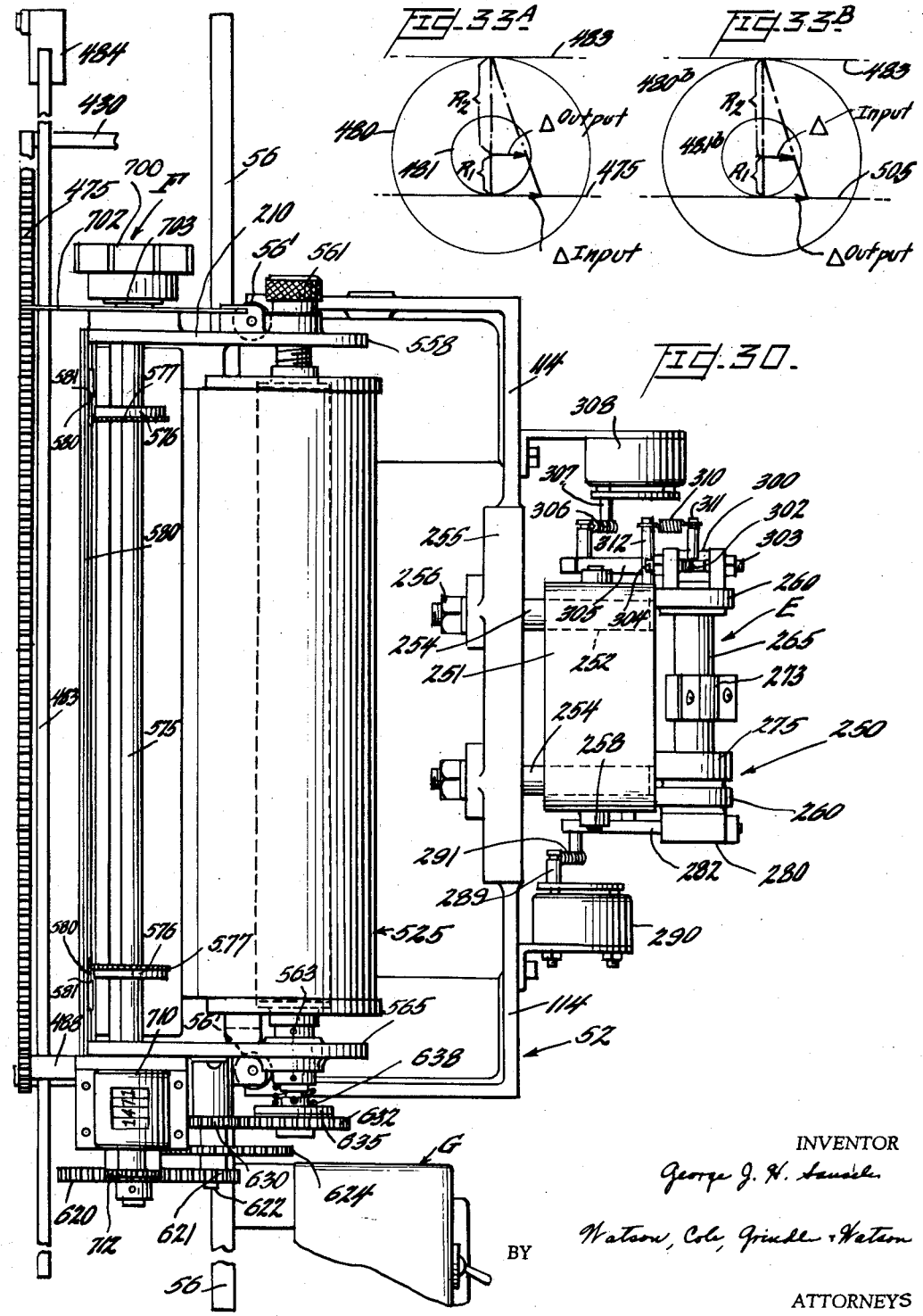

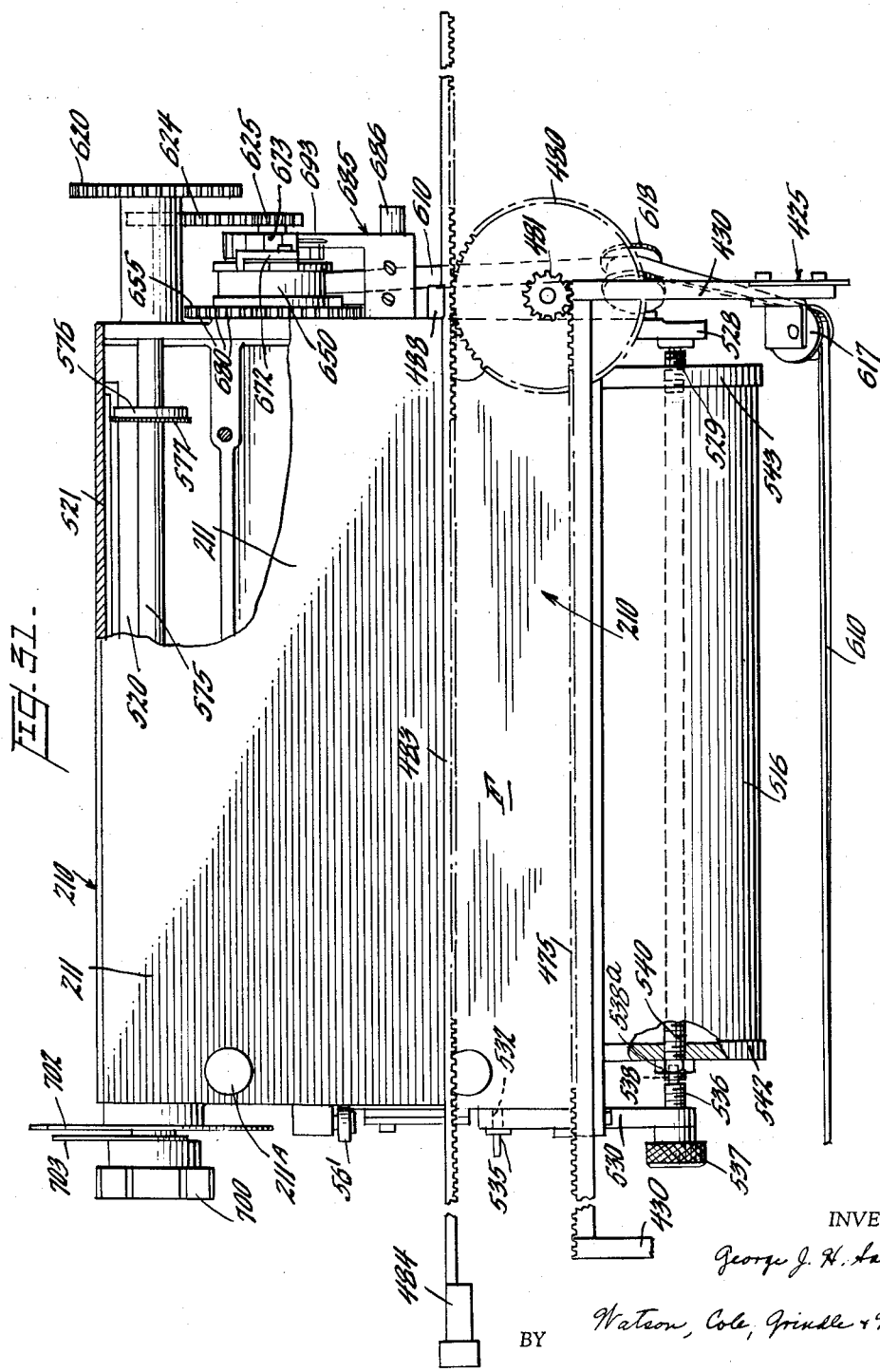

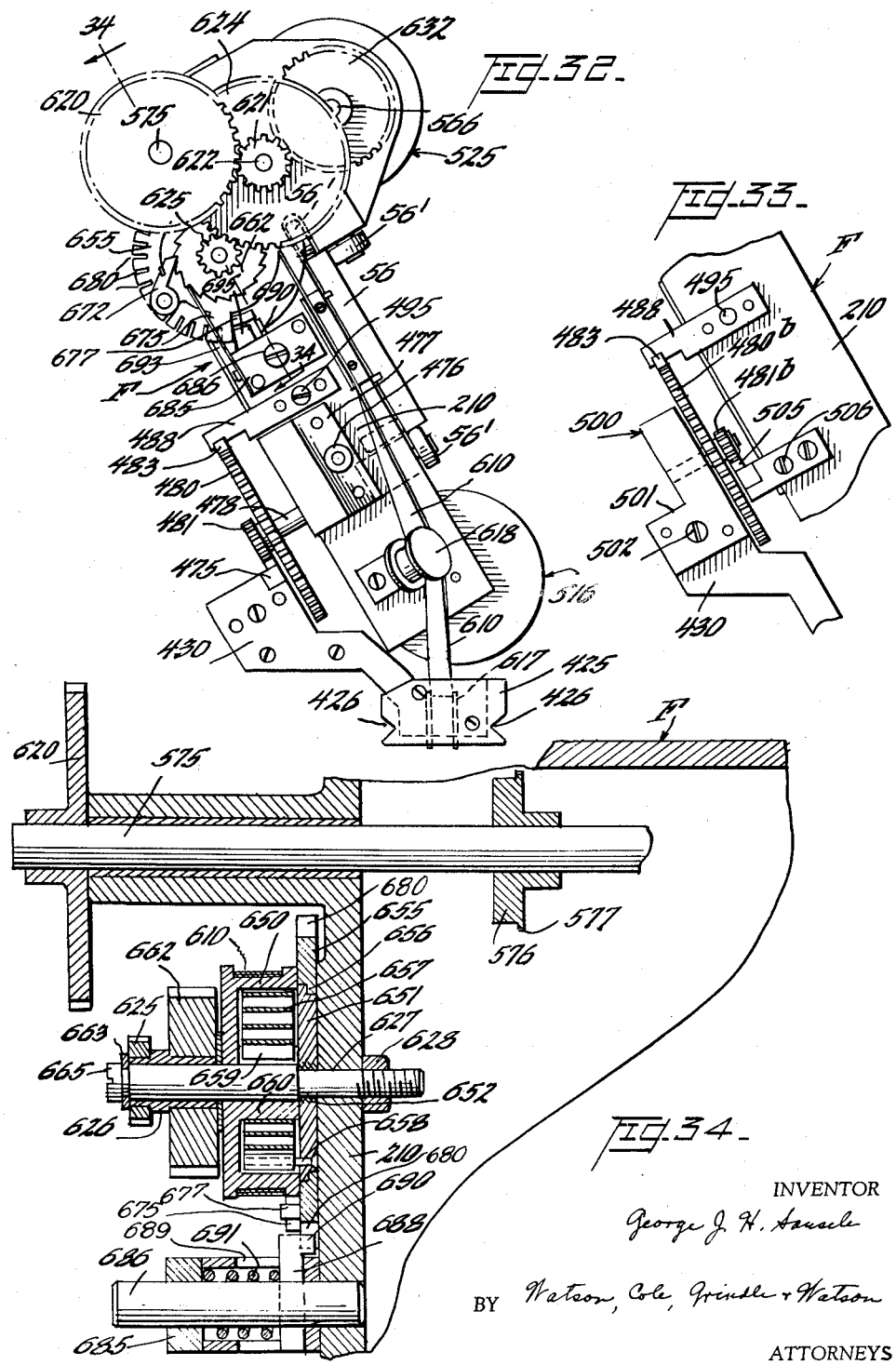

March 26, 1963 G. J. H. SAUSELE 3,082,670
TYPESETTING SYSTEM AND APPARATUS
Filed Sept. 25, 1957 22 Sheets-Sheet 18
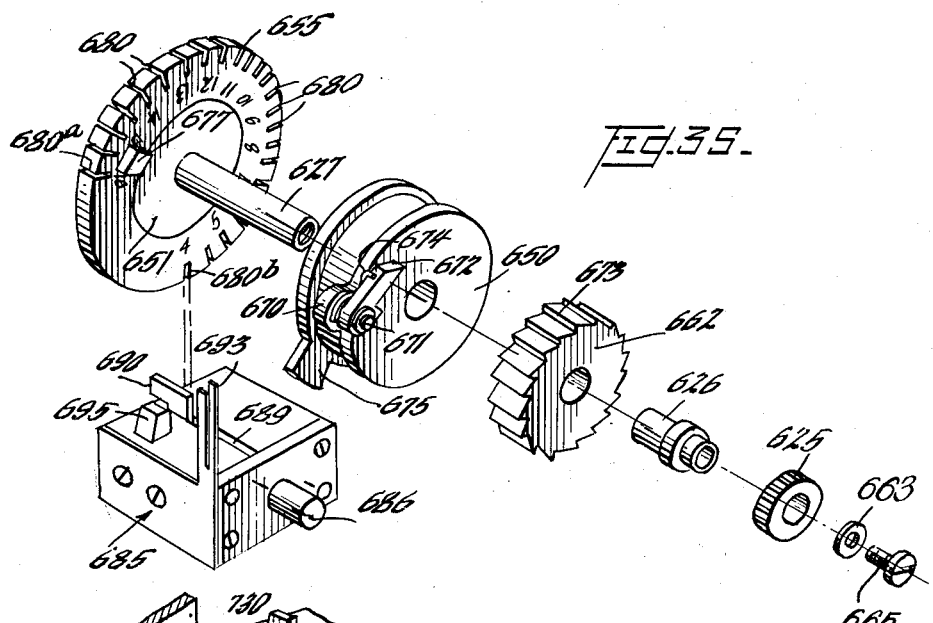
INVENTOR
George J. H. Sausele
BY Watson, Cole, Grindle & Watson
ATTORNEYS March 26, 1963 G. J. H. SAUSELE 3,082,670
TYPESETTING SYSTEM AND APPARATUS
Filed Sept. 25, 1957 22 Sheets-Sheet 19
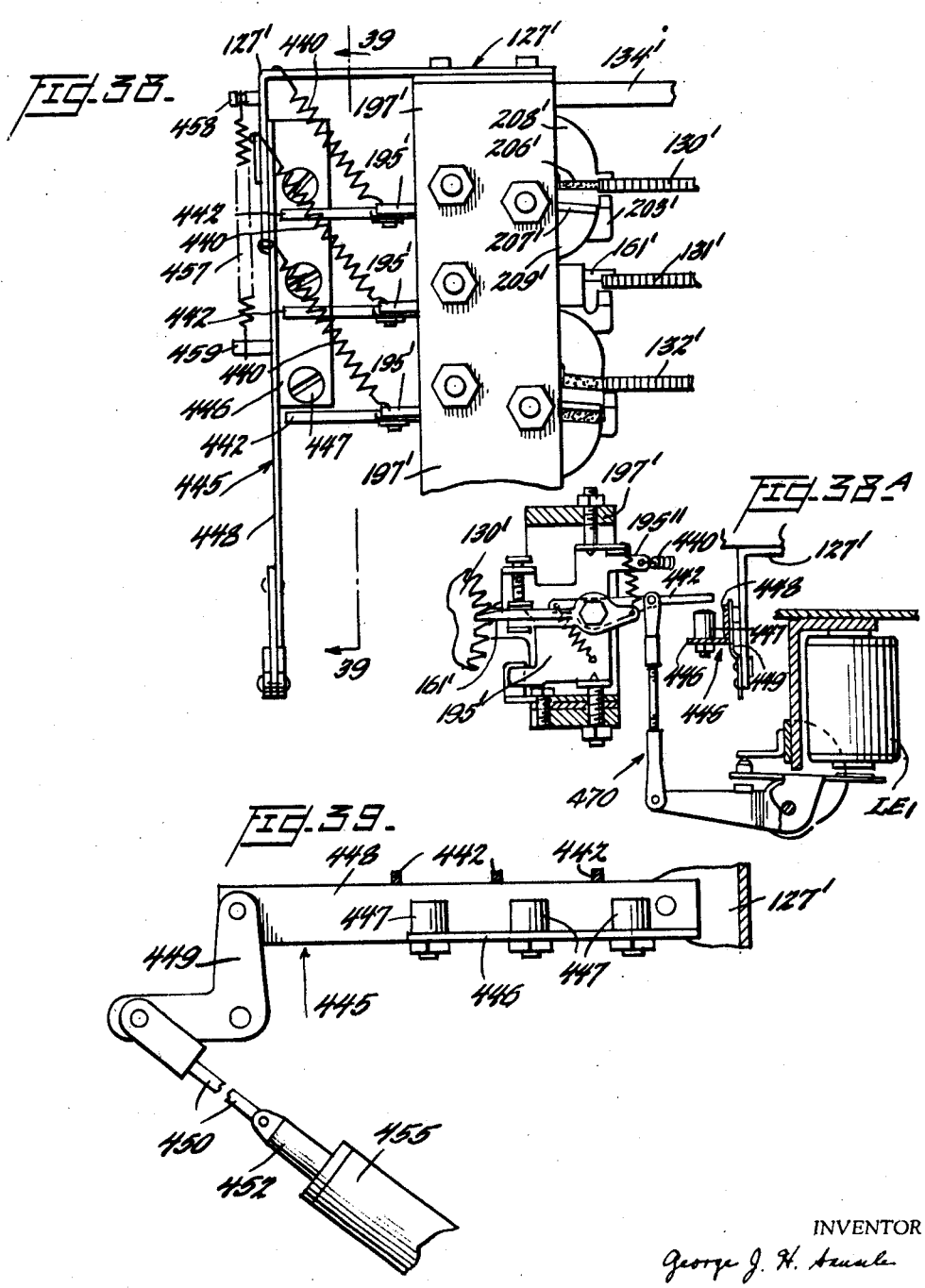
INVENTOR
George J. H. Sausele
BY Watson, Cole, Grindle & Watson
ATTORNEYS March 26, 1963 G. J. H. SAUSELE 3,082,670
TYPESETTING SYSTEM AND APPARATUS
Filed Sept. 25, 1957 22 Sheets-Sheet 20

INVENTOR
George J. H. Sausele
BY Watson, Cole, Grindle & Watson
ATTORNEYS

March 26, 1963 G. J. H. SAUSELE 3,082,670
TYPESETTING SYSTEM AND APPARATUS
Filed Sept. 25, 1957 22 Sheets-Sheet 21
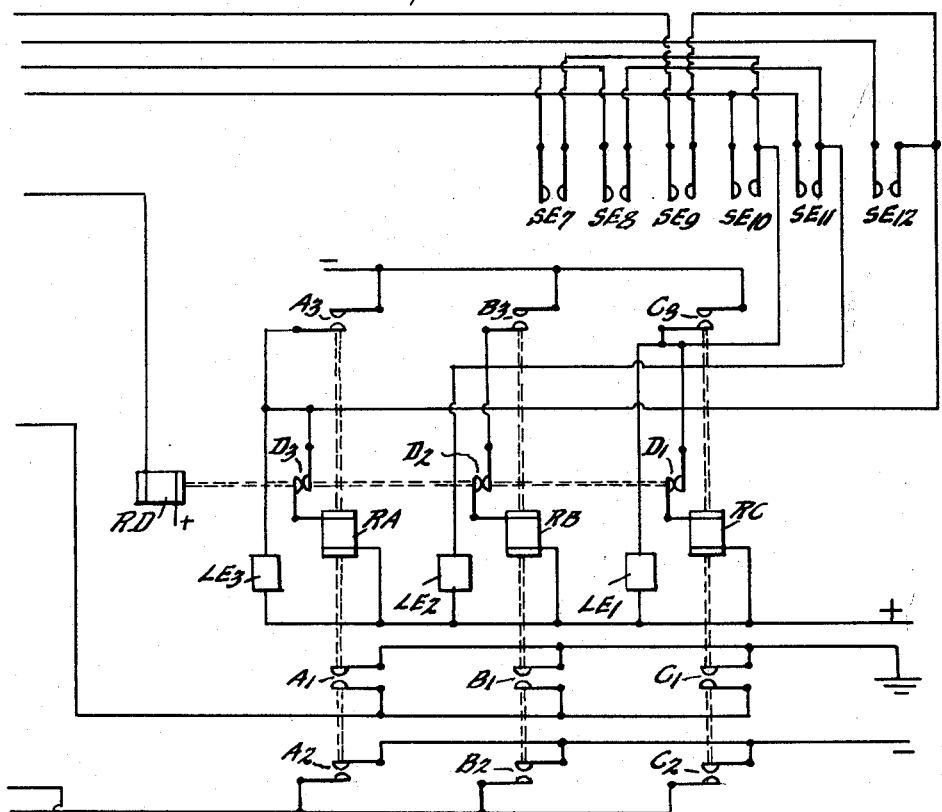
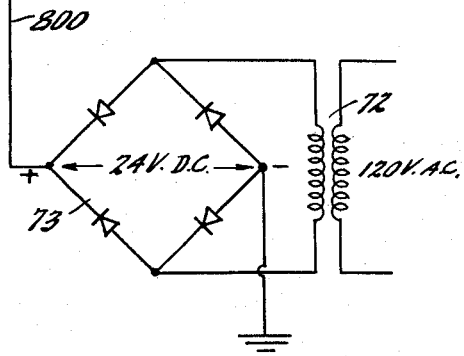
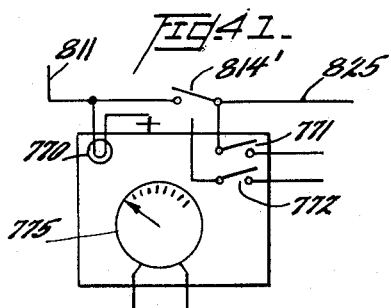
INVENTOR
George J. H. Sausele
BY Watson, Cole, Grindle & Watson
ATTORNEYS

United States Patent Office 3,082,670
Patented Mar. 26, 1963

3,082,670
TYPESETTING SYSTEM AND APPARATUS
George J. H. Sausele, New Providence, N.J., assignor, by mesne assignments, to American Type Founders Co., Inc., a corporation of Delaware
Filed Sept. 25, 1957, Ser. No. 686,233
57 Claims. (Cl. 95—4.5)

This invention relates to typesetting systems, and more particularly to systems of this class whereby photographic type composition may be produced by keyboard operation or automatically by coded devices, such resulting composition being readily transferable to printing machines of various kinds for unlimited reproduction.

Within the context of this application, "typesetting" may be defined as the preparation of typographic composition of a quality and variety approximating or surpassing that produced by current conventional Linotype or Monotype typesetting machines, and adaptable to newspaper, magazine, catalog, and directory printing as well as routine job work. As applied to the aims and purposes of the present invention, the term also connotes a degree of flexibility comparable to those currently used systems, in the matter of type styles, type sizes, mixing of type styles in the same line of composition, provision for composition of special type characters, and other variables.

These familiar composing machines produce type composition in molten type by die casting molten metal either into individual character type, or into multiple-type slugs. This molten metal casting operation is necessarily a very complex one and both the complexity of the job and the precision required in making perfect castings render the initial costs of construction and installation, and the maintenance costs, exceedingly large. The precision parts require continuous care and adjustment, many of them working in contact with the molten metal which necessitates daily cleaning and other maintenance operations on such parts.

Type fonts for these machines are quite expensive because precision, three-dimensional molds must be provided for each character.

Besides the manufacturing and maintenance costs of these huge installations, the over-all expense of operation is high because the actuation of their keyboards by the compositor is slow as compared with the speed of operation of the modern electric typewriter keyboards, it being common knowledge that electric typewriter keyboard operation proceeds at speeds twice those of Linotype and Monotype keyboards.

The graphic arts industry has been aware for many years of these drawbacks and deficiencies and the urgency for high-speed composition has given some impetus to research looking toward the development of more rapid systems of typesetting, and some of these efforts have been directed toward the production of photographic composition. However, these attempts have not solved either the problem of speed or expense, and while they purport to successfully eliminate the necessity of hot metal type casting, the machines produced are still very expensive to manufacture, maintain, and service; they are large and bulky; they are slow in operation; they are not adapted for ready correction of errors or re-running in different type face, size, or line spacing.

In résumé, it may be stated that the aims and purposes of the present invention include the provision of new and improved typesetting machines and systems, which are characterized by economy in cost of production, operation, and maintenance; simplicity in construction and control; adaptability for quick changes of type face; high speed in operation while at the same time being of a simplicity which enables an ordinary typist to operate the machines, rather than a skilled compositor, thus effecting savings in labor costs.

As an essential and quite unique feature, the present invention contemplates the provision of a typesetter unit which comprises the principal machine employed in the process of producing photographic composition, this machine being not only of the approximate size and general shape of an electric typewriter of current construction, but also incorporating in its basic structure, including power drive and keyboard operation, substantially the same high speed characteristics of such typewriting machines. Further than that, the machine forming the essential member of the novel system derives much of its basic operational and control features from the development in justifying typewriters, operable either by keyboard actuation or by means of coded tape, which development is disclosed in the United States patents of Edwin O. Blodgett, 2,700,421, 2,700,445, 2,700,446 and 2,700,447. Those disclosures relate to the preparation of justified typewritten copy and not such composition as is suited for quality printing in the field of typesetting, such as that produced by the best printing presses now in use. However, as basic exemplifications of fundamental elements, mechanisms, and circuitry, certain of the disclosures in those patents are incorporated into the present application by specific and general reference herein. The various departures in any mechanism and elements; modifications of structure, circuitry, and operation; and other additions and alterations will be disclosed fully herein as the specification proceeds; and further objects of the invention and features of novelty will be apparent therefrom, especially as is involved in the provision of a novel optical system, the inclusion of novel circuitry for the proper sequential actuation of the character selection, shifts, and exposure, and the novel and ingenious construction and distribution of the various operative parts.

In its preferred embodiments, the invention contemplates the provision of a camera, ingeniously constructed and arranged and conformed to the approximate confines of a conventional electric typewriter, this camera installation, of course, comprising a light source and an optical system comprising lenses and a shutter, and preferably equipped with two sets of shiftable reflectors such as prisms. A readily interchangeable master plate or disc is rotatably mounted on the frame of the typesetter for supplying the type characters to be photographed. This disc is preferably of transparent plastic having an opaque masking material applied thereto which is relieved to form the characters in transparent portions of the disc; in other words, the disc itself has the appearance of a photographic negative.

One or more alphabets of characters in lower and upper case and preferably in at least one other contrasting type face, are imposed upon the disc, and the disc is rotated and halted at the proper point for presentation of the chosen character to the optical system at each cyclic operation for photographing a type character. The provision on the disc of multiple arcuate or segmental duplicate sets of master characters permits improved high-speed indexing, and constitutes an important object of the invention.

The film upon which the composition is to be imposed is supplied to the machine in the form of a film roll enclosed in a light-tight casing which is supported on the movable carriage of the machine. The novel carriage escapement means provides for moving the film successively in front of the light beam of the camera to give proper letter spacing, word spacing, and justification; and novel line spacing mechanism is provided which serves to feed the film vertically as required.

Improved devices, mechanisms, and circuitry are provided throughout the novel system and especially noteworthy are the means for providing for multiple escapement to effect automatic size-change, means for interposing certain delay on the holding devices in the circuitry for ensuring proper sequential operation of the various elements, novel character selecting indexing devices, switch-control cam arrangements, and numerous other ingenious expedients contributing to the efficient, accurate, and speedy functioning of the system in producing perfect composition.

The novel typesetter can be provided with a unit system of spacing which is compatible with the character unit system of proportional spacing typewriters, and this facilitates line-for-line copy fitting in the original typing provided such typing is done on the proportional spacing typewriter.

The equipment in its preferred form also uses a common language coded tape which is basically compatible with teletypesetter wire transmission equipment, teledata wire transmission equipment, automatic typewriter equipment, and punch-card accounting systems; and it can be combined with such systems whenever the need for typesetting in combination with such systems arises.

Other objects and features of novelty involved in the present invention will be apparent from the following specification when read in connection with the accompanying drawings, in which certain embodiments of the invention are illustrated by way of example, it being understood that various changes and modifications may be made in the exemplary embodiments without departing from the scope of the invention as defined by the subjoined claims.

In the drawings:

FIGURE 1 is a view in perspective of a recorder unit which is operated to make the typewritten trial copy of the text and produce a coded tape for actuation of the novel typesetter unit;

FIGURE 2 is a similar view of the novel typesetter unit;

FIGURE 4 is a schematic view diagraming the principal functional members of the two machines and showing their correlation;

FIGURE 5 is a view approximately in front elevation, but more accurately as seen from line 5—5 of FIGURE 7, of the novel typesetter unit with part of the casing removed to reveal certain of the principal elements of the invention;

FIGURE 6 is a view in side elevation as seen from the left in FIGURE 5;

FIGURE 7 is a similar view as seen from the right-hand side of FIGURE 5;

FIGURE 8 is a bottom plan view of the typesetter unit, in somewhat schematic style, certain details of both derivative and novel features being omitted or shown in block diagram, in order to clarify and emphasize the illustration of several essential operative elements and mechanisms;

FIGURE 9 is a similar somewhat diagrammatic view in rear elevation of the typesetter unit;

FIGURE 12 is a plan view on a somewhat reduced scale of a complete master disc;

Figure 3:
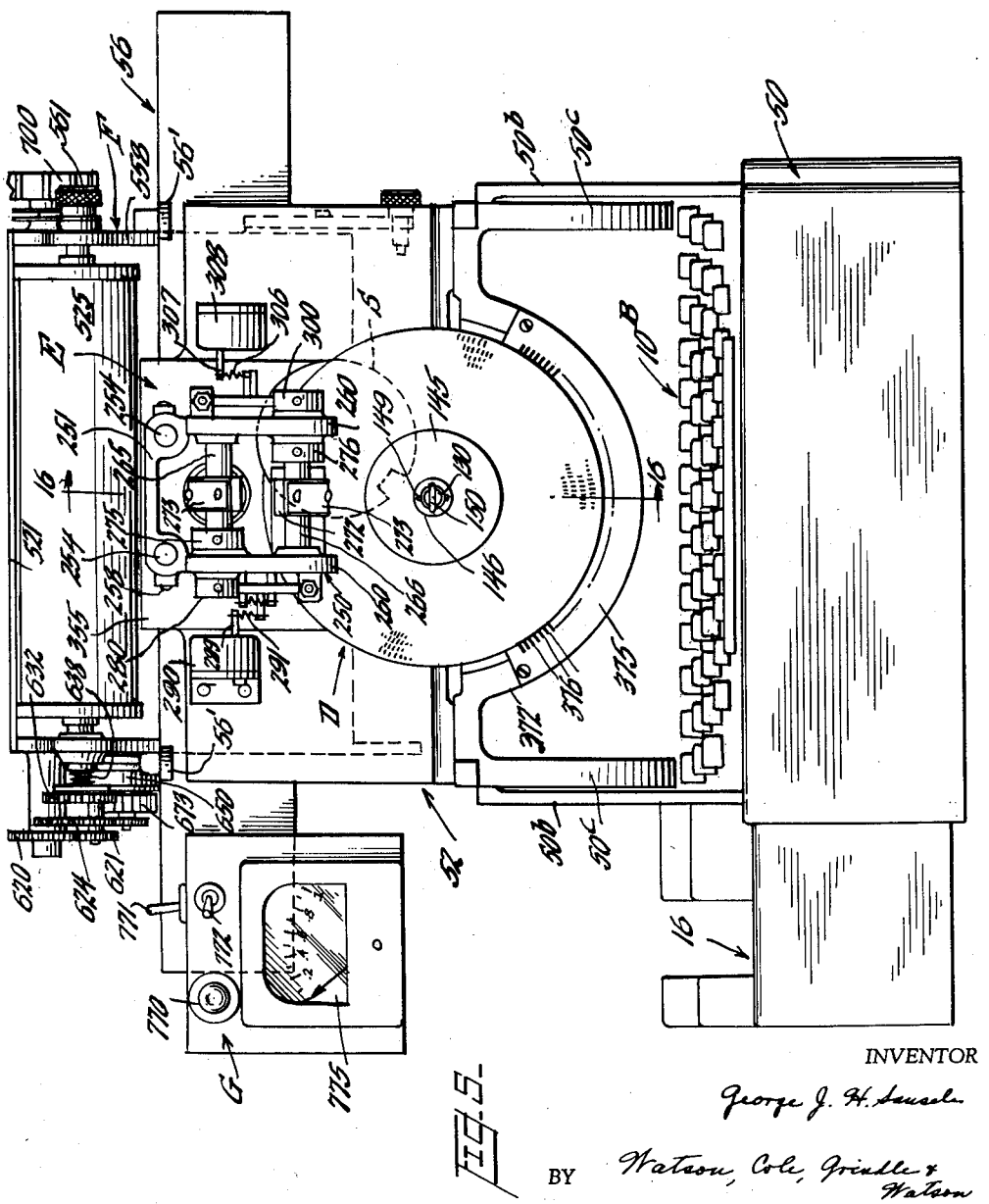
FIGURE 3 is a fragmentary view in perspective showing a typical control tape shown here for convenience as passing directly from the recorder, where it has been punched in appropriate codes, to the tape reader of the typesetter.
Figure 40A:
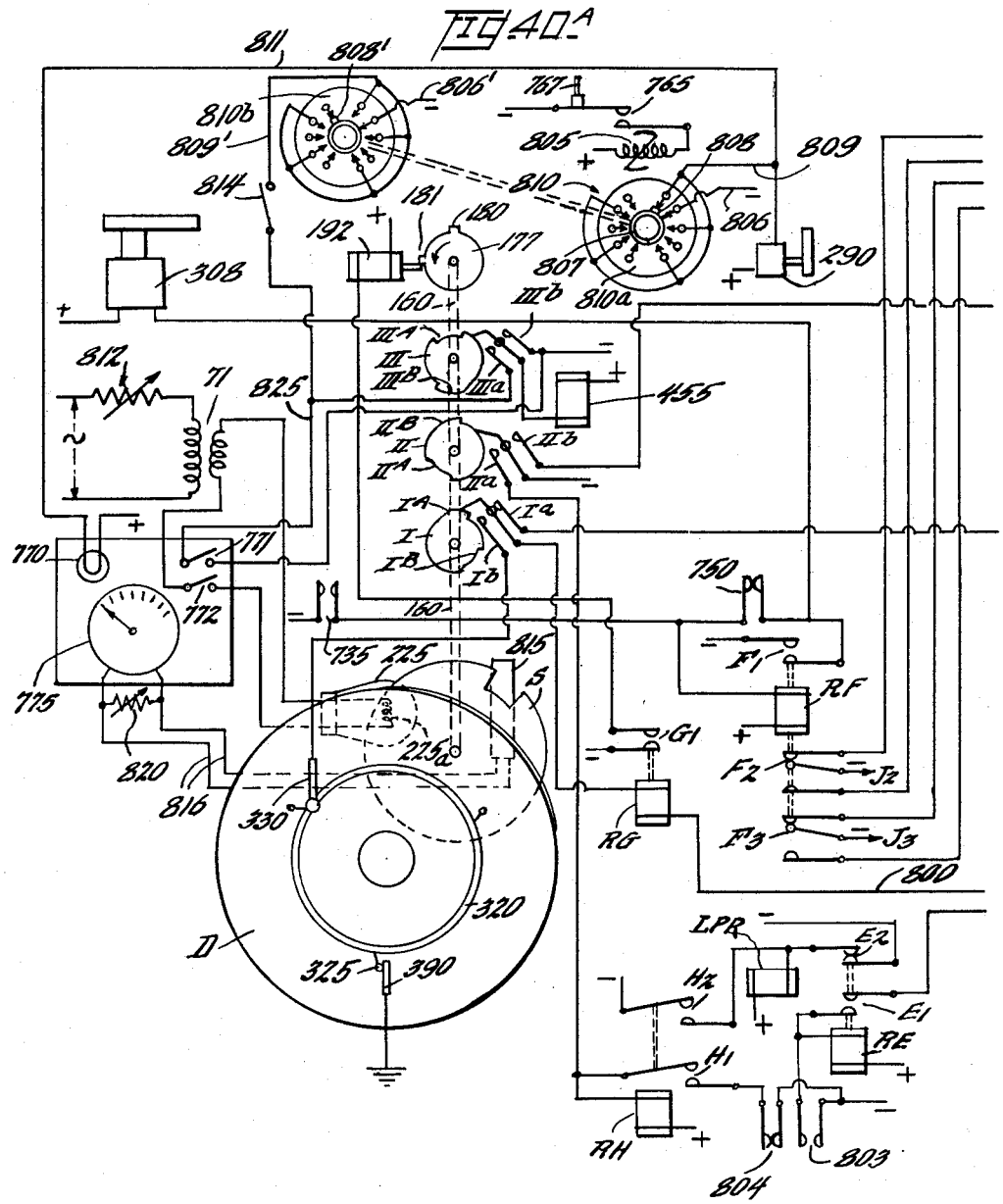
Figure 42:
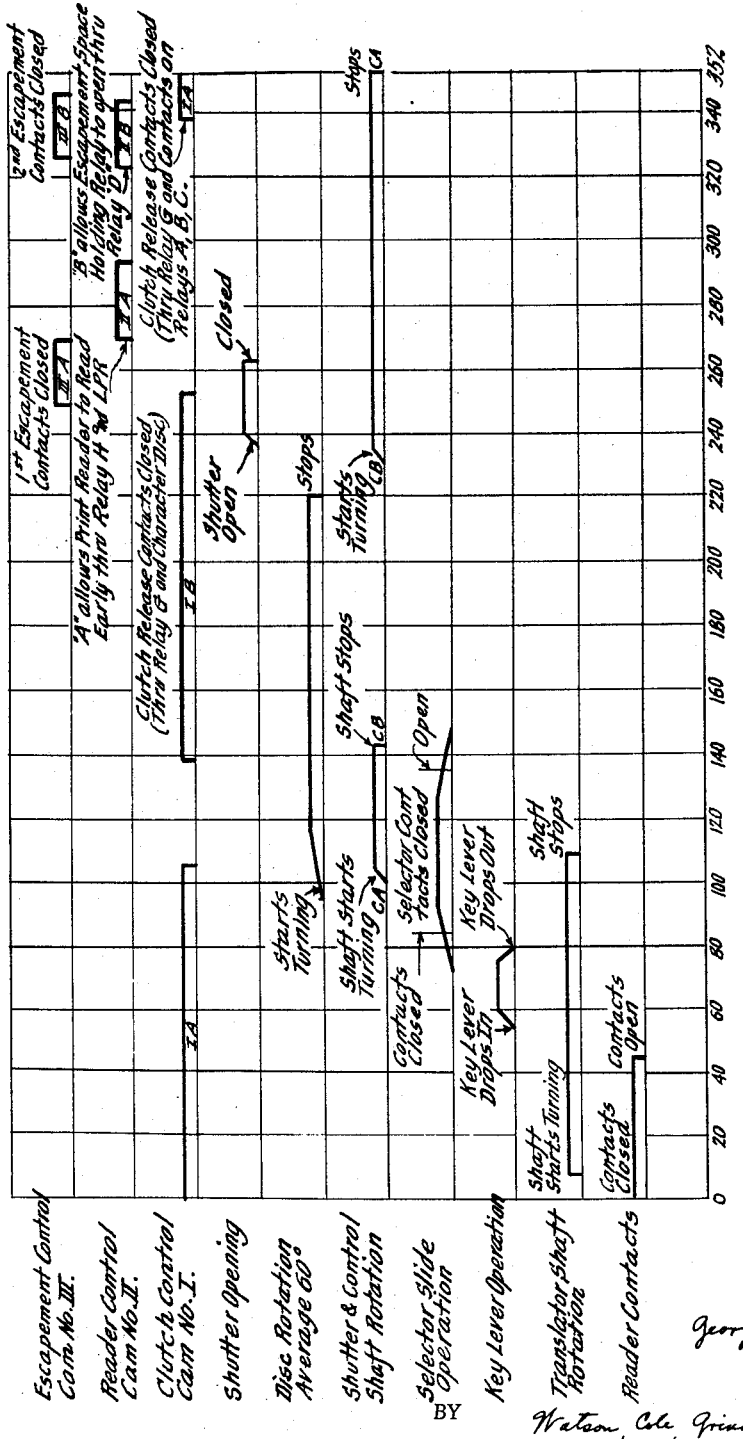

FIGURES 13, 14 and 15 are fragmentary sectional views taken respectively on lines 13—13, 14—14, and 15—15 of FIGURE 12;

FIGURE 16 is a view in vertical section through a central portion of the typesetter unit, as taken on line 16—16 of FIGURE 5;

FIGURE 17 is a diametric sectional view through one of the film containers, as taken on line 17—17 of FIGURE 16;

FIGURE 17A is an enlarged section of the right-hand end of FIGURE 17;

FIGURE 18 is a fragmentary sectional view showing a portion of the optical system and the cam and shutter shaft, as taken on line 18—18 of FIGURE 16;

FIGURE 19 is a fragmentary view in elevation as seen from line 19—19 of FIGURE 18;

FIGURE 20 is a fragmentary sectional view taken on line 20—20 of FIGURE 19;

FIGURE 20A is a schematic view in perspective of the novel optical system in unshifted position as for composing a lower case light face character;

FIGURE 20B is a fragmentary view based on FIGURE 20A showing the projection of an upper case character from a secondary font;

FIGURE 21 is a sectional view of the superstructure of the typesetter unit, taken on line 21—21 of FIGURE 16;

FIGURE 21A is a longitudinal sectional view through the cam shaft;

FIGURE 21B is a detail view in elevation, and upon a somewhat enlarged scale, of certain operative mechanism associated with the cam shaft and as taken from the central portion of FIGURE 21;

FIGURE 22 is an exploded view of the shutter and cam shaft and certain of its supported parts;

FIGURE 23 is a fragmentary sectional view through the master disc shaft and certain of the character selecting, disc stopping devices, as taken on line 23—23 of FIGURE 21;

FIGURE 24 is a fragmentary sectional view taken on line 24—24 of FIGURE 23;

FIGURE 25 is a partial horizontal sectional view taken on line 25—25 of FIGURE 23;

FIGURE 26 is an exploded view showing the interrelation of the character disc stop elements and the common latch plate for these elements;

FIGURE 27 is a detail view of one of the latch elements in operative relationship to the latch plate at a stage of the operation next beyond the position of these parts shown in FIGURE 23;

FIGURE 28 is a similar view showing a third progressive position of these parts;

FIGURE 29 is a fragmentary horizontal sectional view taken on line 29—29 of FIGURE 28;

FIGURE 30 is a view substantially in plan but more accurately as seen from line 30—30 of FIGURE 16, and showing the upper portions of the superstructure and film carriage;

FIGURE 31 is a view approximately in rear elevation of the film carriage and a portion of the superstructure but more accurately as seen from the inclined line 31—31 in FIGURE 16;

FIGURE 32 is an end view of the film carriage substantially as shown in FIGURE 6 of the drawings but upon an enlarged scale;

FIGURE 33 is a similar fragmentary view showing a modification of the proportioning gearing of FIGURE 32;

FIGURES 33A and 33B are diagrams explanatory of the proportioning gearing of FIGURES 32 and 33 respectively;

FIGURE 34 is a sectional view taken on line 34—34 of FIGURE 32;

FIGURE 35 is an exploded view of the line-to-line stepping mechanism for the film adjacent the axis of the film feeding mechanism;

FIGURE 36 is a fragmentary view in perspective of certain mechanism operatively connecting the key mechanism with the upper case circuitry;

FIGURE 37 is a similar view of the lower case operative mechanism;

FIGURE 38 is a fragmentary view on an enlarged scale of a portion of the multiple escapement mechanism showing the connection of the escapement cut-out solenoid;

FIGURE 38A is a view in vertical section taken approximately on line 38A—38A of FIGURE 38;

FIGURE 39 is a sectional view taken on line 39—39 of FIGURE 38;

FIGURES 40A and 40B comprise a circuit diagram of the new and improved typesetter device;

FIGURE 41 is a modified fragmentary circuit diagram involved in automatic double escapement control; and FIGURE 42 is a time chart showing the respective portions of the complete cycle allotted to the various component devices of the typesetter unit.

In FIGURE 1 of the attached drawings will be recognized a modified recorder unit of the Blodgett patents referred to, and many other basic elements of the typesetter unit, shown in FIGURE 2 and in other more detailed figures, will be recognized as comprising portions of the Blodgett machine. For brevity and clarity of disclosure and to avoid unnecessary repetition, then, the basic or initial structure of the machines, as well as certain auxiliaries and attachments, will be set forth herein only by reference to the very adequate disclosures of those parts in the Blodgett patents.

It will be understood therefore that for almost all purposes and operations there will be utilized two machines; first, a machine as indicated generally at A in FIGURE 1, which may correspond to the trial copy recorder illustrated in FIGURES 1 of the Blodgett Patents 2,700,421 and 2,700,447 but modified by the addition of a print reader attachment indicated at 16PR and described in detail in the Blodgett patents; and second, the typesetter proper designated B in FIGURE 2 of this present application and which is adapted to be tape controlled in a manner basically similar to the reproducer unit of the Blodgett patents, which is shown in FIGURE 1A of Patents 2,700,421 and 2,700,447, and in FIGURES 1 of Patents 2,700,445 and 2,700,446, where the object is to produce justified typewritten material of fixed styles and sizes. In the case of the typesetter system the object is to compose higher quality type composition of many different designs and faces by photographic means.

As fully explained in the patents to which reference has been made and as schematically and functionally depicted in FIGURE 4 of the present drawings, the recorder A is designed to produce, by operation upon an ordinary standard typewriter keyboard, both a typewritten non-justified proof sheet and a perforated tape coded record of the text, both of which may be edited and corrected before used to produce the final composition in the typesetter. As further developed and utilized in the present conception, the evolved system affords means for making corrections at nearly every step of the complete typesetter system process, re-keyboarding being held to a minimum. For example, corrections may be applied by (1) automatically reproducing correct portions of the tape and keyboarding corrections where needed, this resulting in a corrected tape and a corrected typewritten proof; (2) by cutting the tape and splicing-in corrected portions; (3) by keyboarding the typesetter unit B itself, applying the corrections directly; or (4) preferably only as a last resort, even cutting and splicing the final film or paper composition before going to the press.

As a convenient background for the facile understanding of both the basic or preliminary structure of the Blodgett machine and the novel and improved development for typesetting originated by the present applicant, a functional outline of the complete process is set forth at this point without regard to the allocation of the points of novelty, which of course can only be authoritatively delineated by means of the claims appended hereto.

First of all in the list of functions, is that of character selection from a given type font or fonts; then, variations from lower case to upper case and vice versa; also, in this particular development provision for a "mixer shift," that is, automatic changeover at any point from one type face to another; and then the various spacing operations, by carriage escapement, carriage return, and line-to-line feed. Carriage escapement, of course, provides for variable character width on a basis of apportioned units of space, and for variable word spacing for justification purposes.

Now, referring first mainly to the disclosures in the Blodgett patents, especially the Patent 2,700,447, it will be perceived that the keyboard (numbered 10A in the present case) of the trial copy recorder A is operated manually to make a typewritten copy of the text material which will give an indication of the normal length of the lines. The keyboard mechanism, including the power cylinder and the linkages to the type bars, is shown in FIGURE 3 of Patent 2,700,447 for the recorder and in FIGURE 4 of the present application for the reproducer. During this typing, a tape (designated 11 in FIGURE 3) is punched with successive series of perforations, the number and position of the perforations at each point being a coded representation of a character, a space, or one of several other functional machine operations pertinent to the making of the desired type composition. At the trailing end of each line, a justifying code is also punched into the tape which directs that that line be expanded or contracted to the desired length upon reproduction on the typesetter.

The tape punching mechanism (15 in FIGURES 3 and 4 of these drawings) is fully shown and described in Patent 2,700,421, and is also disclosed in FIGURES 35 et seq. of Patent 2,700,447, and portions of the latter specification, especially from column 24 to column 35 thereof. The tape punch 15 is actuated electrically from contacts operated by a code selector device in the recorder which is similar to a code selector used in the typesetter and which wil be adverted to in connection with the description of that machine. In the schematic view, FIGURE 4, the code selector (which may exemplify the device for either the recorder or the typesetter) is designated generally by the reference character 13. The construction and operation of the code selector in the recorder is fully set forth in Patent 2,700,447 in FIGURES 29–32, and for the reproducer (forerunner of the present typesetter) in FIGURES 63–66. The most appropriate portions of the specification are at columns 22–24.

For operating the typesetter unit, the punched tape 11, corrected if necessary, is fed into the combined tape reader 16 of the typesetter (see FIGURES 3 and 4) which tape reader includes a print reader portion 16P and a justification reader portion 16J. The details of this reader 16 are clearly disclosed in the Blodgett patents, most particularly in Patent 2,700,447, FIGURES 51–56 of the drawings, and columns 38–43 of the specification of that patent. Taper reader circuitry is described in columns 47 et seq., and is basically the same as that used in the present typesetter, except for the departures noted below in the description of the circuitry employed in the present invention.

As clearly explained in Patent 2,700,447, the justification code is read by the justification reader first even though it occurs at the trailing end of the line on the tape, and the mechanism and circuits are so interlocked as to perform their functions in the proper coordinated sequences, the justification reader section always finding the justification controls for each line before the printing reader starts reading that line. The information gleaned from the tape by the print reader section is transmitted electrically by the selective actuation of switch contacts (FIGURES 52–55 of Patent 2,700,447) to the code translator, designated 14 in FIGURE 4 of the present drawings, and disclosed in detail in Patent 2,700,447, FIGURES 57–62, and columns 43–47. The various combinations of magnet actuation in the selective shifting of the permutation bars PB1–6 ensure that one and one only of the seekers 489 move into position to be operated by the seeker operating bails 530 and the positioning bail 523. The seekers are each associated with a character key or other functional key of the keyboard, and are adapted to actuate that particular key by means of the hooked upper end 490 of each of the seeker bars.

These seeker elements than may be considered the end-point of the derivation of the chain of character selection as the result of the functioning of the print reader and the code translator, and comprises one of the points of departure into the novel structure for selecting and photographing the characters in the form of text composition which is provided by the present invention. The novel details of this aspect of the invention will be described presently under appropriate headings.

Referring now to FIGURE 4 herein and to FIGURES 3A and 63–66 of Patent 2,700,447, and more particularly to lines 7–42 of column 24 of that patent, it will be understood how the code selector 13 is actuated from the key operating cams to selectively energize the character space selecting escapement magnets designated EM1, EM2, and EM3 in that patent, and corresponding to those designated LE1, LE2, and LE3 in the present disclosure including FIGURE 4 and the circuitry comprising FIGURES 40A and 40B. Six switches ECA, ECB, ECC (for lower case operation) and ECD, ECE and ECF (for upper case operation) serve to energize the escapement magnets in Patent 2,700,447, and these switches find their respective counterparts in switches SE7, SE8, SE9, SE10, SE11 and SE12 in FIGURES 40A and 40B of the present application. Thus, through the code selector 13, the particular carriage escapement for each character is appropriately provided.

The variable escapement mechanism is disclosed best in FIGURES 14–18 and 69 and in columns 13–15 and 50 et seq. of Patent 2,700,447, and it will be readily understood how the three escapement magnets, energized singly or in various combinations, may be made to release the carriage for different selected distances of travel to accommodate character width of at least five different sizes.

These magnets and their energizing circuitry constitute another point of departure from the foundational structure of the Blodgett patents into the novel escapement control of the present invention, which will be described presently in connection with the circuitry of FIGURES 40A and 40B.

Returning now to the justification feature, it will be recalled how the justification code reader 16J registers the variable code spacing information for a given line of composition before that line is read by the print reader 16P, and is therefore prepared to allocate to the word spaces at different points along the line the necessary widths to attain justification. The mechanism and circuitry involved in computing these justification allocations in the recorder A are set forth in FIGURES 40–50 and columns 30–34 in Patent 2,700,447; and the interpretation and application of the justification data to the escapement of the reproducer is explained in columns 43, 47–53, with reference to FIGURES 51–56, and the diagrams of FIGURES 70–73. The common contact RCC of Patent 2,700,447, and the tie-in of the escapement contacts and the escapement magnets are the main points of impingement of the new circuitry of this present invention, as depicted in FIGURE 40 and this will be fully explained at the proper point below.

The next function to be considered in the broad survey of the system is that of the shift mechanism. The Blodgett machines are provided with case shift and color shift, the former serving to raise and lower the type basket in the manner common to typewriters. Provision is also made in the novel typesetter for case shift and also for "mixer shift" or the transposition from one type face to another.

Now, in the photographing of the characters onto film from the master plate, the image of the type character is projected from the master disc onto photosensitive film or paper by means of an optical system which includes two sets of reflecting devices such as mirrors or prisms, and the master characters are arranged on the plate or disc in such alignment that rotating one of the prisms or other reflecting element through a slight angle will project a capital letter instead of a lower case letter, and rotation of another prism will pick up a character (lower case or upper case depending on the position of the first named prism) of different type face among those carried by the master plate. Electrical means are taken off from the conventional case shift keys of the machine for operating the case shift prism; and the mixer shift may be controlled either by a specially installed key or by any one of the keys of the conventional typewriter keyboard which may not be needed for performing its usual function, such as, for example, the ribbon color shift key. Indeed, when the color shift key is thus employed, for example, in shift to bold face or other companion font, the companion typography will be shown on the typewritten proof from the recorder machine in red.

Among the remaining functions to be traced from the Blodgett patents are carriage return and line spacing, and although the initiation and powering of these movements are set forth in the Blodgett patents, particularly in columns 15–22 of Patent 2,700,447, the adaptation of these mechanisms to the novel typesetter had better be developed in its entirety in connection with the disclosure of the details of the new machine.

General Arrangement of Typesetter Unit

The general construction, arrangement, and functioning of the novel typesetter unit B will now be briefly described, by way of introduction, in connection with FIGURES 5–9 inclusive of the drawings. The base frame casting is designated generally by the reference numeral 50 and is of a configuration quite similar to the corresponding portions of a modern electric typewriter. The base frame is provided with a rearward extension 50a within which is disposed much of the electrical equipment necessary to the operation of the machine. Certain of these electrical elements are shown diagrammatically in FIGURE 9 which is a partial rear elevation of the device and these will be described presently, particularly in connection with the examination of the circuitry involved and in the detailed description of the operation of the novel system.

Surmounting the base frame 50 at an intermediate point and behind the keyboard 10B is a fixed superstructure to which has been given the general reference character 52. This superstructure serves to support the master character plate or disc D on its shaft and also houses certain of the driving and controlling mechanism including the shutter and control shaft assembly C (see FIGURES 18, 21–23), as well as portions of the optical system for the camera device. This superstructure also supports a track bar or rail 56 for guiding the travelling film carriage.

Suitably secured to the upper forward portion of the superstructure 52 is the adjustable reflecting mechanism for effecting shifts for both capitalization and for the ready introduction of characters of a different font at any desired place in the composition. This reflector assembly is given the general reference character E.

An important and novel unit of the assembly is the film carriage which is designated generally in the drawings by the reference character F, and which includes certain light-tight enclosures for protecting the film during its lateral feed, along the guiding and supporting rail 56, for letter spacing and its vertical feed for line spacing.

Finally, there is suitably secured, at the lefthand side of the machine as shown in FIGURE 5, a box G which carries certain indicating instrumentalities and switches relating to the control of the operation of the machine.

At this point it may be well to set forth a brief and generalized description of the operation of the principal members of the assembly thus described, as a preview affording a better understanding of the detailed descriptions to follow.

The master character disc D is provided with concentric arcuate rows of characters, the several rows usually depicting the characters in upper case and lower case styles and preferably in two or more differing type faces. By the action of the character key bars beneath keyboard 10B, the rotation of the master disc is stopped at such points where the selected character is brought into alignment with the beam of light from a lamp carried by the superstructure 52; and manipulation of certain shift mechanism will angle the reflecting elements of the system E so that the light beam is deflected from one row of characters to the other for projection through the optical system onto the film supported in the light-tight film carriage F. A shutter disc S forms a part of the shutter and control shaft assembly C, and is timed so as to permit the light beam to pass through an opening in the light-tight film container on the carriage F to strike the film and impress the image of the character thereon for subsequent development.

Through the mechanism of the basic typewriter device, described in the Blodgett patents and adverted to above, the escapement mechanism is not only actuated to release the film carriage for the appropriate degree of movement for the selected character, but is also appropriately actuated at the occurrence of successive word spaces for the proper justification of the line of type.

Mechanism is also associated with the film carriage F and with the basic carriage return devices employed in the Blodgett disclosures, for feeding the film vertically for line-to-line spacing, at the end of each line of typography.

One of the important features of the present invention is the control of the timing of the functioning of the various devices involved in the preparation of such type composition, and these measures will be fully revealed in the description of the circuitry and detailed description of the mechanical and electrical components employed.

With these general considerations in mind, the constructional and operational details of the elements of the various general combination units will be described.

*Base Frame and Appurtenances*

Certain elements of the typesetter wihch are supported by, associated with, or enclosed within the base frame 50 will now be referred to without tracing completely their function and association with other parts. The particular detailed functions performed and the relationship of these elements to other portions of the mechanism will be developed at a later point in the specification.

The tape reader attachment 16 which is secured to the base frame 50 as shown at the left-hand side of FIGURE 5, has already been mentioned and broadly described. At the opposite side of the base frame, as may be observed in FIGURE 7, there is disposed the main switches 70A and 70B, switch 70A controlling the motor 85 which powers the main drive of the machine, and switch 70B controlling the lower voltage D.C. current supply employed in certain controls where the circuitry is more or less exposed. This is the virtual equivalent of the "startstop" switch shown in the lower portion of FIGURE 71 of the Blodgett Patent 2,700,447.

Immediately beneath the main switch is the key lock mechanism designated here and also in the Blodgett patent by the reference character KLM.

At an intermediate lower portion of FIGURE 7 are shown some of the protruding parts of the code selector device 13.

Now proceeding to the rear of the machine as illustrated in FIGURE 9, there will be found a lamp circuit transformer 71, a lamp rheostat 812 with its control knob 812′, a 24 volt transformer 72, a 24 volt rectifier 73, a rotary stepping switch 810 asociated with certain of the shift mechanisms, and a 90 volt rectifier 79, a portion of which may be seen showing from the rear of the stepping switch 810, and two connector plugs for miscellaneous wiring which are designated generally by the numerals 74 and 75. Also, suitably supported by a shelf 77 and brackets 78 are a series of relays which perform special functions in connection with the present invention, which functions will be described at a later point. These relays with their actuated switches are designated generally by the reference characters RA, RB, RC, RD, RE, RF, RG, and RH. In an upper tier are located a number of relays associated with the basic circuitry of the typewriter described in the Blodgett patents and only one of these is illustrated in FIGURE 9, at 80, and this will be typical of the remainder which, while forming part of the circuitry illustrated and described in the Blodgett Patent 2,700,447, does not in itself comprise a part of the novelty of the present improvement.

Referring now to the bottom plan view of FIGURE 8, it will be seen that the driving motor 85 is mounted in brackets 86 secured to the rearward portion 50a of the main frame, and forwardly of the position of the motor there is rotatably disposed in suitable bearings the primary power shaft 88, this shaft being provided with a pulley 89 which is operatively connected to the motor pulley 90 by means of the belt 91. At the opposite end of the power shaft 88 from the pulley 89 there is mounted a sprocket 93 which is connected as by means of the chain 94 with a sprocket 95 carried upon the end of the shaft 96 of the rubber covered power roll 21. This shaft 96 also has a bearing 97 in the frame 50 at the opposite end of the machine and carries upon its outer end a clutch assembly 100 which has to do with the carriage return mechanism to be later described.

Referring both to FIGURES 7 and 8, it will be seen that the primary power shaft 88 also carries a sprocket wheel 102 adjacent the pulley 89 and around this sprocket 102 is passed a drive chain 105 which passes about idlers 107 and 106 carried by the bracket 108 which is adjustably mounted on a portion of the frame 50 as at 109. The chain 105 finally passes around a sprocket 110 which is secured to the shaft 112 which powers the master disc shaft, the switch-actuating cam shaft, and the camera shutter mechanism, all to be described later in detail.

*The Stationary Superstructure*

The superstructure 52 and the devices and mechanisms supported thereby and contained therein will be understood best from an inspection of the assembly FIGURES 5-7 and the detailed or sub-assembly FIGURES 16-29 inclusive. It will be understood that these figures show the machine as it appears stripped of its covering and enclosing housing members shown in FIGURE 2.

Intermediate the fore-and-aft dimension of the machine and rearwardly of the keyboard 10B, the side portions of the base frame 50 are elevated slightly to form the side walls 50b, and disposed within and rigidly secured to these side walls is the roughly M shaped supporting casting 50c. (See especially FIGURE 21.) Fixedly mounted upon this casting 50c is a box frame 114 which houses much of the mechanism concerned with the driving of the cam-and-shutter shaft assembly C and the master character disc D, and also part of the optical system.

Figure 10:
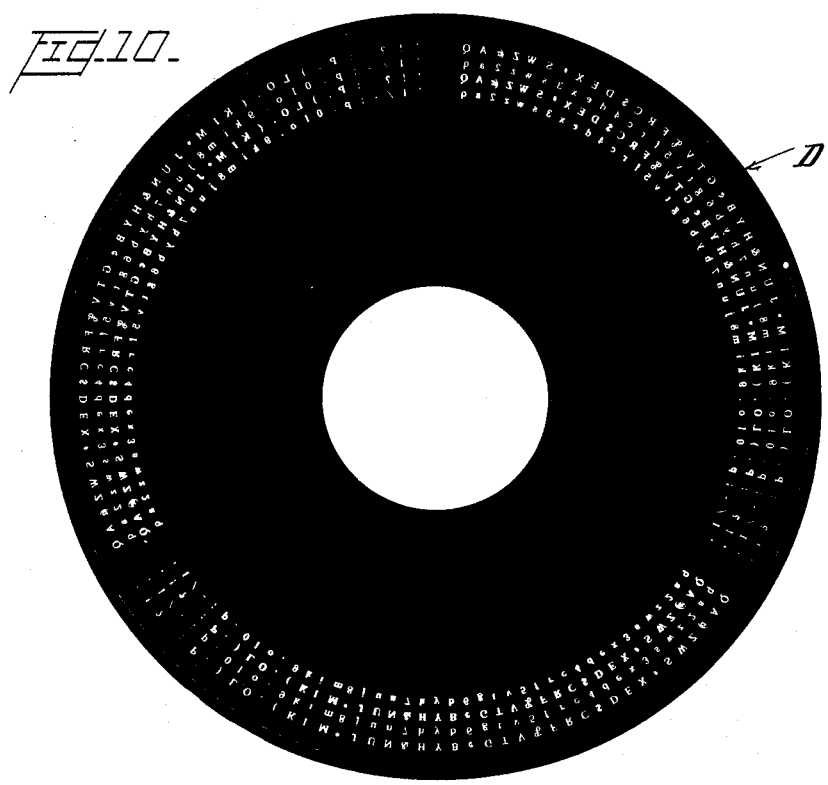
FIGURE 10 is a plan view showing an example of a master character disc which comprises an important element of the present invention, the disc being shown in the form of a blank accurately inscribed with character alphabets or fonts but not yet fitted with the applied equipment for properly mounting it and for controlling it and its associated electrical circuitry.
Figure 11:
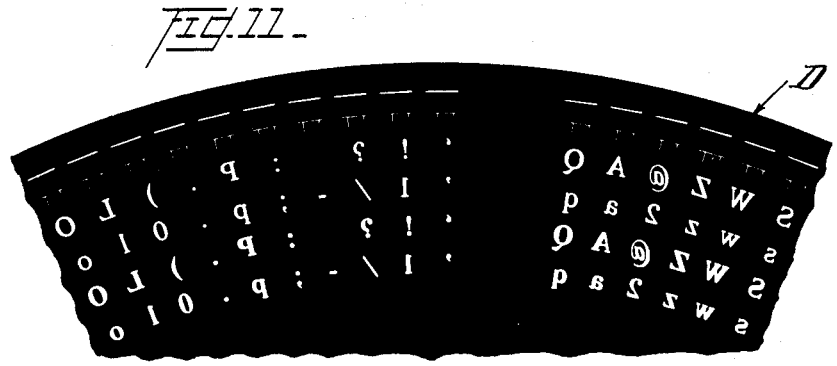
FIGURE 11 is a fragmentary view on an enlarged scale of an edge portion of the master disc.

The master character disc D is depicted in FIGURES 10 and 11 in blank form before the application of the metallic components thereto, but in FIGURES 12-15 inclusive may be found a full graphic disclosure of the metallic parts which have to do with the mounting, electrical conducting, and the precision stopping of the disc at the proper selected points. We are more concerned with the mounting features at this point and these are shown best in FIGURES 12, 13 and 23 of the drawings where the positioning and friction driving buttons or rivets 115 are secured in holes punched in the disc at points around its inner periphery near the central opening 116. These buttons 115 have rounded heads 117 extending on opposite sides of the disc and the portions 118 at the other ends of the buttons are provided with washers 120 which serve to rigidly secure the buttons within the openings in the disc.

A master disc well suited for use in this connection is described in my copending application Serial No. 798,511, filed March 10, 1959, entitled "Photo-Typographic Master Character Plate," now Patent No. 3,011,421.

The disc shaft comprises an assembled structure which is designated generally by the reference numeral 125. Suitable bearings 126 and 127 are provided in the front and rear walls respectively of the box frame 114 to receive the hollow outer portion 128 of the shaft. Fitted for easy sliding movement within the outer tubular portion 128 of the shaft 125 is the solid central shaft portion 130. An opening is drilled through the inner end of this shaft portion 130 through which a cotter pin 131 extends in order to fixedly secure a spring seating sleeve 132 to the portion 130, the cotter pin 131 passing through registering slots 133 in the tubular shaft portion 128 for limited sliding movement therein. A second spring seating sleeve 135 is adjustably fixed to the outer tubular shaft member 128 as by means of the set screw 136, and a coil spring 137 is compressed between the sleeves 132 and 135 which has the effect of urging the internal shaft element 130 inwardly within the hollow outer portion 128.

Near the outer end of the shaft assembly 125 a hub member 140 is accurately secured upon the outer shaft portion 128 with a force fit. This hub member is disposed adjacent the bearing 127 and in order to prevent undue longitudinal movement of the shaft assembly a guide sleeve 141 is pinned to the shaft assembly just inside of the bearing 127.

The hub member 140 is shouldered as at 142 to receive the margins of the internal opening 116 of the disc D. A clamping hub element 145 having a knob portion 146 centrally thereof is applied around the shaft 125 so that it bears against the buttons 115 of the disc D and clamps the disc against the protruding portion of the hub 140 with resilient frictional driving pressure. A clearance space 148 is left between the clamping flange member 145 and the hub 140. A flat transversely extending key member 150 is carried by the end of the internal shaft element 130 and when this key is in position to seat in the notches 147 on the outer surface of the knob portion 146 of the clamping plate 145, it bears upon the knob to press the plate 145 against the disc buttons 115. In order to release the plate, as for changing the discs, it is only necessary to withdraw the rod portion 130 of the disc shaft a slight distance against the urging of the spring 137 and rotate the plate 145 through an angle of 90°, whereupon the key 150 may pass through the slots 149 in the hub of the plate. (See FIGURES 5 and 23.) When the key 150 is positioned so as to bear against the knob 146 of the plate 145, the pressure of the spring 137 determines the clamping pressure on the disc, and this pressure can be varied by the adjustment of the spring seat sleeve 135 along the outer shaft element 128.

It will thus be seen that although the drive from the power source to the shaft 125 and its associated elements is constant, the disc D may be stopped at appropriate points on account of the slippage afforded by the resilient clamp under the influence of the spring 137.

Just within the bearing 126 in the rear wall of the box frame 114, a driving gear 151 is mounted upon the outer shaft element 128 and secured by means of the set screw 152. The operative association of this gear with other driving parts will be described presently.

Next to be described will be the shutter and control shaft assembly C, with particular reference to FIGURES 16, 18, 21, 21a and 22 of the drawings. The shaft assembly proper designated 160 is also a compound structure and includes a solid internal shaft portion 161 which has suitable bearings in the front and rear walls of the box frame 114. Upon the forward end of this shaft is secured the shutter disc S as by means of the hub portion 162. A gear 164 having a hub portion 165 is rotatably mounted upon the inner shaft portion 161 and held against longitudinal movement by the collar 166 fixed to the shaft 161 by means of the set screw 167. Adjacent the hub portion 165 and keyed thereto by means of the interlocking connection 169 is the hub 170 of the clutch disc 171. A coil spring 172 interposed between the gear 164 and the disc 171 urges the latter toward the clutch face of the cam mounting hub 177 between which face and the disc 171 is interposed a friction disc 176. The cam mounting hub 177 is fixed upon the shaft 161 for rotation therewith. The hub has a tubular extension 178 which provides a mounting for the three cam members I, II, III. The cams I, II, III and the mounting hub 177 are secured together for rotation as a unit by means of the pin 179. The cam mounting hub is provided with two stop projections 180 and 181 and the cams I, II and III are each provided with projecting and recessed switch-camming portions which will be described in connection with the functions performed.

Referring now more particularly to FIGURES 21 and 21b of the drawings, it will be seen that there is mounted a swinging stop plate 185 on a bracket 186 secured to the frame as by means of the pivot pin 187. The plate is approximately L-shaped and has an upstanding arm 188 which is adapted to be brought into and out of the orbit of the projections 180 and 181 of the cam mounting hub 177. A rod 190 adapted for substantial longitudinal movement under the influence of the clutch release solenoid 192, is suitably mounted as by means of a bracket 193 upon the box frame 114. The detailed operation of this blocking plate 185 and particularly the cooperation between the shelf portion 195 of the plate and the respective projections 180 and 181 will be described later.

One of the important points to be borne in mind here is that although the drive of the gear and clutch assembly 164–171 from the power source is constant, the cam assembly and shutter disc on the shaft 161 may be started and stopped in accordance with the prescribed cycle of events by means of the stop element 185 and the solenoid 192, due to the slippage of the friction clutch assembly 171–176.

A typical double acting switch adapted to be operated by the cams I, II and III is shown at 200 in FIGURE 21 as being carried by the mounting bracket 201. These switches will be described in detail in connection with the development of the circuitry.

For driving the cam and shutter shaft C and the disc shaft 125, power is taken off through the sprocket 110 and the shaft 112 which have already been referred to. The shaft 112 passes through a suitable bearing in one end of the box frame 114 and its other end is supported by means of the bracket 203. Upon the end of the shaft 112 is a worm 204 which meshes with the worm wheel 205 carried upon the jack-shaft 206, which is mounted in suitable bearings in the box frame 114 as clearly shown in FIGURE 16 of the drawings. Upon the rear end of the shaft 206 is a gear 207 which meshes with the disc driving gear 151 and the cam shaft gear 164.

*Optical System*

The basic mechanism for projecting the image of a character on the master disc D onto the film will now be described with particular reference to FIGURES 16, 18, 19, 20, 20A, 20B and 21 of the drawings. The film carriage F will be described in detail at a later point and it is sufficient here to mentioned that it comprises a box frame 210, which includes a front wall 208 and a rear wall 209 and a removable backing plate 211 between which the film *f* is confined. Through the front and rear walls of this box frame 210 there are provided openings 212 and 213 which register with an opening 214 provided in the track bar or rail 56. The opening 212 is a horizontally elongated slot which serves as a mask which limits the vertical dimension of the admitted light beam.

Carried by an upper portion of the box frame 114 of the superstructure 52 is a lens tube installation 215 which comprises the outer tubular member 216 and an inner slidable tube 217. A projection lens 220 is fixed within the forward end of the inner tube and the tube is mounted for slidable focusing and size of image adjustment by means of the thumb piece 221 which is secured to the inner tube and passes through a slot 222 in the outer tubular part.

As best shown in FIGURE 18, a lamp 225 is mounted for adjustment in vertical and horizontal directions by means of multiple bracket support means within the box frame 114, which means comprises a bracket 226 mounted on the box frame for horizontal lateral adjustment; a bracket 226 attached to the primary bracket for vertical adjustment; and a third bracket 226c for fore-and-aft adjustment. An annular member 227 receives the socket mounting 227a of the lamp 225, which may be secured thereto as by means of the screws 27b. This annular member 227 may be given a rotary adjustment and may be fixed in adjusted position by means of the set screw 227c passing through the bracket 226c. By these means, the filament 225a may be very accurately positioned with respect to the other elements of the optical system, including the condensing lens, master disc, projection lens, prisms, etc. Within the conduit 28, which is mounted in the forward wall of the box frame 114, is disposed an inner tubular lens holder 229 which carries the pair of condensing lenses 230, mounted in suitable fashion as by means of rings 231 and separating coil spring 232, and through which the beam of light from the lamp 225 initially passes, and which serves as a condensing lens element to concentrate the beam for uniform and efficient utilization of the light. The condensing lens assembly 230 is so adjusted as to focus the image of the filament onto a plane near the location of the projection lens 220.

The most immediate operative element exterior of the light conduit 228 is the shutter S which extends over from its shaft 160 so that its marginal portion covers the opening of the mask M which covers the opening of the conduit 228 and the gap 235 in the shutter intermittently passes across the mask opening 240 for exposure at the proper timed interval. This relationship is probably best shown in FIGURES 18, 19 and 20 of the drawings, and it will also be seen particularly from FIGURE 19 how the master character disc D overlaps the shutter and the light tube 228 so that the selected character in its various faces and case representations may be brought into alignment with the light tube 228 and the gap in the shutter at the proper time. In order to isolate and embrace the radial row of modifications of the selected character, the mask M is provided which has an elongated opening 240 therein which is of a width and length to frame the various presentations of the selected character. In the exemplary embodiment illustrated in the drawings there are four of these characters, upper case and lower case in a primary face or font and upper case and lower case in bold face or secondary font. Other sets of characters in any desired combinations can be provided for any specific application, for example, mathematical signs, time table indicia, etc.

The mask M comprises a plate appropriately secured to a horizontal supporting bar 242 which is adjustably fastened to the box frame 114 as by means of the fastening element 243. The vertical mask M cooperates with the horizontal masking opening 212 to properly frame a single character image from the radial and circumferential rows on the master disc D.

It is necessary, for accurate reproduction, that the character disc D be held in rather accurate alignment with relation to the light beam of the optical system and at right angles thereto, and for this purpose the supporting cross bar or bracket 242 is provided with an outer guide wire 245 and the inner guide wire 246 which are bent to form a converging channel for the upper peripheral edge of the disc D. The inner guide wire 246 has an end portion 247 bent rather sharply to enter a guide slot 248 in the mask plate M.

From the above, it will be seen that with the proper synchronization of the movement of the character disc and the shutter with relation to the opening 240 in the mask M, images of the entire series of character representations will be projected outwardly by the beam of light from the source 225 passing through the light tube 228.

Now for the proper selection of characters both from the standpoint of face and case, there is provided the selective reflector system which has been designated generally by the reference character E.

This mechanism, which in essence comprises a pair of rotatable prisms together with adjustable support and controlling means therefor, is illustrated to best advantage in FIGURES 5, 6, 7, 16 and 30 and comprises a frame 250 having an upper horizontally extending portion 251 provided with a pair of machined openings 252 adapted to receive the projecting supporting rods 254, the inner ends of which are secured to the flange 255 of the box frame 114 as by means of the nut 256.

In order to secure the prism supporting frame 250 in proper position with respect to the rest of the optical system, set screws 253 pass through threaded openings in the ends of the frame portion 251 and bear against the supporting rods 254.

The prism frame 251 includes two outwardly and downwardly projecting spaced webs 260 (see especially FIGURE 5), and mounted for limited rotation in bearing openings in these web portions 260 are the upper and lower prism supporting shafts 265 and 266.

Each of the shafts 265 and 266 is cut away at its central portion as clearly shown in FIGURE 16, and upper and lower prisms 270 and 271 are mounted on these portions of the shaft as by means of the prism supporting plates 272 and the clamping straps 273. The prisms 270 and 271 are of course right angle prisms and the hypotenuse surface may be coated as desired to enhance the accurate reflecting properties thereof.

The upper shaft 265 has a settable spacing collar 275 thereon and a similar collar 276 is fixed to the lower shaft 266. Exteriorly of the bearing upon one side of the upper prism assembly, there is pinned to the projecting end of the shaft 265 a collar 280 to which is fixed a pair of diverging depending lever arms 281 and 282, best seen in FIGURE 6. The arm 281 is part of a movement limiting feature which includes the adjustable stop or abutment screws 284 and 285 which are threaded through projections 286 and 287 on one of the bracket webs 260, the flattened end 288 of the arm 281 adapted to come into abutment with the inner ends of the screws 284 and 285 to limit the swinging movement of the arm and thus the rotation of the shaft 265 which carries the prism 270.

The arm 282 is an actuating arm which is connected at its extreme end with a projecting pin 289 on the rotary solenoid 290, as by means of the coil spring 291. Another coil spring 293 connects the arm 282 with a fixed pin 294 carried by one of the frame plates 260 of the supporting frame 250 and serves to urge the arm 282 and thus the shaft 265 toward initial undeflected position when the solenoid 290 is not energized. The position of the parts under these conditions is shown clearly in FIGURE 6 of the drawings where the spring 293 serves to urge the end 288 of the arm 281 against the adjustable limiting pin 284. The prism 270 involved here is the so-called mixer shift prism, and when the parts are in the position shown in FIGURE 6 the selected type face is the more frequently used kind and for shifting to bold face or another alternative font the solenoid 290 is energized and the prism 270 swung so that the limiting arm 281 moves over to the other stop abutment 285, and the light beam is carried from the character in the selected row on the disc D into the lens system 215–220 and thus projected upon the film f through the various openings 212, 213 and 214.

A similar selective reflection of the beam of light through the optical system is accomplished for case shift. The shaft 266 which carries the case shift prism 271 has fixed upon its outer end a collar 300 probably shown best in FIGURES 5, 7, 16 and 30. Diverging arms are fixed to this sleeve or collar 300, the gauging arm 301 similar to the mixer shift arm 281 is provided with a flattened end portion 302 which is limited to movement between the adjustable screws 303 and 304 carried by suitable brackets on the frame plate 260 of the prism bracket 250. The manipulating arm 305 extending from the collar 300 is operatively connected by means of the spring 306 to the pin 307 on the rotary solenoid 308. A restraining spring 310 connects a pin 311 on the arm 302 with a fixed pin 312 to urge the prism toward normal position from which it is moved by the energization of the case shift solenoid 308.

Thus it will be seen that the lower prism 271 may be swung through a limited angle to properly select the upper case or lower case characters from the disc D to be projected upon the film f.

The actuation of the shift solenoids 290 and 308 will be described in connection with the general operation and circuitry of the typesetter.

To recapitulate with particular reference to FIGURES 20A and 20B, the course of the light beam through the optical system will be described.

As a photographic exposure is being made, a light beam emitted by the lamp filament 225a passes through the condensing lens 230, through the opening 235 of shutter S, through the opening 240 of the vertical mask M, and through the selected radial row of characters on the master disc D. It enters the case shift prism 271 which reflects it upward and into the mixer shift prism 270 which again changes the direction of the light beam directing it into projection lens 220 and thence to focus the character image on film f. At this point the horizontal mask 212 in the wall 208 of the film carriage serves to mask out the three unwanted characters in the projected light beam.

It will be readily understood that by suitable stepwise rotation of the prisms or by adding additional light beam deflecting means, more than four character rows can be placed on the disc and handled in like manner to that described herein.

*Master Character Disc Control*

It has been explained how the various forms of selected characters may be selectively projected upon the film by the case shift and the mixer shift, and the means for indexing the character disc accurately and quickly at a point where the chosen column of characters is in register with the beam of projected light in the optical system, will now be described.

Referring again to FIGURES 10–15 inclusive, the nature of the exemplary form of character disc or circular master plate D will be readily perceived. The guiding and positioning means involving the buttons 115 have already been described and now the accessories for providing certain electrical connections involved in the control circuitry and the stop or abutment devices will be set forth.

Radially outwardly from the guide buttons 115 is an annular conductor strip or band 320. This annular band or conductor ring 320 has radial extensions 321 at points spaced 120° apart around the disc and these extensions underlie the thin plates 322 at their ends. Stop pins 325 pass through openings 326 in the disc D and are each provided with a base flange 327 which bears upon the opposite side of the disc, this base plate being secured firmly to the upper plate 322 by means of the rivets 328 which pass through other openings in the disc.

At 330 in FIGURE 12 there is diagrammatically illustrated a resilient conductor strip, the end of which presses against the conductor ring 320 to maintain constant electrical contact therewith, and the purpose of this will be fully explained in the description of the circuitry.

Passing now to the disclosure of the control means for interposing stop devices for abutment by the stop pins 325 of the character disc D, it will be convenient to take up the character key train of mechanism where the description was discontinued at the seekers 489, the hooked upper ends 490 of which engage pins 27' on the key bars 27, each of which key bars through the cam action 12 energized by the power roll 21 effects a downward pull on one of the links 33, which in turn swings the bell crank 34, to which it is connected, in a clockwise direction as viewed in FIGURES 4 and 6 of the drawings.

Reference should now be made to FIGURES 16 and 23–28 of the drawings. Each bell crank 34 has its longer arm connected as by means of the link 35a with the depending arm 349 of a series of substantially T-shaped levers 350, one of these levers being provided for each character and key of the typesetter. These levers 350 are pivoted by their shorter arms 351 to a common arcuate pivot wire 352, the longest arms of these levers extending forwardly of the machine and designated by the numerals 355. The curved pivot wire 352 which is threaded through the openings in the fulcrum arms 351 of the T levers 350 is securely held in arcuate position on the depending rearwardly positioned bracket 360 associated with the frame 50c.

Depending from the forward portion of the framing structure 50c is the arcuate portion 372. Secured to the front surface of the depending arcuate casting 372 is an arcuate face plate 375 provided with a multiplicity of radially extending slots 376 within which are guided the respective long arms 355 of the T levers 350.

Another arcuate member 370 is secured to the lower forward face of the box frame 114, as at 371, FIGURE 24. The upper arcuate bracket 370 has associated therewith a downwardly depending strap element 380, which fits into a groove in the lower edge of member 370. The lower portion of the member 370 is notched as at 382 to correspond in number and registry with the slots 376 and the lever arms 355.

Confined for radial sliding movement within the slots 382 are the stop blade elements designated generally by the reference numeral 390. These elements are shown in three successive positions of operation in FIGURES 23, 27, and 28 and will be seen to comprise an outer vertical blade portion 391 and an inner parallel vertical blade portion 392. The outer portion 391 has a short narrow tongue 393 formed thereon and spaced slightly from the major portion of the blade, this tongue being the portion of the stop blade which is struck by the stop pin 325 on the master disc D.

The rearwardly positioned vertical portion 392 has a rounded lower end 394 which is aligned with the corresponding long arm 355 of the key actuated T-lever 350, as clearly shown in FIGURE 23. An opening 395 may be provided in this lower portion for the insertion of an appropriate implement to facilitate removal and adjustment of the blades.

The upper end of the rear portion 392 is pointed as at 397 and notched to form an undercut ledge or hook 398. The forward and rear portions 391 and 392 are joined by a bridging portion 399 which works in one of the slots 382 of the frame or bracket member 370.

All of the members 390 are normally urged in a downward direction by means of coil springs such as the one shown at 400 which is seated in a socket 401 formed in the frame 370 and has its opposite end bearing downwardly on the blade element 390 and guided or maintained in position by means of the small upstanding lug 404. In order to conserve space and to be able to position the numerous stop blades 390 as closely together as possible, the spring sockets 401 are staggered within the frame piece 370 as clearly shown in FIGURE 29 of the drawings, and the stop blades 390 are provided with spaced apart projections 404 so that alternate ones may be utilized as spring centering elements.

An inspection of FIGURES 21, 23, and 25 will reveal that the central portion of the box frame 114 is formed with a pair of downwardly projecting parallel flanges 408 which are shouldered to receive a pair of parallel grooved track members 409 which receive between them the slide plate or trolley 410, the track being secured to the box frame extension as by means of bolts or similar fastening elements, and anti-friction bearings such as shown at 411 being interposed between the slide 410 and the tracks 409. Bolted to the forward end of the slide 410 is the arcuate segmental latch plate 415. The lower arcuate portion of this latch segment is provided with an inclined surface 416 above which is a shoulder 417 and a further inclined surface 418, which is of greater forward extent than the lower surface 416, is formed above the shoulder 417.

A coil spring 420 extends between a spring post 421 set in the rearward end of the slide 410 and a bracket 422 which is suitably secured to a portion of the fixed framing of the machine. Thus the slide 410 and the latch plate 415 are resiliently urged forwardly at all times.

It will be understood that there are just as many stop blades 390 as there are character keys on the recorder and typesetter and of course the same as the number of characters depicted in one of the 120° sectors of the character disc D. It has already been explained that the disc shaft 125 continually frictionally urges the disc in one direction and thus when the disc is released, it will turn until it meets one of the stop blades 390 interposed in the path or orbit of one of the three stop pins 325, FIGURE 13. The stop blades 390 and the pins 325 are so interrelated with respect to the positions of the characters in the three font sectors on the disc that when a selected blade is moved upwardly into the path of one of the pins 325 against the urging of the coil spring 400, the pin 325 will abut the portion 393 on the stop blade and halt the rotation of the disc against its frictional drive, at the exact point where the corresponding character will be positioned in front of the light beam to be controlled by the shutter for proper exposure.

The action which produces this result is as follows. The selected T-lever 350 is swung by the key mechanism already described so that the long arm 355 moves upwardly in its slot 376, strikes the lower rounded end 394 of the corresponding stop blade 390, moves the blade upwardly against the urging of the spring 400 until the inclined surface of the hook portion 397 of the blade slides against the inclined surface 416 of the latch plate 415 urging the latch plate rearwardly against the effect of the spring 420. Of course, the actual retention of the stop blade in its effective upward position is effected by the latching of the ledge portion 398 of the stop blade upon the ledge 417 of the latch plate, and it will be understood that there is usually a previously positioned stop blade 390 suspended from the ledge 417 when a new blade 390 is brought into position. Now it is a novel and ingenious feature of the present invention to provide means whereby the positioning of a new stop blade serves to release the old stop blade from the latch plate 415 and permit it to drop to idle position. This is accomplished by having the new blade move upwardly beyond the position shown in FIGURE 28 so that the surface of the nose portion 397 slides up the longer inclined plane surface 418 of the latch plate and moves it further in a rearward direction thus permitting a previously positioned latch plate 390 to become dislodged from the ledge or shelf 417 and drop. This blade dislodging position is shown in FIGURE 27 of the drawings. After the previous blade has been dislodged, the new blade drops the short distance between the position shown in FIGURE 27 and that shown in FIGURE 28 to be suspended by the latch plate with the portion 393 disposed in front of the stop pin 325 on the disc.

In the case of repeat characters such as double letters in certain words, of course, the same T-shaped lever 350 will be actuated, but beneath the already elevated stop blade. However, the blade will be in its intermediate suspended position and the lever 350 will again move it upward through its extended position wherein it shifts the latch plate 415, but then immediately upon descent of the lever 350 it resumes its operative position suspended from the latch plate. It is obvious that this operation is somewhat faster than in the case of different succeeding characters since the procedure does not have to wait for re-indexing of the disc.

Another feature of this novel stop blade is the capability of adjusting each blade to a fine degree of accuracy for positioning the disc by bending the portion 393 out of the plane of the blade in either direction necessary to adjust the precise stopping position for the disc.

*Film Carriage Escapement*

The basic escapement features which characterize the Blodgett Patent 2,700,447 and best disclosed in FIGURES 14–18 and 69 and in columns 13–15 and 50 et seq. of that patent have already been referred to and the mechanism may be traced to the three escapement magnets designated in the Blodgett patent EM1, EM2, and EM3, and referred to in the present specification as LE1, LE2, and LE3.

The manner in which the carriage is permitted to move according to the width of characters, the spacing between words, and the corrections for justification are thoroughly disclosed in the Blodgett patents referred to and need not be repeated in any great detail here. It will be sufficient to point out that the main carriage of the machine corresponding to the platen carriage of the Blodgett device has been reduced to a rather skeletonized member in the present case which may be designated generally by the reference numeral 425. This stub carriage may best be seen in FIGURES 6, 7, and 32 of the drawings. It will be noted that the carriage frame is grooved upon either side as at 426 for the reception of anti-friction bearings 427 by means of which it may slide with ease in the tracks 428 carried by the main base frame of the machine. Of course, this basic carriage structure 425 is not to be confused with the film carriage F which is arranged to ride upon the guide rail 56 of the fixed superstructure by means of the small wheels or rollers 56'. However, the carriage 425 has an angular upwardly extending frame or bracket 430, and upon this frame there are mounted certain elements which proportionate the movement (such as character space tabulating and carriage return movements) applied to the base carriage 425 by the Blodgett escapement in transmitting it to the film carriage F; and, as will be described presently this variable movement may be adjusted for changes in the size of type used in the particular font with which the machine is operating.

The means for urging the base carriage 425 along its track, subject to the escapement controls, comprises a tape 460 which may be secured to an angle bracket 461 of the carriage 425. See particularly FIGURES 6, 7 and 8 of the drawings. From the point of securement to the bracket 461, the tape extends along the carriage to the left-hand end thereof and then passes around a guide roller or pulley 463 and from there to a pulley 464 and thence around the spring wound tape drum 465, the drum being mounted upon the bracket 466 and the spring housing 467 being further supported by the bracket 468.

FIGURES 38, 38A and 39 of the drawings of the present case are enlarged selected details of portions of FIGURES 14–16 of the Blodgett Patent 2,700,447 and others and in these figures there will be recognized the principal portions of the Blodgett elements and the same reference characters will be used but with the addition of primes. The appropriate references to the specification of the Blodgett Patent 2,700,447 are columns 13–15. Thus the general framing is indicated at 127' and comprises a portion 134' and the upper frame plate 197'. The familiar ratchet wheels are shown at 130', 131', and 132'. Other elements to be seen are the loose dog 161', the dog rocker plate 195', its lug 203', the resilient stops 206' and 207' mounted on the adjustable arms 208' and 209'.

Projecting to the left in FIGURE 38 from beneath the frame plate 197' are portions of the rocker plates 195' comprising the escapement dog carrier assembly. (See also FIGURE 38A.) These projecting arms 195'' are connected to a part of the fixed frame portion 127' by means of the springs 440 which serve to urge the several rocker assemblies into normal idle association with the escapement ratchet wheels 130', 131', and 132'.

Dog carrier arms 442 also extend from the rocker assemblages into the path of movement of the trip slide member designated generally by the reference numeral 445 and comprising an angle plate having a flange 446 upon which are adjustably mounted the studs 447. The slide member 445 is suitably supported by a portion of the frame 127' and the other flange 448 thereof is connected as by means of the bell crank 449 with the link 450 connected to the core 452 of the escapement solenoid 455. As shown in FIGURES 6 and 8 the escapement solenoid 455 is carried by a bracket 457 secured to a fixed portion 458 of the base frame 50.

When one or more of the escapement magnets LE1, LE2, and LE3 are energized, the corresponding dog carrier arms 442 are depressed and interposed in the path of the corresponding studs 447 of the slide member 445, and the escapement is set for actuation.

Then, when the solenoid 455 is energized, the trip slide 445 is moved against the resilient resistance of the coil spring 457 which connects a pin 458 on the fixed frame with a pin 459 on the slide, so that the studs 447 contact such dog carrier arms 442 as have been depressed by the selective actuation of the magnets LE1, LE2, or LE3. Those dog carriers 442 and the rocker assemblies 195' to which they are connected are thus swung in a direction to effect the appropriate escapement movement of the respective escapement ratchet wheels 130', 131', and 132', by the inter-action of the dog and stop elements as clearly described in the Blodgett Patent 2,700,447.

In FIGURE 38A there will also be recognized the linkage (here designated 470) connecting the escapement ratchet with the escapement magnet (LE1), all fully disclosed in the Blodgett patents.

Now it will be readily understood that for any change in type size, it may also be necessary to vary the escapement movement of the film carriage. With a fixed setting of prisms and focusing of lenses in the optical system, size changes in the typesetter may be effected by the substitution of one master disc for another and a corresponding change in the proportioning escapement means for the film carriage. It is also conceivable that with a given disc, alterations in size of the projected image may be effected by adjustment of the optical system, and this, too, will necessitate a proportioning adjustment of the movement of the film carriage F with relation to the basic carriage 425–430.

This proportioning gearing will now be described with particular reference to FIGURES 6, 7, and 30–33B inclusive. Upon the upper portion of the main carriage bracket 430 there is fastened a rack 475. Detachably secured to one side of the hollow frame 210 of the film carriage F, as by means of the fastening means 476, is the bracket 477. Extending rearwardly from this bracket is an axle or gear shaft 478 which carries two gears which, in FIGURES 31 and 32, are designated 480 and 481. The outer gear 481 meshes with the rack 475 carried by the basic carriage 425–430 while the inner gear 480 meshes with a rack 483 which is secured at one end by means of the connection 484 to a bracket arm 485 which extends from the upper rearward side portion of the base frame 50, this bracket arm being shown best in FIGURE 7 of the drawings. This fixed rack 483 actually functions as a fulcrum for the gear combination 480—481 but need not be fixedly secured except at one of its ends. Directly above the point of tangency of the gear 480 with the rack 483 a guide bracket 488, which is secured to the frame 210 of the film carriage F as by means of the fastener 495, embraces the rack 483 in order to maintain the rack in engagement with the gear 480. For this purpose the end portion of the bracket 488 is notched to slidingly receive the rack and clamp it upon the gear.

The pairs of gears 480—481 are arranged in the proper diameter ratios to give the desired variation in escapement as between that permitted by the escapement magnets to the basic carriage 425, and the desired movement actually to be given the film carriage F. Obviously the rack 483 is the fulcrum member, the rack 475 provides the input motion and the substitutable or interchangeable gearing assembly 477–481 moves with the desired output motion and is therefore mounted on the film carriage.

It will be noted that in FIGURES 6 and 7 of the drawings the two gears 480a and 481a are of the same diameter and this arrangement in the particular machine illustrated constitutes a setting for six point units of escapement assuming that the basic carriage 425 is geared for twelve point movement. Very obviously the much more disproportionate sizing of the gears in FIGURES 31 and 32 will give a different point ratio of escapement.

In the fragmentary view afforded by FIGURE 33 of the drawings, the gearing is so arranged as to effect an enlargement of the movement of the film carriage in relation to the movement of the main carriage rather than a reduction as effected in FIGURES 31 and 32. In this embodiment the gearing assembly generally designated 500 comprises the bracket 501 secured by means of the fastener 502 to the basic carriage bracket 430 and the gears 480b and 481b. The same guide bracket 488 is used to clamp the fixed rack 483 to the gear 480b, but the gear 481b rides upon a rack 505 which is secured as at 506 to the frame 210 of the film carriage F. Thus in this arrangement the gear combination unit 500 is given the input motion and the rack 505 the output motion.

The proper selection of gear ratios for effecting the desired variation in point size will be readily understood from FIGURE 33A wherein the fixed rack 483, the gears 480 and 481, and the input rack 475 are shown diagrammatically corresponding to the set-up illustrated in FIGURES 30 and 31. The radius of the gear 481 is designated $R_2$. Erecting a triangle on the vertical radius summation and the horizontal line of the rack 475, and letting the base represent $\Delta$-input, the quantity $\Delta$-output will be indicated by the horizontal line extending to the right from the center of the gear assembly, and the following equation will be found to be true.

$$\Delta \text{ output} = \Delta \text{ input } \frac{R_2}{R_1 + R_2}$$

since

Δ input = 12 points (main carriage escapement value in embodiment disclosed herein)

and

Δ output = desired type set and since $R_1$ varies proportionately with $T_1$,
and $R_2$ varies proportionately with $T_2$ (where $T_1$ and $T_2$ are the number of teeth in the respective gears);

then the desired type set $= 12 \times \dfrac{T_2}{T_1 + T_2}$

Since the racks 475 and 483 are disposed at a fixed distance apart, $R_1$ plus $R_2$ is a constant. Therefore $T_1$ plus $T_2$ is a constant and thus as the number of teeth $T_1$ increases the number of teeth $T_2$ decreases and vice versa.

One example of a set gear system which has been employed to advantage in the type-setter is set forth below. It is based on the twelve point escapement of the particular basic carriage used, which involves five 1/32 inch units. The total number of teeth in both gears is selected as ninety-six in order to provide the smallest increment of size change of one-sixth of a point on the reducing system.

Therefore set size $= 12 \times \dfrac{T_2}{96}$ $$= \dfrac{T_2}{8}$$

and $T_2 = 8 \times$ set size

| Desired Set Point Size | Ratio Down from 12 pt. Escapement | Gear Teeth $T_2/T_1$ (32 pitch) |
| --- | --- | --- |
| 5 | 5/12 | 40/56 |
| 5¼ | 21/48 | 42/54 |
| 5½ | 11/24 | 44/52 |
| 5¾ | 23/48 | 46/50 |
| 6 | 1/2 | 48/48 |
| 7 | 7/12 | 56/40 |
| 7½ | 15/24 | 60/36 |
| 8 | 2/3 | 64/32 |
| 9 | 3/4 | 72/24 |
| 10 | 5/6 | 80/16 |
| 10½ etc. | accomplished by double escapement operation | |

The same reasoning will develop the principle of selection of the enlargement gearing shown in FIGURE 33 and this is diagrammatically illustrated in FIGURE 33B of the drawings. In this arrangement, the gear assembly becomes the input mechanism and the rack 505 the output.

Thus $$\dfrac{\Delta \text{ input}}{R_2} = \dfrac{\Delta \text{ output}}{R_1 + R_2}$$

and $$\Delta \text{ output} = \Delta \text{ input} \dfrac{R_1 + R_2}{R_2}$$

and $$\text{desired type set size} = 12 \times \dfrac{T_1 + T_2}{T_2}$$

$$= \dfrac{12 \times 96}{T_2}$$

and $$T_2 = \dfrac{1152}{\text{desired set size}}$$

As before, the total number of teeth $(T_1 + T_2) = 96$.

| Desired Set Size | Actual Set Size | Ratio up from 12 pt. Escapement | Gear Teeth $T_2/T_1$ |
| --- | --- | --- | --- |
| 14 | 14.05 | 96/82 | 82/14 |
| 16 | 16.00 | 96/72 | 72/24 |
| 24 | 24.00 | 96/48 | 48/48 |
| 36 | 36.00 | 96/32 | 32/64 |
| 42 | 42.66 | 96/27 | 27/69 |
| 60 | 60.63 | 96/19 | 19/77 |

The sizes given in the above tables are not exclusive, a number of interpolations or extensions of the tabulations being possible. Also, a 1:1 ratio of movement of the two carriages may be attained by locking the carriages together by means of a tie bar; or by choosing a 1:2 ratio by gear selection and then operating by double escapement as will be described.

Film Support and Vertical Feed for Line Spacing

The film carriage F has been broadly described in connection with the earlier figures of drawing, and certain of the details of the framework of this travelling assembly have been described in connection with FIGURE 16. This frame 210, as already explained, is arranged for travel along the guide rail 56 by way of the angled wheels or rollers 56' at the upper and lower portions thereof. A labyrinth type light seal is provided at 510 and 511 between the surfaces of the rail 56 and the front wall of the box frame 210, upon either side of the light openings 213 and 214.

The film f, as already mentioned, is confined and held in planar position, between the removable backing plate 211 and the rear wall 209 of the frame 210, for proper exposure through the horizontal mask opening or slot 212. The opening between these two plates at the lower edges thereof is somewhat enlarged as at 514 for the reception of the tangential mouth or nozzle portion 515 of the lower film container 516 in which is deposited the unexposed film roll 517 for feeding through the machine. The extreme end of the mouth or nozzle portion 515 may be provided with sealing strips of felt or other material indicated at 518, in order to provide a light seal at the juncture of the film container and the film carriage opening. The box frame 210 is provided with an upper compartment 520 which is located between the upper part of the back plate 211 and a top plate 521, and this compartment contains film feeding mechanism which will be described presently. The upper forward portion of the box frame is provided with a slot or opening 522 similar to the opening 514 at the bottom of the carriage for the reception of the mouth 523 of the upper film receiving container 525 which is of somewhat similar construction to that of the lower container 516.

The construction and supporting structure of the lower film container 516 will probably best be understood from an inspection of FIGURE 31 of the drawings. Extending downwardly from the box frame 210 upon one side of the carriage is a bracket 528 from which extends a pivot or trunnion pin 529. Upon the opposite side of the frame there is pivoted a bracket bar 530 as upon the pin 531. (See FIGURE 7.) The upper end of the bar is notched as at 532, to receive the clamping screw 535 when swung to upright position in alignment with the angle of inclination of the carriage. The lower end of the swinging bar 530 is provided with an opening into which is threaded a screw 536, the screw having a knurled head 537 for manipulation whereby the pintle end 538 may be moved into a socket in the end of the film container tie rod 540. The opposite end of the rod 540 is socketed to receive the stationary pintle 529 carried by the bracket 528.

The raw film container 516 is provided with end closures 542 and 543 having screw threaded opening into which the rod 540 is threaded. A lock nut 538a secures one end cap to the rod 540. The other end closure is removable by unscrewing from the rod. Both end caps have light-tight connections with the body portion of the container 516 as by means of a groove in the end cap in which the body portion enters and seats.

It will be readily seen that upon backing off the pintle screw 536 and swinging the bracket 530 aside, after loosening the clamp screw 535, the container 516 may be removed for replenishment, and then re-applied to the brackets by the reverse process.

Now referring more particularly to FIGURES 17 and 17A of the drawings, it will be seen that the upper film container 525 which is adapted to receive the exposed film is of a similar shape to the lower one so far as its cylindrical configuration and the provision of the nozzle or mouth portion are concerned. However, the end closures and the mounting of the film are somewhat different.

A film reel 550 has trunnion ends 551 and 552 adapted to be received in openings provided in the end closures 554 and 555, these end closures having light-seal connections with the cylindrical wall of the container 525 as suggested at 556.

Extending through a bracket portion 558 of the box frame 210 is a trunnion mounting screw 560 having a knurled head 561 and a pivot pin 562 adapted to extend into a recess in the trunnion portion 551 of the reel 550. This screw can be backed off to release the film container in the same way as described in connection with the container 516 at the lower end of the frame.

At the opposite end of the film container 525, a pin 563 is driven through the trunnion element 552 so as to extend diametrically across the tubular opening 564 therein. Mounted in a bearing in the frame part 565 at this side of the machine is a shaft 566 which is surrounded by a collar 567 interposed between the frame part 565 and the end of the trunnion portion 552. The inner end of the shaft 566 is bifurcated as at 568 to straddle the pin 563 and provide a driving connection for the film reel 550. This reel drive is a frictional drive affording a certain amount of slippage and will be described in detail presently.

Referring now more particularly to FIGURES 30 and 31 of the drawings, where a portion of the top of the film carrier frame has been removed or broken away, it will be seen that a shaft 575 extends through the compartment 520 from one side to the other of the frame. This shaft is mounted for rotation in suitable bearings in the end walls of the frame and carries a pair of toothed feed wheels 576. These feed wheels are provided with serrated flanges 577 which overlie the margins of the film f and serve to press them against two anvil surfaces 580 constituting removable and adjustable parts of the inner surface of the rear wall 211 of the film carriage box frame 210. It will be readily seen that upon rotation of the feed wheels 576 in the direction of the arrow in FIGURE 16 the film f will be moved upwardly through the space between the walls 209 and 211, and unwound from the container or magazine 516. At the same time the film will be wound upon the reel 550 in the upper container or magazine 525 by means to be described later. A leader strip, which may well be made of suitable plastic material, may be secured to the reel 550 and extend into the carriage housing where the trailing end thereof may be secured to the upper edge of the film by suitable means such as adhesive tape, and thus serve to draw the initial portions of the film into the upper container 525 to be wound upon the reel 550.

To accommodate films of various widths, at least one of the feed wheels 576 is adjustable along the shaft 575, preferably the right-hand wheel as viewed in FIGURE 31 since it is convenient to maintain a fixed left-hand position for the edge of the film. It will be noted from an inspection of FIGURE 30 that the inserts 580 are shouldered as at 581 to provide guides for the edges of the film during its vertical movement, as well as to provide anvil or backing-up surfaces for the margins of the film under the feeding pressure of the toothed feed wheels 576. The backing plates 211, as already mentioned, are removable and interchangeable. For this purpose they are detachably secured by means of the fastening elements suggested at 211A. Plates with variously spaced inserts 580 will be kept on hand for use with corresponding widths of film, say 5¾ inches, 7¾ inches, etc.

An important precision film-driving feature involves the training of the film about the wheels 576 through an appreciable arc (about 90° in the present example). Thus the teeth of the wheels, which are relatively sharp and closely spaced, make small indentations in the film as they press it against the anvil surfaces 580 and remain in meshing contact with these indentations until the resilient tension applied to the film by the reel 550 pulls the film away from the feed wheels.

Very obviously the movement of the film upwardly in the carrier F serves to effectuate line-to-line spacing, by bringing another area of the film within the field of projection of the images through the ultimate horizontal mask opening 212, and this upward movement or feed of the film must be gauged accurately for the desired line spacing of the composition being prepared. Conveniently, this feeding of the film for line-spacing is effected to the desired graduated degree by mechanism associated with the carriage return devices of the machine.

Referring now more particularly to FIGURE 8 of the drawings, the carriage return power mechanism will be described in connection with the clutch 100 which has already been mentioned. In this connection, it will be necessary to refer to the Blodgett Patent 2,700,447 and more particularly to FIGURE 22 thereof and the corresponding portion of the specification occurring in columns 16–18 inclusive of that patent. As described therein, the carriage return ribbon reel, which is designated herein by the reference numeral 600, is rotatably mounted upon the right-hand end of the power shaft 96 which carries the rubber covered power roll 21. Immediately adjacent the reel 600 is a clutch disc 601 which is pinned to the shaft 96 for rotation therewith. In the normal non-operative position of the clutch, the adjacent face of the clutch disc 601 has little or no operative influence on the confronting flange 602 of the reel 600. The opposite face of the clutch disc 601 is adapted for contact by an axially slidable plate 603 so that when pressure is applied to move the plate 603 inwardly against the clutch disc 601, a driving connection will be established between the confronting faces of the clutch disc 601 and the flange 602 of the carriage return tape reel. Clutching pressure is transmitted to the plate 603 through a sleeve 604, the outer face of which is engaged by the end of the toggle arm 605. The mechanism for actuating the toggle, and the remainder of the clutch system whereby the power from the roll 21 is transmitted to the carriage return tape reel 600 in order to wind up the tape and pull the carriage, is fully described in the Blodgett specification referred to. However, it should be made clear herein that there is a clutch pulley spring 607 interposed between the frame of the machine and the tape reel or pulley 600 which exerts a pressure against the rotation of the reel or pulley, which serves to hold the carriage return tape or ribbon 610 taut when the clutch is not operating, as during the composing of a line.

As will be seen in FIGURE 7, the tape 610 is led from the reel 600 around the pulleys 615 and 616 carried by the base frame 50, by means of which pulleys the tape is given two right-angle turns and is directed across the machine as very clearly disclosed at the bottom of FIGURE 31 of the drawings, whence the tape passes around the angled pulley 617 and the further pulley 618 which gives it an upward course toward the vertical stepping mechanism for the film.

In order to make use of the energy of the carriage return operation as transmitted by the tape 610, to effect line-to-line feed of the film and pull the carriage back, the following mechanism has been devised. Reference should be made now most particularly to FIGURES 30, 31, 32, 34, and 35 of the drawings, where it will be seen that there is mounted upon the end of the film feed shaft 575 a gear 620, which gear 620 meshes with a smaller gear 621 which is a member of an assemblage of gears mounted on a stub shaft 622 secured to the box frame 210 of the film carriage. A centrally disposed larger gear 624 forms one of the gears of the assemblage carried by the shaft 622 and this gear meshes with a smaller gear 625 which, as clearly shown in FIGURES 34 and 35, is carried by a sleeve or bushing 626 rotatably mounted on the thicker portion of a stub shaft 627 secured to the frame 210 as by means of the nut 628.

Returning now to the gear assemblage on the stub shaft 622 (see FIGURE 30), it will be seen that an inner smaller gear 630 is also fixed to this assemblage and meshes with a gear 632 rotatably carried upon the end of the film wind-up drive shaft 566 (see FIGURES 17 and 17A).

In order to exert a frictional feed upon the windup film reel 550 a slip clutch mechanism is provided which consists of a yieldable clutch liner disc 634 which is backed up by a plate 635 which has a slotted flange through which a pin 636 extends and by which it is made to rotate with the shaft 566 but has limited longitudinal sliding movement thereon. The plate 635 presses the disc 634 against the gear 632 by virtue of the coil spring 638 which seats against the sleeve or collar 639 fixed to the shaft 56. It will thus be seen that a certain slippage is provided between the drive gear 632 and the film reel wind-up shaft 566 which allows the proper tension to be applied without tearing the film or interfering with the positive feed effected by the toothed feed wheels 576 by the feed shaft 575.

Returning now to the gearing associated with the carriage return tape 610 it will be readily seen from FIGURES 31, 32, 34, and 35 that the tape is carried around the film feed tape drum 650 which rotatably surrounds the stub shaft 627. Inwardly of the tape drum a shouldered disc 651 is securely fastened to the shaft 627 as by brazing 652. The assembly 627 and 651 is fastened to the frame 210 by means of the nut 628 as shown in FIGURE 34. The disc 651 has a stepped periphery which mates with the inner periphery of an annular indexing control disc 655, as at 656. The plate 651 is normally fixed with respect to the frame 210, but by loosening the nut 628, turning shaft 627 by means of a screwdriver in the slot in the screw 665 on the shaft end and then retightening the nut 628, the tension of the spring 657 can be adjusted.

The drum 650 is recessed to receive the spiral spring 657 one end of which is fixed to the disc or plate 651 as by means of the stud 658. The other end of the spring is secured as at 659 to the hub portion 660 of the tape drum 650.

Fixed upon the bushing or sleeve 626 which carries the gear 625 is a ratchet wheel 662. The elements 625, 626 and 662 are thus fixedly secured together for rotation as a unit upon the shaft 627, the end of the shaft being provided with the washer 663 and the kerfed screw head 665.

As best seen in FIGURES 32 and 35, one flange of the tape drum 650 is provided with a projection 670 which carries a pin 671 upon which is mounted a pawl 672 which is urged in a clockwise direction, as viewed in these figures, toward engagement with the teeth 673 of the ratchet wheel 662, by means of the spring 674. The other flange of the tape drum 650 is provided with a stop projection or abutment 675. The indexing control disc 655 is provided with a corresponding stop abutment 677 on its outer face, and around its periphery it is provided with kerfs or notches 680; the end notches, for the purpose of more particular designation, being indicated by the reference numeral 680a and 680b.

Mounted upon the side frame portion 210 just below this rotary indexing assembly is a box-like bracket 685 which encloses a pull button or pin 686, the inner end of which also passes through an opening in the frame 210. Fixed to this adjusting pin 686, as by passing through a slot therein, is the indexing key or blade element 688. This key projects upwardly through a slot 689 in the top of the box 685, and the headed operative end 690 of the key is adapted to enter any selected one of the kerfs or notches 680 of the indexing control disc 655, the disc being rotated to the appropriate point for this purpose. The key and pin assembly 686–690 is urged toward engaged position by means of the coil spring 691 disposed within the box frame 685.

Projecting upwardly from one wall of the box frame or bracket 685 is the holding dog or pawl 693 which prevents backward movement of the ratchet 662 when the driving pawl 672 is not propelling the ratchet. Also, extending upwardly from the top of the box 685 is the stud or abutment 695 which constitutes one of the limiting stops for the projection 675 of the pawl-carrying tape drum 650, the abutment 677 on the indexing ring 655 being the other limiting stop, as will be described.

Now with the detailed structure of the film indexing and feeding mechanism set forth, the operation of the device will be described. At the end of the predetermined travel of the carriage 425–430, together with the superimposed film carriage F, the mechanism described in the Blodgett patent particularly in connection with FIGURE 22 thereof and adverted to in connection with the clutch 100 in FIGURE 8 of the present application, initiates the carriage return by the winding-up of the tape 610 upon the tape reel 600 which causes the tape to pull upon the drum 650 and rotate it in a clockwise direction. The spring 674 will of course urge the ratchet driving pawl 672 into engagement with the teeth 673 of the ratchet 662, and thus through the ratchet cause the gear 625 to drive the gear 624 and its companion gears 621 and 630 which will respectively rotate the gear 620 upon the film feed shaft 575 and the gear 632 on the film wind-up shaft 566, all of which will have the effect of rotating the toothed feed wheels 577 and moving the film vertically through the exposure compartment and exerting a frictional wind-up force upon the reel 550 within the upper container or magazine 525.

Now this degree of feed must be regulated with a high degree of accuracy according to the desired spacing between the lines of the composition and for this purpose the indexing control disc 655 is rotated manually to a desired setting wherein the key head 690 is disposed within one of the kerfs 680 to hold the disc 655 in the selected position. Each of the kerfs 680 is marked with an indication (as suggested in FIGURE 35) of the point sizes of the line spacing desired. It will be noted that the terminal notch or kerf 680a affords the widest spacing and is marked "16" while the opposite terminal kerf 680b is marked "4". These markings indicate the spacing desired, and it will be seen that when the device is set so that the key 690 is received within the end kerf 680b the travel of the abutment 675 on the drum 650 will be at its shortest distance between the fixed abutment 695 on the box 685 and the closest position of the adjustable abutment 677 carried by the indexing control disc 655 and thus the degree of rotation of the ratchet 622 and of the ultimate film feeding wheels 577 will be at a minimum of four points.

On the other hand, as suggested in FIGURE 32 of the drawings the key head 690 is inserted in the notch 680a of the disc 655 and the maximum distance between lines will be effective due to the travel of the tape drum projection 675 all the way from the fixed abutment 695 around to the abutment 677 which, as will be seen in FIGURE 32, is very close to the fixed abutment 695. Thus, the drum 650 can rotate to drive the ratchet 662 through an arc of almost 360°.

It will be noted that the blade 693 which acts as a holding dog or pawl for preventing reverse movement of the ratchet wheel 662, is bifurcated and one of the tines is shorter than the other. Thus, the tines do double duty in alternately entering behind the ratchet teeth and thus the ratchet wheel need be provided with only half the number of teeth as would otherwise be required, and each tooth can be longer which is an advantage both in manufacture and in operation of this portion of the device.

For manually feeding the film upwardly from line to line when desired, a knob 700 is fixed to the end of the feed shaft 575 opposite to the gear 620. For purposes of indicating the position of the feed shaft at any time a disc 702 may be fixed to the frame inwardly of the manually adjusting knob 700 and a pointer 703 carried by the shaft and indicating by its position with relation to graduations on the dial 702 the adjusted position of the feed shaft and the film. (See especially (FIGURE 7.)

Means for keeping track of the amount of film used is shown in FIGURES 2, 6, and 30 of the drawings and takes the form of a counting mechanism indicated generally at 710 secured to the frame as by means of the bracket 711 and having a gear 712 meshing with the feed shaft drive gear 620, so geared as to indicate film usage in inches.

*Miscellaneous Auxiliary Elements and Accessories*

Referring now to FIGURES 8, 36, and 37, the connection of the novel electrically actuated shift devices with the basic shift mechanism of the Blodgett machine will now be described.

When the upper case shift bar is actuated either by a key on the keyboard or by the normal coded tape actuation, the appropriate power cam assembly 725 (see FIGURE 36) will be operated by the power cylinder 21 to cause the link 726 to pull on the rocker arm 727 which is pivoted as at 728 to a horizontal portion 729 of the bottom of the frame of the machine. The rocker 727 has a flange 730 thereon which is disposed above a tubular guide 731 set in the frame portion 729 which guide houses a plunger rod 732, the lower end of which is disposed above the lower leaf 733 of a spring switch assembly 735 and bears thereon through the piece of insulating material 733'. This switch includes also the upper leaf 734. The leaves 733 and 734 are provided with contact points 736 and the normal resiliency of the leaves would urge the lower leaf 733 upwardly into contact with the upper leaf 734 were it not for the downward urgency of the rocker 727 and plunger 732 under the influence of the spring 737 which connects the part 730 of the rocker with an appropriate fixed portion of the framework 729. Thus the switch 735 is normally in open position, but upon the actuation of the upper case shift mechanism the rocker 727 will be rotated in a clockwise direction as viewed in FIGURE 36 which will relieve the pressure of the spring 737 and permit the switch to close for a short period of time during the cycle of operation of power cam assembly 725.

The mode of attachment of the switch 735 to the underside of the frame of the device is indicated in the left-hand portion of FIGURE 8 of the drawings where the switch leaves are held by the insulating block 738, and the whole is secured by means of the bracket or plate 739 to the frame.

The train of actuation of the shift devices embodied in the optical system will be traced in the detailed description of the circuitry.

The lower case actuation is initiated in a quite similar manner (see FIGURE 37), the power cam mechanism 740 being connected by the link 741 with the rocker 742 pivoted as at 743 to a portion 744 of the frame of the machine. A flange 745 of the rocker is disposed above a tubular guide 746 set in the frame portion 744 and housing a plunger rod 748 which contacts the upper leaf 749 of the switch designated generally by the numeral 750 which is in a circuit which controls the shift to lower case. The switch 750 includes a lower leaf 752 and the contact points 754 of the leaves are normally closed by the urging of the rocker 742 in a clockwise direction by means of the spring 755. The leaves 749 and 752 are inherently urged apart by their own resiliency when unaffected by the plunger 745.

This switch 750 includes the installation block 760 secured by means of the plate or bracket 761 to the underside of the machine as shown in the right-hand portion of FIGURE 8 of the drawings.

Just beneath the showing of the support for the switch 750, in FIGURE 8 of the drawings, there is disclosed a mixer shift actuating switch 765 comprising two spring leaves 766 which are normally spaced apart in switch open position. The element 767 is one of the selector slides of the code selector 13 and is adapted to be operated by the receipt of a mixer shift code signal, which as elsewhere described herein may be set up by the actuation of the color shift key of the A machine. The slide 767 through an insulating block 768 closes the contacts when actuated. The switch 765 is supported from the portion 458 of the frame by means of the bracket 769. The functional association of this switch will be understood in connection with the subsequent detailed description of the entire circuitry.

Referring now to FIGURE 5 of the drawings the instrument box G supported at the left-hand side of the machine carries a signal light 770, a switch manipulatable by means of the handle 771 and a second switch manipulatable by the handle 772 all of which will be described in connection with the circuitry. The box G also includes an indicating instrument 775 which affords a measure of the light intensity of the lamp 225. The means for measuring this intensity and transmitting it to the indicator 775 will be described in connection with the circuitry.

*The Circuitry Diagram*

Before describing the working of the novel type-setter by tracing its entire sequence of operations for imprinting a character upon the film, it will be well at this point to describe the various components and sub-combinations of the circuitry illustrated in FIGURES 40A and 40B.

Most of the circuitry shown in the diagram is for 90 volts D.C. current which is derived from the rectifier 79 shown in FIGURE 9 of the drawings, and wherever no voltage is indicated in the diagram it will be understood that the current carried is 90 volts. However, certain portions of the circuitry, notably those portions the conducting parts of which are exposed to the casual touch of an operator, carry 24 volts D.C., which may be considered as derived through the transformer 72 and the rectifier 73. A circuit from this source involves certain switches controlled by the cam I, and certain contact points on the master disc D. A line 800 is shown in FIGURES 40A and 40B as leading from the plus side of the 24 volt rectifier 73 to the relay RG which will be described presently.

In the portion of the circuitry designated FIGURE 40A, there will be readily recognized the master disc D, the shutter S, and the shutter and control shaft 160, which carries the clutch control hub 177 at one of its ends and also supports the three cams I, II, and III. Also shown on the circuit diagram are the shift solenoids, the clutch release solenoid, and the escapement solenoid, all of which will be mentioned in the description of the circuitry.

Reference is made at this point to the Blodgett patents, particularly Patent 2,700,447, FIGURE 71B, and columns 5, 13, and 47–53 of the specification of that patent, wherein the general circuitry of the basic justifying typewriter antecedent of the present typesetter is set forth. It will be noted that the six switches which are adapted to be actuated by the code selector 13 are designated in the Blodgett patent as ECA, ECB, ECC, ECD, ECE, and ECF and, as already mentioned, they are employed to selectively energize the escapement magnets EM1, EM2, and EM3 as designated in that patent. In the present application (see FIGURE 40B) the selector switches are denominated SE7, SE8, SE9, SE10, SE11, and SE12 and they serve to control the escapement magnets LE3, LE2, and LE1. Now three of the selector switches control the selection of the various combinations of escapement magnets for the proper widths of lower case characters, and the other three switches govern the combinations of escapement magnets to be energized for attaining the proper widths of upper case characters. The allocation of functions as thus described is accomplished by the relay RF which is adapted to be pulsed by the actuation of the upper case shift switch 735. The closing of switch 735 causes the case shift solenoid 308 to be energized by passage of current through the normally closed lower case contacts 750, and when the relay RF is pulsed the closing of contacts F1 serves to set up a holding circuit for the relay RF, which is not released until the normally closed lower case switch 750 is opened for effecting the shift back to lower case.

It will be observed from FIGURE 71b of the Blodgett Patent 2,700,447 that there is a pair of interconnected contacts designated CSC and described in column 13 of the Blodgett specification as comprising case shift contacts which are operated when the type basket of that patent is raised and lowered. It will be noted that the intermediate contacts of these groups are connected to (—) D.C. current and these switches find their counterpart in switching arrangements F2 and F3 of the present disclosure which are actuated by the relay RF and have similar central contacts connected to the negative side of the 90 volt circuit and designated J2 and J3. It will be readily seen how the actuation of switches F2 and F3 alternatively effects the proper selection of code selector operated switches SE7–12 according to whether or not the character is upper case or lower case.

It will be recalled that the escapement magnets are respectively set up to allow movement of the carriage a distance of one unit, two units, and three units of set or "set wise" spacing of the type character. Thus, we shall asume that the magnet LE1 releases the escapement for travel of one unit, LE2 for two units, and LE3 for three units. It is also understood that any combination of actuation of these magnets will give variable escapements of the one to six units upon which this particular system disclosed for purposes of illustration, is based. Following the wiring diagram it will be seen that code selector actuated switches SE7 and SE10 are associated with the one unit magnet LE1; switches SE8 and SE11 are associated with the two unit magnet LE2; and switches SE9 and SE12 are associated with the three unit magnet LE3; and these sets of switches are of course actuated selectively depending upon the case shift effectuated by relay RF through contacts F2 and F3. At RA, RB, and RC there are installed escapement hold relays which set up holding circuits through the normally open switches A3, B3, and C3, which not only prolong the energization of the escapement magnets LE3, LE2, and LE1, after the initial pulsing of these magnets by means of certain of the switches SE7–12, but the locking or holding circuit acts through the normally closed switches D3, D2, and D1 to keep the relays RA, RB, and RC energized for a suitable period of time.

Referring to the lower right-hand section of FIGURE 40A, there will be seen two switches 803 and 804 which, as will also be seen in the structural diagram comprising FIGURE 4 of the drawings, are supplemental switches added to the print reader common contact switch assembly which is shown at RCC in FIGURE 54 of Blodgett Patent 2,700,447, and adapted to be actuated along with the common contact upon the reading of any character or function code. The contacts of switch 803 are normally open and those of switch 804 are normally closed. More concerning switch 804 later. Switch 803 when closed energizes a relay RE which in its structure embodies a time delay on break of one hundred milliseconds, which is sufficient for its purposes taking into consideration the holding circuits added for prolonging the time for the accomplishment of the stated functions. Relay RE, through contacts E2, serves to break a circuit through the print reader clutch magnet LPR which is fully described under the designation PRM in the Blodgett Patent 2,700,447. The contact E1 sets up a holding circuit for the relay RE through the switches A2, B2, and C2 which are controlled by the escapement holding relays RA, RB and RC, and thus this branch of the print reader magnet circuit is held open until the escapement procedure has been completed.

For the purpose of releasing the shutter and cam control shaft 160 for its two partial revolutions per cycle by means of the successive release of the stops 180 and 181 on the control hub 177 by means of the clutch release solenoid 192, a circuit is provided through switch contacts G1 controlled by the relay RG which in turn is governed by switch Ia actuated by raised cam portion IA on cam I, this circuit being completed to ground through any one of the normally open switches A1, B1, and C1 which may be designated control shaft release switches concerned with the operation of the first portion of the control cycle of the shaft 160.

It will be seen that the depressed cam portion IB on cam I serves to close the contacts Ib which completes a 24 volt D.C. circuit through the contact 330 which is in rotary bearing relation with the annular contactor ring 320 carried by the master character disc D and which in turn is connected with each one of the three stop pins 325 on the disc. The stop pins, when they contact the stop blades 390, complete the circuit to ground and this (when switch Ib is closed) serves to pulse the clutch release solenoid 192 and release the control shaft for progression through the second portion of its cycle.

Cam III, by means of the raised cam portion IIIB, closes contacts IIIb which pulses the escapement solenoid 455 which permits the degree of escapement to be effected according to the selective energizing of escapement magnets LE3, LE2, and LE1, which has already been effected, and the actual escapement held in readiness for accomplishment at the proper time.

The depressed cam portion IIIA of cam III serves to close switch contacts IIIa which are in circuit with the escapement solenoid 455 and a preferably, manually actuated switch 771, so that when both switches IIIa and 771 are closed, the escapement solenoid 455 is given an additional pulse during the rotation of cam III and thus escapement is repeated and the amount of the spacing allowed multiplied by two. This is a very ingenious and convenient way of doubling the length of the escapement thus doubling the point size of characters, and usable either when a different character disc D is substituted or with the same disc where one font of characters thereon will require a spacing for character width which is double that of the other font.

In the upper portion of FIGURE 40A there is illustrated the sub-circuit involved in actuating the mixer shift solenoid 290. As already described, a code in the tape actuates a suitable key lever beneath the keyboard which operates the appropriate cam actuated selector slide 767 of the code selector assembly 13, which in turn serves to close the switch 765, for a short period of time, thus energizing the coil 805 of the rotary stepping switch 810 shown in diagrammatic form in this figure. A line 806 leads from the source of current supply (—90 D.C.) to the rotor 807 which carries the brush 808 which sweeps an insulating disc or wafer 810a bearing a series of contacts, alternate ones of which are connected to the line 809 which leads to the mixer shift solenoid 290. From the wiring of the rotary stepping switch it will be readily seen that upon each pulsation given the solenoid magnet actuator 805 the switch may be made to rotate one step and since each successive contact is connected for alternate energization and de-energization of the mixer solenoid 290, it will be readily understood that each alternate stepping of the switch 810 will shift from normal or primary font to the secondary font which may, as in this specific example, be bold face.

A conductor 811 connects the stepping switch with the signal lamp 770 which is thus illuminated whenever the stepping switch 810 is set for the reading of a character on the secondary font.

In situations where the alternate or secondary font requires just double the escapement of the primary font, the double escapement circuitry may very conveniently be brought under the control of the mixer shift stepping switch 810.

In FIGURE 41 of the drawings will be seen a supplemental diagram modifying the circuitry of FIGURE 40A to the extent of bridging over with a switch 814' the lead 811 from the mixer shift to the lamp 770, and the line 825 which connects the switch 771 with the cam actuated switch Ia. When the switch 814' is open, the usual single escapement will take place with the mixer shift operating normally to merely change over from the primary character font to a secondary character font. When, however, the widths of the characters in the auxiliary or secondary character font are multiples of the widths of the corresponding characters in the primary font, the switch 814' may be closed and each actuation of the ordinary steepping switch 810 which serves to energize the mixer shift solenoid 290 will also complete a circuit whereby the negative lead 806 is energized through switches 814' and IIIa to energize the escapement solenoid 455 and thus effect double escapement automatically whenever the mixer shift is set for bringing in the secondary font. The actuation of the switch 814' in FIGURE 41 is of course in alternation to the manual double escapement switch 771.

An alternative arrangement for the same purpose, while optional, is shown in the upper portion of FIGURE 40A where it will be seen that the stepping switch 810 of the mixer shift 290 is provided with a second annular series of contacts which are carried upon a separate wafer disc 810b of insulating material, as well known in the art. The brush 808' sweeps across these contacts to alternatively connect the (—) D.C. conductor 806' to the line 809' which leads to the switch IIIb. The line 809' has a manually operable switch 814 in it by means of which this particular double escapement system may be thrown into or out of operation. The effect of closing the switch 814 would be exactly the same as that of closing switch 814' of FIGURE 41 except that the brush 808' of the supplemental contactor 810 is out of step with the brush 808 of the main stepping switch 810 on its disc 810a so that the double escapement effect will be put in operation during the utilization of the primary font on the master disc D instead of the secondary font. Thus, this arrangement permits the primary font to be of the larger character width than the secondary font and provides for double escapement under these reversed circumstances.

It is also within the purview of this novel feature of the present invention to provide more than two camming portions on cam III and actuate the escapement system for triple or even quadruple escapement in different ratios of type size, say 1:2, or 1:3. By multiplying the depressed cam portions IIIA as well as the raised cam portions IIIB, ratios may be attained in the nature of say 2:3, or 3:4, for example.

Cam II, by means of the raised cam portions IIB, closes switch IIb which completes a circuit through relay RD which serves to break the holding circuit set up by relays RA, RB, and RC associated with the escapement magnets LE3, LE2, and LE1. Relay RD breaks this circuit through the opening of switches D3, D2, and D1; and upon de-energization of the relays RA, RB, and RC, the print reader hold circuit through A2, B2, and C2 is broken as well as the control shaft release circuit through switches A1, B1, and C1. This print reader circuit is set to close in accordance with the time delay inherent in the relay RE because of certain requirements previously alluded to.

Through the depressed cam portion IIA of cam II, the contacts of switch IIa are closed, which completes a circuit through the print reader control relay RH which holds itself energized, after initial pulsation by the switch IIa, through the contacts H1 and the normally closed contacts of switch 804 associated with the print reader common contact. The functioning of the relay RH closes switch H2 which initiates the subsequent action of the print reader control magnet LPR before it would be ordinarily actuated by switch E2 through the delayed action of relay RE, so that no time is lost in initiating the operation of the circuitry for the next character. However, the relay RH is held by the hold circuit including switches H1 and 804 until the next code comes up on the tape to be read. At that time the common contact RCC is again actuated, which also automatically opens switch 804 thus releasing relay RH and restoring it to normal position.

Lamp 225 receives its current from a circuit which includes the secondary of the transformer 71 and is adapted to be turned on and off by the switch 772 in that circuit. A rheostat 812 is inserted in the primary circuit of the transformer 71 for controlling the current supplied to the filament 225A of the lamp in accordance with the intensity of the exposure of the characters required.

In suitable visual association with the lamp 225 is the photo-cell device 815 which is connected by means of the conductors 816 with the recording instrument 775 which gives an indication of the intensity of the light emitted by the filament of the lamp 225. Manually adjustable means indicated at 820 is provided for effecting a zero adjustment of the instrument 775.

*Operation of Typesetter Machine*

In describing the electro-mechanical operation of the novel typesetter unit, it will be convenient to trace the actuation of the various parts and circuits involved in the printing of a capital letter "T", for example, in bold face or other secondary font, the machine being considered to be initially set for normal lower case running in a primary face. It will be convenient during this demonstration to refer to the time chart comprising FIGURE 42 of the drawings while following the circuitry of FIGURES 40A and 40B. Reference should also be made to the tape in FIGURE 3. It should be considered that the appropriate code signals on the actuating tape for the upper case bold face T are now coming up to be read.

Let it be assumed that the code for upper case shift has entered the print reader 16. As in the case of any code presented to the reader, the common contact RCC will be actuated at the start of the reading cycle and the rotation of the shaft of translator 14 initated. The switches 803 and 804 associated for simultaneous actuation with the common contact, will be respectively closed and opened. The closing of the switch 803 pulses the time delay relay RE which is set for 100 milliseconds delay on break. The actuation of this relay breaks the circuit to the print reader LPR by opening the switch contacts E2. The switch E1 is closed to partially complete a holding circuit for the relay RE which circuit also includes the switches A2, B2, and C2. These latter switches, associated with the escapement system, assure a furthe delay beyond the 100 millisecond delay of the relay RE for a character setting cycle, but the inherent delay of the relay RE is sufficient for the effectuation of the operations attendant upon registering or setting up the various shift functions. Thus, as clearly indicated in the time chart of FIGURE 42 the translator 14 comes into operation immediately and through the guidance of the upper case code (positions 6—3—4—5 in the tape 11 selected for illustration in FIGURE 3), the selected seeker 489—490 pulls the upper case key bar 27 which causes the associated cam 31 to contact the power roll 21 and, through the linkages 726–730 shown in FIGURE 36 of the present drawings, causes the normally open upper case switch 735 to close. This serves to energize the case shift relay RF which locks itself in by closing switch F1 in the holding circuit which also includes the normally closed lower case switch 750, this holding action on the upper case shift persisting until the lower case switch is open.

The switch F1 serves the dual function of establishing the above described holding circuit and of completing a circuit to the case shift solenoid 308 for swinging the case shift prism 271 (FIGURE 16) to project an upper case character from the proper arcuate row of characters on the disc D.

The energizing of the case shift relay RF also, through the selective operation of switches F2 and F3 chooses the three of the six code selector switches SE7–12, for upper case escapement, and of course breaks the circuit to the other three switches. These selector switches are not, however, actuated until a character code is read, as will be described presently.

The above described case shift has been accomplished within the time delay of the relay RE and when that relay drops out the print reader LPR is again actuated by the closing of switch E2 and the next code is read. In this example, it happens to be the mixer shift code which, through the translator 14 and the power devices, including selector slide 767, actuates the mixer shift switch 765 as shown in FIGURES 4 and 8. This causes the stepping switch 810 to move to the next alternate contact which completes a circuit through the mixer shift solenoid 290 to swing the prism 270 to select the proper pair of arcuate rows of characters comprising the secondary font for projection from the disc D through the ultimate mask 212 onto the film. This circuit is thus held until the stepping switch 810 is again pulsed to resume one of the alternate intervening switch points whereby the mixer shift solenoid 290 will be de-energized and the mixer shift prism will be automatically returned to primary font position by the spring retracting means provided. The relay RE again drops out and the print reader is re-energized.

Thus it will be seen that the operation of the mixer shift prism serves to select the pair of character rows corresponding to the desired type font on the disc, and the operation of the case shift prism serves to select either the upper case or lower case row of the selected font.

The device is now prepared for projecting a bold face capital letter, and the character code for the letter "T" is read (code position 5 on the tape 11). This causes the translator 14 to actuate the seeker 489—490 associated with the "T" key bar which is pulled to engage the associated cam 31 with the power roll, and what is more the selector 13 causes the proper selector switches (among the upper case ones SE10–12 already set up by the case shift relay RF through the switches F2 and F3) to be closed, thus completing a circuit or circuits through one or more of the escapement magnets LE3, LE2, and LE1. Through operations similar to those already described in connection with the preceding functional cycles, switch 803 is closed and switch 804 is opened.

Since contacts D3, D2, and D1 are normally closed, the completion of a circuit through one or more of the escapement magnets also completes a circuit through one or more of the associated escapement relays RA, RB, and RC. The energization of relays RA, RB, and RC causes the contacts A3, B3, and C3 to close which accomplishes a holding circuit through the selected escapement magnets which serves to preserve or freeze the appropriate length of escapement release until ready to be applied to the carriage, and the contacts A3, B3, and C3 also lock the relays RA, RB, and RC in.

The energizing of the relays RA, RB, and RC actuates the print reader hold contacts A2, B2, and C2 which serves to prolong the 100 millisecond delay effected by the relay RE.

The shutter and cam control shaft 160 comes into operation during this cycle of character setting and this is accomplished by completing a 24 volt circuit through relay RG, first by means of the closing of one or more of the switches A1, B1, and C1 through the energizing of relays RA, RB, and RC when the escapement system is called into operation. At the starting point of the rotation of the shaft 160 at the beginning of any character setting cycle the raised portion IA of cam I is holding switch Ia in closed position as shown in FIGURE 40A, and thus the circuit is completed through the relay RG which closes switch G1 to send a 90 volt impulse through the clutch release solenoid 192 to permit the control shaft 160 to rotate through the first 90 degrees of its cycle. As the control shaft 160 begins to rotate, cam I allows the initial contact Ia connected to relay RG to break, and clutch release solenoid 192 deenergizes, and the stop arm 188 is set to halt the rotation of the shaft upon contact by the projection 180.

Through the pulling of the "T" key bar by the seeker 489—490 the appropriate pivoted lever 350 is swung to bring the "T" stop blade 390 into a position which will release any previous stop blade by over-motion of the latch plate 415, the previous stop blade then releasing the disc D whereupon the rotation of the disc shaft 125 urges the disc forward until it contacts the new stop blade which will of course halt the disc at the letter "T" position of the nearest oncoming 120° font sector of the disc.

Cam I then has rotated sufficiently to bring the depressed cam portion IB to the point where the switch Ib is closed which brings in the 24 volt circuit from relay RG through the contact 330, the conductor ring 320 and the stop pin 325 on the disc D, and the stop blade 390, to ground. This re-energizes relay RG which again pulses the clutch release solenoid 192 for pursuing the second portion of the cycle which, in this example, occupies about 270° of the complete cycle. During the initial stage of this second portion of the cycle, the exposure opening 235 of the shutter is brought into position for exposure, and the image of the character "T" is projected by means of the optical system upon the film f through the various lenses, prisms, and masks provided as clearly shown in FIGURES 20A and 20B of the drawings.

Escapement action of the film carriage must now be effected and this takes place through the energizing of the escapement solenoid 455 which through its associated mechanism shown in FIGURES 38–39 permits the appropriate escapement magnets to effectuate the differential escapement of the carriage appropriate to the capital letter "T." This is accomplished through the contacts under the control of cam III. Single escapement for the purposes of the example now being described is effected by the closing of switch IIIb alone.

At this point, it may be appropriate to interpolate brief mention of the multiple escapement feature provided by the present invention. Double escapement may be effected through the actuation of switch IIIb and subsequently by actuation of switch IIIa by means of depressed cam portion IIIA. Other relationships of multiple escapement can be provided for by forming additional cam portions on cam III (either raised or depressed) for effecting additional operations of switches IIIa or IIIb. Thus, triple, quadruple, or greater escapements may be established, and various intermediate ratios set up for special font relationships on a given master disc. For example, if there is displayed on the same disc an eight point font and a twelve point font, the carriage gearing may be set for four point escapement, and an interchangeable cam III selected to give double escapement switching for the eight point font and triple escapement switching for the twelve point font.

Resuming the account of the composing of the capital "T" character, it will be understood that at an appropriate point timewise before escapement is complete, the next print reader operation is started by the rotation of cam II.

The depressed cam portion IIA closes switch IIa which completes a circuit through the print reader control relay RH, which through the contacts H2 pulses the print reader magnet LPR so that the next code in the tape may be read immediately after the end of the current cycle. A holding circuit for relay RH is set up at the same time by the closing of switch H1. This holding circuit includes the normally closed switch 804. Switch 804, it will be recalled, is arranged to be open when the print reader contacts operate thereby breaking the relay RH holding circuit. At a point during the cycle, raised cam portion IIB on cam II closes switch IIb which energizes relay RD, breaking contacts D3, D2, and D1, thus releasing all of the connections set up by the escapement system. Due to inherent lag in this deactivating of the escapement control system, this last named operation may be initiated before the actual completion of the escapement operation, thus effecting economy in time; see the time diagram which comprises FIGURE 42 of the drawings. Thus, the comprising of the capital letter "T" is completed and the mechanism already on its way to read the next code on the tape.

*Operation of the Typesetter System*

As exemplifying the versatile capabilities of the invention, certain practical composing procedures involving the novel typesetter system as a whole, will be now set forth.

The described features of the system, including the recorder A and the typesetter B, embrace novel means for automatic tape-operated shifting between at least two fonts of type in the typesetter machine, and color indication on the typewritten proof, when such shifting or font change has been keyboarded on the first machine or recorder. The automatic font shift can involve either or both type style and type size changes. Also included in the novel system are means provided in both the keyboard and photographic typesetter machines for facilitating convenient manual type style and size changes by changing type discs and interchangeable carriage escapement gears. Means are provided for making corrections at several points in the system. Means are also provided for convenient use of the most economical width of film or photographic paper in the film carriage.

For example, let it be assumed that the system had been set up for setting 14 point Bodoni with Italic on a 7½ inch measure; and a new job involving a 5½ inch measure with 8 point Newsface Light, 8 point Newsface Bold, and 12 point Franklin Gothic with 12 point Franklin Gothic Italic is to be run. The manuscript is marked up in accordance with the usual custom in typesetting procedure, and is received by the typesetter keyboard operator. Assume that the first line calls for 12 point Franklin Gothic set flush left on an over-all measure of 5½ inches. Referring to a table or a special 12 point unit scale provided on the keyboard or recorder machine, the operator sets the measure for a number of units which corresponds to a 5½ inch measure in the 12 point size. He marks the over-all measure at the lead end of the tape together with the type disc and change gear instructions and then proceeds to keyboard the line, having the non-justifying or flush left control button depressed. As he keyboards the line, the punched tape and the typewritten proof are produced. Assuming the 12 point Franklin Gothic is in the primary font position on the disc, the typewritten proof will be in black for this line. The operator marks the punched tape in pencil calling for the photographic typesetter monitor to use the 12 point Franklin Gothic type disc, the corresponding change gears, and the desired line feed to the next line.

Assuming that the next line is to be justified 12 point Franklin Gothic Italic on the same 5½ measure and that the interchangeable gears do not require changing, the operator first switches the machine for justified work. He then presses the color shift button on the keyboard. This places a color shift (font shift) code in the tape and moves the red portion of the typewriter ribbon into position. He then keyboards the line to produce the corresponding punched tape and a red typewritten proof line.

Assume that the two lines described above constitute a head and a running head, which are to be followed by an additional interline space of 18 points and then 8 point Newsface text matter.

The recorder operator then keyboards a stop code in the tape which will later cause the typesetter machine to stop automatically. He then feeds some blank tape by depressing the "tape feed" key button. On this blank tape he writes in pencil or ink the instruction to the typesetter machine monitor such as, for example, "Hand feed 18 points, change to 8 point change gears and 8 point Newsface with bold type disc." Then, referring to his chart or a special scale on the recorder machine he sets the recorder machine measure in units to correspond with the number of 8 point units which are equivalent to a 5½ inch measure on the finished work.

Following the manuscript he then proceeds to type the 8 point composition. The over-all measure of the typewritten matter being in the same typewriter size is larger than the preceding 12 point lines. As he nears the end of the composed line, a light on the keyboard indicates that the line is in justification range. He then completes the composition of the line by deciding on the ending word or hyphenation and presses the justify-carriage return button. This actuates the justification code punch, the carriage return code punch, and carriage return operation.

Should the operator at this point notice an error in the line he just typed he can operate a line-delete button which causes the typesetter machine to automatically skip the codes for that line. He would then proceed to rekeyboard the line, making the required correction both in the punched tape and on the typewritten proof.

In keyboarding the text matter, the operator depresses the color shift button to call for the companion bold face as required for an occasional bold face word or bold face line. Such operation results in punching a color shift (font shift) code in the tape and providing red typewritten proof characters where the companion or secondary face is called for. Should the companion face be of a different size, the typesetter machine would be set up for multiple escapement operation or manual change gear substitutions can be called for by a stop code in the tape and appropriate pencilled instructions on the tape. In such cases, the operator must also refer to his charts or unit scales so as to calculate the required change in units of measure so that the actual measure of the finished photo-composed type will be as desired.

The above described procedure results in two products from the keyboard or recorder machine: a coded and marked punched tape and a typewritten proof. The typewritten proof may be used for proofreading purposes in which case it will be marked for desired changes by the author or editor. It can then be returned to the keyboard or recorder machine for corrections. Corrections can be made here by making corrected lines in tape form and splicing the correct sections of tape into the original tape, removing, of course, any incorrect portions of the original tape. In this case the result is a corrected spliced tape to correspond to a marked corrected typewritten proof, the corrected tape being ready to run through the automatic typesetter machine for making the final draft composition.

If there are a large number of corrections and/or if a corrected proof is desired, it will be advantageous to use a second method of producing a corrected tape. The original tape requiring corrections is placed in the tape reader portion of the keyboard or recorder machine and by manipulation of the control buttons this tape is used to semi-automatically operate this machine to reproduce the correct portions of the tape and typewritten proof. When an incorrect portion of the composition is reached the machine is stopped by the operator and the correction is made by manual keyboarding. The operator skips over the incorrect portion of the tape by manual operation of the reader and then proceeds as before. This operation produces a corrected punched tape and a corrected unjustified typewritten proof.

It is a basic object in this novel system to provide as near perfect a punched tape as possible for the operation of the automatic photographic typesetter machine. The intent is to make the required corrections where they can be made easiest and to avoid where possible the need for making corrections by the more expensive and more difficult cutting and splicing of film or photographic paper. The corrected punched tape is used to operate the typesetter machine automatically.

In making the set up for running the tape as described above, the monitor may find it economical to change from 7¾ inch wide film to 5¾ inch wide film. In this case he would apply a supply container loaded with 5¾ inch wide film to the film cartridge to replace the 7¾ inch supply. He would also move one of the feed wheels and use the 5¾ inch carriage back plate and guide. The web to the receiving container is completed, for example, using an adhesive pressure tape to fasten the end of the film to the receiving container spool leader. Then, with the top carriage casing cover in position the machine is ready to run.

The punched tape is threaded to the reader and the appropriate interchangeable type disc and change gears are installed in the machine. The start-read button is pushed and the machine proceeds to set the first two lines of 12 point Franklin Gothic and 12 point Franklin Gothic Italic. Following the second line it will be recalled there is a stop code which stops the typesetter machine automatically. The monitor, noticing this, reads the pencil notation on the tape and proceeds to follow the instructions. As directed, he hand feeds 18 points by using the manually actuated film knob and dial on the film carriage. He then changes the type disc to "8 point Newsface with bold" and the change gears to the 8 point size as directed on the tape notation. Being now ready to proceed, he presses the start-read button and the machine proceeds to automatically compose the 8 point Newsface text portion of the work. Similar procedures are used to the completion of the job.

Should simple corrections or changes by cutting and splicing film be desired, these may sometimes be accomplished by manually keyboarding the required composition on the typesetter or B machine keyboard for later cutting and splicing. This keyboard is also useful in circumventing the need for operating the recorder keyboard when small amounts of non-justified composition are required or when the monitor himself may wish to write a production message directly on the film or photographic paper.

The resulting product of the above described operation of the novel apparatus provided by the present invention, is photographic film or paper which has been properly exposed to the projection of the characters forming the type matter to be printed, and therefore bears the latent image of the type composition. The film is progressively rolled up on the reel 550 in the light-tight container 525, and is eventually removed from the typesetter machine and developed by suitable means depending on the nature of the image formed. The developed film or photographic paper is then in condition for use in the usual photo-mechanical printing plate making procedures, whether for letter press, offset, or other printing systems.

It is understood that various changes and modifications may be made in the embodiments illustrated and described herein without departing from the scope of the invention as defined by the subjoined claims.

It is also understood that terms used herein are to be given the broadest interpretation of which they are susceptible in view of the prior art in this field; for example, the term "film" shall be understood to embrace any suitable photo-sensitive paper or other material; the word "tape" shall include any intelligence receiving and transferring element adapted to be coded in the recorder and read in the typesetter.

Having thus described the invention, what is claimed as new and desired to be secured by Letters Patent is:

1. In an intelligence conveying system or the like, a composing apparatus comprising, in combination, a supporting frame, a rotatable character disc upon which is carried at least one font of master characters arranged arcuately on the disc and concentrically therewith from which selections are made for effecting intelligence conveying composition, means for accomplishing the reproduction of successive individual characters from said character disc at a given point in said apparatus, and means for presenting selected characters on said disc at said point, said last named means comprising driving means in direct frictional contact with said disc for continually urging said disc to rotate about its axis in a given direction only, stop means carried by said disc, a series of stop elements carried by said frame and means for selectively moving individual stop elements corresponding to selected characters into the path of the stop means on said disc, whereby the disc is halted against the frictional urging of said driving means, with the selected master character positioned at said given point of reproduction, and means for restoring said stop elements to initial positions whereupon the frictional drive of the disc is again effective.

2. In an intelligence conveying system or the like, a composing apparatus comprising, in combination, a supporting frame, a rotatable character disc upon which is carried at least one font of master characters arranged arcuately on said disc and concentrically thereof from which selections are made for effecting intelligence conveying composition, means for accomplishing the reproduction of successive individual characters from said character disc at a given point in said apparatus, and means for presenting selected characters on said disc at said point, said last named means comprising driving means for continually urging said disc to rotate about its axis in one direction only, means for stopping said disc in its uni-directional rotative movement at the next ensuing positioning of a given character at said point of reproduction without stopping said driving means, means for selectively actuating said stopping means in accordance with the successive characters to form the desired composition, and means for releasing said stopping means to permit the resumption of said uni-directional rotative movement of the disc under the influence of said driving means, a plurality of successive sectorial fonts being carried upon the disc, said fonts being absolutely identical in character form and spacing and equally spaced circumferentially of the disc, abutment elements on said disc each corresponding to one of the fonts, and all identically spaced from their respective fonts and adapted to cooperate with said stopping means, whereby the disc may be halted at the next ensuing position of a selected character rather than making an approximately full rotation for such selection.

3. In an intelligence conveying system or the like, a composing apparatus comprising, in combination, a supporting frame, a rotatable character disc upon which is carried at least one font of master characters arranged arcuately on the disc and concentrically therewith from which selections are made for effecting intelligence conveying composition, means for accomplishing the reproduction of successive individual characters from said character disc at a given point in said apparatus, and means for presenting selected characters on said disc at said point, said last named means comprising a friction drive for continually urging said disc to rotate about its axis in a given direction, stop means carried by said disc, a series of stop elements carried by said frame and means for selectively moving individual stop elements corresponding to selected characters into the path of the stop means on said disc, whereby the disc is halted against the frictional urging of its drive, with the selected master character positioned at said given point of reproduction, and means for restoring said stop elements to initial positions whereupon the frictional drive of the disc is again effective, the stop means on the disc comprising at least one pin projecting from the disc in a direction perpendicular to the plane thereof, and the stop means carried by the frame comprising a plurality of thin blades movable edgewise in slots in the frame, linkages operatively associated with the respective blades and selectively actuatable to move said blades individually to interpose them in the path of said pin, a latch plate resiliently displaceable by a blade during its interposition movement and having a shoulder thereon for retaining said blade when the latter is fully interposed, the displacement of the latch plate by one of said blades serving to release the immediately preceding blade for restoration to its initial inactive position.

4. The composing apparatus as set forth in claim 3 in which the stop blades and the latch plate are provided with cooperating wedging surfaces and mutually engaging retaining shoulders, and the respective blades are adapted to overrun the latching position wherein the cooperating shoulders are engaged, whereby the latch plate is caused to retract sufficiently to release the next previously actuated blade.

5. The composing apparatus as set forth in claim 3, in which the thin stop blades are each provided with a tongue which is adapted to be abutted by the disc stop pin, said tongue being bendable to positions of fine adjustment for accurate stopping of the disc for precise positioning of the selected individual characters.

6. In an intelligence conveying system or the like, a composing apparatus comprising, in combination, a supporting frame, a rotatable character disc upon which is carried at least one font of master characters arranged arcuately on the disc and concentrically therewith from which selections are made for effecting intelligence conveying composition, means for accomplishing the reproduction of successive individual characters from said character disc at a given point in said apparatus, and means for presenting selected characters on said disc at said point, said last named means comprising a friction drive for continually urging said disc to rotate about its axis in a given direction, stop means carried by said disc, a series of stop elements carried by said frame and means for selectively moving individual stop elements corresponding to selected characters into the path of the stop means on said disc, whereby the disc is halted against the frictional urging of its drive, with the selected master character positioned at said given point of reproduction, and means for restoring said stop elements to initial positions whereupon the frictional drive of the disc is again effective, there being provided a driven shaft rotatably mounted in said frame, a hub member carried by said shaft, said hub member being shouldered to receive an axial opening in said disc and provided with a flange at one side of said shoulder, a retaining plate carried by said shaft outwardly of said hub member, means for resiliently urging said retaining plate toward said hub member to frictionally clamp the central portion of said character disc adjacent the opening therein on said shoulder between said retaining member and said flange.

7. In an intelligence conveying system or the like, in combination, a supporting frame, a master character plate on said frame, means for moving said plate successively to positions for the reproduction of a selected character therefrom, a stop abutment on said plate, a series of stop elements adapted to be selectively interposed in the path of said stop abutment to stop said plate at the selected point for reproduction of a given character, each stop element corresponding to a character on the plate, latching means for retaining said selected stop element in interposed position, and means for automatically releasing said latching means from engagement with a preceding stop element upon the latching of said selected stop element.

8. The combination as set forth in claim 7 in which said latching means comprises a ledge member carried on a trolley which is spring-urged to yieldably project said ledge member into the path of said stop elements.

9. The combination as set forth in claim 7 in which said master character plate comprises a rotatable disc, said stop elements are arranged in substantially arcuate formation, and adapted to be projected in radial converging paths toward the axis of said disc, and said latching means comprises a ledge member; said ledge member being carried by a trolley guided for reciprocating movement along tracks provided on said supporting frame, antifriction bearing means between said trolley and said tracks, a tension spring stretched between said trolley and a point on the frame yieldingly urging said trolley to project said ledge element into the path of movement of said stop elements.

10. In an intelligence conveying system or the like, a composing apparatus comprising, in combination, a supporting frame, a rotatable character disc upon which is carried at least one font of master characters from which selections are made for effecting intelligence conveying composition, means for accomplishing the reproduction of successive individual characters from said character disc at a given point in said apparatus, and means for presenting selected characters on said disc at said point; said last named means comprising a friction drive for continually urging said disc to rotate about its axis in a given direction, at least one stop abutment carried by said disc, stop means carried by said frame concentric with said disc and each corresponding to a character on the disc, means for selectively moving individual stop elements corresponding to selected characters radially into the path of the abutment on said disc, whereby the disc is halted against the frictional urging of its drive, with the selected master character positioned at said given point of reproduction, and means for restoring said stop elements to initial positions whereupon the frictional drive of the disc is again effective.

11. The composing apparatus as set forth in claim 10, in which a plurality of arcuate fonts of characters are distributed around the disc, each occupying an equal angular sector of the total area thereof, the fonts being identical and each character occupying a corresponding position in each font, and a stop pin on said disc for each font sector, said stop elements being arranged upon said frame in arcuate assembly in conformity with the arcuate angular arrangement of one of the individual fonts, whereby upon interposition of a selected element, the next oncoming stop pin on the disc will strike the element and the character will be selected from the particular font associated with the contacted stop pin, thus effecting the selection during a fractional rotation of the disc rather than a substantially full rotation thereof.

12. The composing apparatus as set forth in claim 11, in which different fonts of characters are arranged in concentric rows in the several sectors of disc area, each font of different face being disposed at a different radial distance from the center, and means are provided for selectively projecting the image of a character from the different concentric arcuate rows presented at said given point of reproduction.

13. In an intelligence conveying system or the like, a composing apparatus comprising, in combination, a supporting frame, a rotatable character disc upon which is carried at least one font of master characters from which selections are made for effecting intelligence conveying composition, means for accomplishing the reproduction of successive individual characters from said character disc at a given point in said apparatus, and means for presenting selected characters on said disc at said point;

said last named means comprising a friction drive for continually urging said disc to rotate about its axis in a given direction, stop means carried by said disc, an arcuate series of stop elements carried by said frame concentric with said disc and each corresponding to a character on the disc, means for selectively moving individual stop elements corresponding to selected characters into the path of the stop means on said disc, whereby the disc is halted against the frictional urging of its drive, with the selected master character positioned at said given point of reproduction, and means for restoring said stop elements to initial positions substantially simultaneously with the selection and interposition of a succeeding stop element whereupon the frictional drive of the disc is again effective.

14. In an intelligence conveying system or the like, a composing apparatus comprising, in combination, a supporting frame, a circular master character disc rotatably mounted on said frame and having a plurality of concentric, arcuate, radially spaced fonts of characters thereon, said disc having opaque and transparent portions defining between them the characters of the respective fonts, a film supported by said frame and upon which images of said master characters are projected, a source of light on said frame, an optical system carried by said frame and adapted to illuminate the appropriate portion of said character disc from said source to project the image of a selected character onto said film, means for selectively rotating said master disc upon said frame and stopping it to present a selected character to said optical system; said optical system comprising a condensing lens for directing a beam of light from said source through said master disc and thence in a continuous path toward the film, a reflecting member positioned in the path of said beam between the disc and the film, means for angling said reflecting member for selectively projecting characters toward said film from certain of said concentric fonts, a second reflecting member beyond said first named one adapted to be angled to receive the reflected characters from said first named reflecting member and project an ultimate selection of characters from the fonts on the disc onto said film, a projecting lens carried by said frame beyond said reflecting member which is adapted to receive and project the selected character image onto said film, said condensing lens being adjusted to focus an image of said source of light substantially upon the plane of the projecting lens, and a shutter member interposed in said optical system normally intercepting the passage of light from said source to said disc but adapted momentarily to permit the passage of light for the projection of the selected character image onto the film, a mask supported by said frame and disposed between said condensing lens and said disc, said mask having an opening therein which is of the approximate width of a character but is elongated to a length equal to the radial dimension of the series of fonts on the disc, and another mask interposed between said projecting lens and the film, said second named mask being of a width approximating that of the film, but of a height approximating that of a single character.

15. In an intelligence conveying system or the like, a composing apparatus comprising, in combination, a supporting frame, a circular master character disc rotatably mounted on said frame and having a plurality of concentric, arcuate, radially spaced fonts of characters thereon, said disc having opaque and transparent portions defining between them the characters of the respective fonts, a film supported by said frame and upon which images of said master characters are projected, a source of light on said frame, an optical system carried by said frame and adapted to illuminate the appropriate portion of said character disc from said source to project the image of a selected character onto said film, means for selectively rotating said master disc upon said frame and stopping it to present a selected character to said optical system; said optical system comprising a condensing lens for directing a beam of light from said source through said master disc and thence in a continuous path toward the film, a reflecting member positioned in the path of said beam between the disc and the film, means for angling said reflecting member for selectively projecting characters toward said film from certain of said concentric fonts, a second reflecting member beyond said first named one adapted to be angled to receive the reflected characters from said first named reflecting member and project an ultimate selection of characters from the fonts on the disc onto said film, a projecting lens carried by said frame beyond said reflecting member which is adapted to receive and project the selected character image onto said film, said condensing lens being adjusted to focus an image of said source of light substantially upon the plane of the projecting lens, and a shutter member interposed in said optical system normally intercepting the passage of light from said source to said disc but adapted momentarily to permit the passage of light for the projection of the selected character image onto the film, the two reflecting members being pivoted on parallel axes and the concentric rows of master characters on the disc being arranged in pairs, each pair comprising respectively upper case and lower case representations of a different type face, the first named reflecting member adapted to select the desired case row from the rows of characters, and the second reflecting member adapted to select the desired type face representation.

16. A portable photographic composing machine or the like comprising in combination a supporting frame of the approximate size and general configuration of a conventional keyboard actuated electric typewriter, a master character plate movably mounted on said frame and having a plurality of fonts of characters depicted thereon and adapted to have their images selectively projected onto film to effect the desired composition, said fonts occupying separate positions on the plate and representing alphabets differing in representation, such as in case and in type face, a film-supporting carriage mounted for travel upon the rearward side of said frame, a source of light within said frame and means for projecting a beam of light from said source forwardly from the frame proper, optical means spaced from said projecting means for receiving a beam of light and projecting it rearwardly substantially parallel with said first-named beam toward said film, bracket means on said frame, and a detachable and selectively adjustable dual reflecting device carried by said bracket and comprising a fixed reflector for receiving said first-named beam and diverting it at the approximately right angle, a second reflector for receiving said diverted beam and reflecting it in the form of said second-named beam back through said optical means toward said film, and means for variably angling said reflectors to make selections of character images from said plate according to whether variations in case or face are desired.

17. The composing machine as set forth in claim 16 in which said character plate comprises a circular disc mounted for rotation in a plane just exteriorly of the front of the said frame proper to intercept said first beam, in which the several fonts are arranged in arcuate rows concentrically of said disc and at different distance from the center thereof, said first beam carries all of the images of a given character, and the ultimate separation according to case and face is effected by said successive reflectors carried by said bracket.

18. In an intelligence conveying system or the like, a machine for applying text composition to a receiving medium progressively character by character, said machine comprising, in combination, a supporting frame, a carriage mounted on said frame for progressive movement therealong in a given direction, character applying means carried by said frame to function at a relatively fixed point thereon, said character applying means being variable according to the type face of the character desired, a receiving medium supported upon said carriage for step-by-step movement past said character applying means for progressively receiving characters to form a line of composition, a variable escapement means for effecting increments of movement of said carriage for the characters appropriate to the width of the selected charatcer, a secondary carriage upon which the receiving medium is disposed, means for mounting said secondary carriage upon said first named primary carriage for movement relative thereto and in the same direction as that of the primary carriage, said mounting means including interchangeable gearing for insuring a proportional movement of said two carriages, whereby increments of escapement movement of said secondary carriage may bear a predetermined ratio to the increments of movement of said primary carriage to correspond to variations in the character applying means used.

19. The machine as set forth in claim 18 in which said gearing comprises a pair of pinions of selected relative diameters rigidly secured together in coaxial relationship, and two rack members with which the respective pinions mesh, the dual pinion assembly and the two racks constituting a three-element leverage system comprising a fulcrum, an input element and an output element, one of the three elements being carried by the supporting frame, one by the primary carriage, and one by the secondary carriage.

20. The machine as set forth in claim 19 in which one of the racks is carried by the supporting frame, the other rack by the primary carriage, and the pinion assembly by the secondary carriage.

21. The machine as set forth in claim 19 in which one of the racks is carried by the supporting frame, the other rack by the secondary carriage, and the pinion assembly by the primary carriage.

22. A photographic composing machine or the like comprising, in combination, a supporting frame, a photographic film carried by said frame, means for successively projecting images of type characters toward said film at a relatively fixed point on said frame, means for supporting said film and moving it step-by-step before the projecting means to expose it successively to the projection of the characters forming a line of composition, said last named means comprising a light-tight enclosure having a narrow portion confining said film to substantially its own plane while it is exposed and moved vertically therein, a light aperture in a wall of said narrow portion of the enclosure through which the image is projected, a backing surface stationary with respect to said feed wheel on the opposite wall of said portion against which the film may be pressed, a shaft carried by said enclosure, at least one sharp toothed feed wheel fixed on said shaft and adapted to bear upon the film to press it against said backing surface with sufficient pressure to cause the teeth of the wheel to enter the material of which the film is made to at least partially perforate it and thus effect its own positive driving engagement with the film, and means for effecting step-by-step rotation of said shaft to advance the film at the completion of each line of composition for positioning the film for photographing the next line, two feed wheels being provided on the rotatable shaft, at least one of which is adjustable longitudinally thereon so that the wheels may operate upon the side margins of films of different widths, and removable interchangeable backing inserts being provided for selective positioning upon said opposite wall to provide an anvil surface against which each wheel may press the film margins during feed.

23. In an intelligence conveying system or the like, a machine for reproducing type composition upon a sheet, said machine comprising, in combination, a supporting frame, a carriage mounted on said frame for progressive step-by-step escapement movement therealong in a given direction, a character reproducing device carried by said frame and adapted to function at a relatively fixed point thereon, a sheet carried by said carriage and adapted to be moved thereby before said reproducing means to receive character images successively to produce a line of composition, carriage return means for restoring said carriage to its initial position after the completion of a line, means on said carriage for feeding said sheet vertically for the reception of a succeeding line of characters, and means for effecting said vertical feed substantially simultaneously with and as the result of the actuation of said carriage return; said carriage return comprising a pull-tape operatively connected at one end to said carriage, means on said supporting frame and connected to the other end of said tape for pulling the latter to effect return of the carriage at the end of a line, said vertical line-to-line sheet feed including a rotary feed element operative upon said sheet, the operative connections of the first named end of said pull-tape comprising a spring restrained rotary drum about which that end portion of the tape is wound, ratchet drive means connecting said drum with the sheet feed, and graduated settable stop means governing the extent of movement of said ratchet drive means.

24. In an intelligence conveying system or the like, a machine for reproducing type composition upon a sheet, said machine comprising, in combination, a supporting frame, a carriage mounted on said frame for progressive step-by-step escapement movement therealong in a given direction, a character reproducing device carried by said frame and adapted to function at a relatively fixed point thereon, a sheet carried by said carriage and adapted to be moved thereby before said reproducing means to receive character images successively to produce a line of composition, carriage return means for restoring said carriage to its initial position after the completion of a line, means on said carriage for feeding said sheet vertically for the reception of a succeeding line of characters, and means for effecting said vertical feed substantially simultaneously with and as the result of the actuation of said carriage return; said carriage return comprising a pull-tape operatively connected at one end to said carriage, means on said supporting frame and connected to the other end of said tape for pulling the latter to effect return of the carriage at the end of a line, said vertical line-to-line sheet feed including a rotary feed element operative upon said sheet, the operative connections of the first named end of said pull-tape comprising a spring restrained rotary drum about which that end portion of the tape is wound, a stub shaft on said carriage upon which said drum is rotatably mounted, a ratchet wheel also rotatable on said stub shaft, gearing connecting said ratchet wheel with said vertical sheet feed, a ratchet tooth pivotally carried by said drum and spring-urged toward said ratchet wheel, a stop projection on said drum, a fixed stop abutment on a part of said carriage, and a graduated annulus having a stop abutment thereon, said annulus being rotatably adjustable coaxially with said stub shaft and drum, whereby the angular rotation of said drum in driving the sheet feeding ratchet is selectively limited by the extent of movement permitted its stop projection between the fixed stop abutment and the stop abutment on the adjustable annulus, all whereby the pull-tape effects the carriage return and the vertical advance of the sheet substantially simultaneously.

25. In an intelligence conveying system or the like, a machine for reproducing type composition upon a sheet, said machine comprising, in combination, a supporting frame, a carriage mounted on said frame for progressive step-by-step escapement movement therealong in a given direction, a character reproducing device carried by said frame and adapted to function at a relatively fixed point thereon, a sheet carried by said carriage and adapted to be moved thereby before said reproducing means to receive character images successively to produce a line of composition, a rotary feeding element on said carriage for feeding said sheet vertically for the reception of a succeeding line of characters, and means for effecting said vertical feed, comprising a spring-restrained rotary drum, one-way moving means connecting said drum with the sheet feed element to move the latter in vertical sheet feeding direction only, pull means for rotating said drum and to release said drum for return movement at the end of the operation of said pull means, and graduated settable stop means on said carriage and operatively associated with said drum to govern the extent of movement of said drum and consequently of said one-way moving means.

26. The machine as set forth in claim 25 in which the stop means comprises a stop projection on said drum, fixed stop means on said carriage and a stop element on said carriage manually adjustable angularly to be abutted by the stop projection on the drum to limit the arc of movement of the drum and thus the extent of movement of the sheet feeding means.

27. The machine as set forth in claim 26 in which the adjustable stop element is carried by a rotary adjustable disc mounted concentrically with said drum, said disc being graduated and provided with a corresponding pair of notches and a manually actuated blade on said carriage adapted to be moved into a selected notch in the disc for determining the extent of movement of the sheet feeding means for the desired line spacing.

28. In an intelligence conveying system or the like, a composing apparatus comprising, in combination, a supporting frame, a carriage supporting a sensitized sheet to be impressed with the desired type composition, said carriage being mounted for progressive movement on said frame; a master character plate movably mounted upon said frame and having at least one font of characters thereon, means for photographically transmitting reproductions of selected ones of said characters to said sheet; escapement mechanism for moving said carriage progressively step-by-step as the successive transmissions of reproductions are made, and in accordance with the appropriate widths of the several characters; power drive means having transmission means operatively supported on said frame, means for setting said transmission means in operation for continual movement, a rotary member on the frame and means actuated by said rotary member for initiating the carriage escapement operation, a clutch between said continually moving transmission means and said rotary member and adapted to permit holding said rotary member during certain portions of the cycle of operations in transmitting a given character; a slip clutch between said continually moving transmission means and said character plate, stop means for halting the plate at a point for the transmission of a selected character therefrom, and means for displacing said last named stop means to effect the resumption of movement of said plate for the selection of the next character.

29. In an intelligence conveying system or the like, a composing apparatus comprising, in combination, a supporting frame, a carriage supporting a sensitized sheet to be impressed with the desired type composition, said carriage being mounted for progressive movement on said frame; a master character disc rotatably mounted upon said frame and having at least one font of characters thereon, means for photographically transmitting reproductions of selected ones of said characters to said sheet; escapement mechanism for moving said carriage progressively step-by-step as the successive transmissions of reproductions are made, and in accordance with the appropriate widths of the several characters, means for setting up the escapement distances for the respective successive characters, and means for thereafter actuating the escapement mechanism to move the carriage the distance called for; power drive means having transmission means operatively supported on said frame, means for setting said transmission means in operation for continual movement, a rotary member and means actuated by said rotary member for initiating the carriage escapement operation, a slip clutch between said continually moving transmission means and said rotary member, and stop means for holding said rotary member during certain portions of the cycle of operations in transmitting a given character; a slip clutch between said continually moving transmission means and said character disc, and stop means for halting the disc at a point for the transmission of a selected character therefrom, and means for displacing said last named stop means to effect the resumption of rotation of said disc for the selection of the next character.

30. In an intelligence conveying system or the like, a photographic composing apparatus comprising, in combination, a supporting frame, a carriage supporting a film to be impressed with the desired type composition, said carriage being mounted for progressive movement on said frame; a master character disc rotatably mounted upon said frame and having at least one font of characters thereon, an optical system carried by said frame and comprising a source of light, lenses for projecting images of selected characters from said disc onto said film, and a rotatable shutter for intermittent operation to expose the film to successive images; escapement mechanism for moving said carriage progressively step-by-step as the successive exposures of images are made, and in accordance with the appropriate widths of the several characters; means for setting up the escapement distances for the respective successive characters, and means for thereafter actuating the escapement mechanism to move the carriage the distance called for; power drive means having transmission means operatively supported on said frame, means for setting said transmission means in operation for continual movement, a rotary member on said frame, a plurality of cam elements on said rotary member, and means actuated by said cam elements respectively for initiating the carriage escapement operation and for controlling the timing of the operating cycle, means operatively connecting said shutter with said rotary member for actuating the shutter, a slip clutch between said continually moving transmisison means and said rotary cam elements, and stop means for holding said rotary cam elements during certain portions of the cycle of operations in transmitting a given character; a slip clutch between said continually moving transmission means and said rotary character disc, stop means for halting the disc at a point for the transmission of a selected character therefrom, and means for displacing said last named stop means to effect the resumption of rotation of said disc for the selection of the next character.

31. The apparatus as set forth in claim 30 in which the escapement and sequential controlling means are electrically actuated and switches for effecting said actuations are positioned in operative proximity with said cams, and in which the rotary member is a shaft having bearings in the frame, and the shutter comprises an interrupted disc carried by said shaft.

32. The apparatus as set forth in claim 31 in which the slip clutch means for the character disc is established by a frictional mounting of said disc on a shaft which comprises a part of the continually moving transmission means.

33. In a photographic composing apparatus of the class described, which includes a master character member, a carriage supporting a film for progressive movement in composing a line of text, an optical system for projecting the images of successively selected characters onto said film, and escapement mechanism for effecting said movement of the carriage, a source of power and cam-initiated controls for effecting sequential operation of the apparatus for starting the composition of a character, setting up the appropriate escapement, effecting the escapement movement, and preparing for the composition of the next character; the combination of a rotary shaft adapted to rotate in interrupted cycles, a shutter disc fixed on said shaft and comprising a part of said optical system, a plurality of cams on said shaft controlling respectively said escapement mechanism and the other sequential operations of the apparatus, a slip clutch operatively interposed between the source of power and said shaft for frictionally driving the latter, stop projections extending radially from said shaft, and a blocking abutment movable into and out of stopping relation with said stop projections for determining the cyclic rotations of said shaft with said shutter and cams.

34. The photographic composing apparatus as set forth in claim 33 in which one of the cams is operatively connected with said blocking abutment to govern its movement.

35. In a photographic composing apparatus of the class described, which includes a master character member, a carriage supporting a film for progressive movement in composing a line of text, an optical system for projecting the images of successively selected characters from said master character member onto said film, and escapement mechanism for effecting said movement of the carriage; a source of power and cam-initiated controls for effecting sequential operation of the apparatus for (a) starting the projection of a character from said character member, (b) setting up the appropriate escapement, (c) effecting the carriage escapement movement, and (d) preparing for the composition of the next character; the sub-combination comprising a control shaft installation comprising a rotary shaft mounted in the apparatus, a plurality of cams each operatively associated with one of said controls fixed on said shaft and aligned longitudinally thereof, at least one stop projection extending radially from said shaft, a rotary element carried by said shaft and adapted to be continuously driven by said power source, a slip clutch between the shaft and said rotary element whereby said shaft and its cams are frictionally driven and subject to stopping by means of stop means interposable in the path of said stop projection carried by said shaft.

36. A portable photographic composing machine or the like comprising, in combination, a supporting frame of the approximate size and general configuration of a conventional electric typewriter, a circular master character disc mounted for uni-directional rotation on said frame and having at least one font of characters thereon; the same font of characters being repeated in a plurality of sectors around the disc, any given character occupying the same relative position in each sector; a carriage mounted on said frame for progressive movement therealong in a given direction; a photographic film supported upon said carriage for exposures of successive portions thereof; a source of light on said frame, an optical system carried by said frame and adapted to illuminate the appropriate portion of said character disc from said source to project the image of a character selected from said disc onto said film; means for controllably rotating said master disc upon the frame in one direction only to present a selected character to the optical system; said last named means including cooperating stop means on the frame and on the disc, the latter respectively and identically associated with the font sectors thereon, the stop means on the frame being settable for the selection of a character and functioning to halt the rotation of said disc at a point where the next approaching representation of the selected character will be in position for projection, whether it be in the sector of the previously used character or the next approaching sector; a shutter member interposed in said optical system normally intercepting the passage of light from said source to said disc but adapted momentarily to permit the passage of light for the projection of the selected character image onto the film, and means for timing said shutter member to expose the film at the proper interval after the selected character has been presented by the rotation of said character disc; variable escapement means for effecting movement of said carriage appropriate to the prescribed width of any selected character, and for character spacing for word spaces and line justification; carriage return means actuatable as for starting a new line of composition; power means adapted to be brought into effective action to operate the character selecting, spacing, justification, and carriage return means, and control means for operatively connecting said various operated means with said power means.

37. A portable photograpic composing machine or the like comprising, in combination, a supporting frame of the approximate size and general configuration of a conventional electric typewriter, a circular master character disc mounted for uni-directional rotation on said frame and having at least one font of characters thereon; the same font of characters being repeated in a plurality of sectors around the disc, any given character occupying the same relative position in each sector; a carriage mounted on said frame for progressive movement therealong in a given direction; a photographic film supported upon said carriage for exposures of successive portions thereof; a source of light on said frame, an optical system carried by said frame and adapted to illuminate the appropriate portion of said character disc from said source to project the image of a character selected from said disc onto said film; means for controllably rotating said master disc upon the frame in one direction only to present a selected character to the optical system; said last named means comprising slip clutch uni-directional driving means for said disc and stop abutments on said disc, each respectively and identically associated with the font sectors on the disc, and cooperating stop abutments carried by said frame, and means for setting one of said latter abutments for the selection of a character, and for functioning to halt the rotation of said disc at a point where the next approaching representation of the selected character will be in position for projection, whether it be in the sector of the previously used character or the next approaching sector; a shutter member interposed in said optical system normally intercepting the passage of light from said source to said disc but adapted momentarily to permit the passage of light for the projection of the selected character image onto the film, and means for timing said shutter member to expose the film at the proper interval after the selected character has been presented by the rotation of said character disc; variable escapement means for effecting movement of said carriage appropriate to the prescribed width of any selected character, and for character spacing for word spaces and line justification; carriage return means actuatable as for starting a new line of composition; power means adapted to be brought into effective action to operate the character selecting, spacing, justification, and carriage return means, and control means for operatively connecting said various operated means with said power means.

38. A portable photographic composing machine or the like comprising, in combination, a supporting frame of the approximate size and general configuration of a conventional electric typewriter, a master character disc mounted on said frame and having at least one font of characters thereon; a carriage mounted on said frame for progressive movement therealong in a given direction; a photographic film supported upon said carriage for exposures of successive portions thereof; a source of light on said frame, an optical system carried by said frame and adapted to illuminate the appropriate portion of said character disc from said source to project the image of a character selected from said disc onto said film; means for controllably rotating said master disc upon the frame to present a selected character to the optical system; a shutter member interposed in said optical system normally intercepting the passage of light from said source to said disc but adapted momentarily to permit the passage of light for the projection of the selected character image onto the film, and means for timing the operation of said shutter member to expose the film at the proper interval after the selected character has been presented by the rotation of said character disc; variable escapement means for effecting movement of said carriage appropriate to the prescribed width of any selected character, and for character spacing for word spaces and line justification; a secondary carriage upon which the film is disposed, means for mounting said secondary carriage on said first named primary carriage for movement relatively thereto and in the same direction as that of the primary carriage, said mounting means including interchangeable gearing for insuring a proportional movement of said two carriages, whereby the escapement movement of said secondary carriage may bear a predetermined ratio to the increment of movement of said primary carriage; carriage return means actuatable as for starting a new line of composition; power means adapted to be brought into effective action to operate the character selecting, spacing, justification, and carriage return means, and control means for operatively connecting said various operated means with said power means.

39. A portable photographic composing machine or the like comprising, in combination, a supporting frame of the approximate size and general configuration of a conventional electric typewriter, a master character disc mounted on said frame and having at least one font of characters thereon; a carriage mounted on said frame for progressive movement therealong in a given direction; a photographic film supported upon said carriage for exposures of successive portions thereof, light-tight means for applying said film to said carriage in roll form, unrolling the film, presenting a portion thereof for exposure in planar position, and rolling up the exposed film for removal and development; a source of light on said frame, an optical system carried by said frame and adapted to illuminate the appropriate portion of said character disc from said source to project the image of a character selected from said disc onto said film; means for controllably rotating said master disc upon the frame to present a selected character to the optical system; a shutter member interposed in said optical system normally intercepting the passage of light from said source to said disc but adapted momentarily to permit the passage of light for the projection of the selected character image onto the film, and means for timing the operation of said shutter member to expose the film at the proper interval after the selected character has been presented by the rotation of said character disc; variable escapement means for effecting movement of said carriage appropriate to the prescribed width of any selected character, and for character spacing for word spaces and line justification; a secondary carriage upon which the film is disposed, means for mounting said secondary carriage on said primary carriage for movement relatively thereto and in the same direction as that of said primary carriage, said mounting means including interchangeable gearing for insuring a proportional movement of said two carriages, whereby the escapement movement of said secondary carriage may bear a predetermined ratio to the increment of movement of said primary carriage; carriage return means actuatable as for starting a new line of composition; means operatively connected with the film presenting means and adapted to be driven by said carriage return means for feeding said film in a vertical direction to effect line-to-line spacing, substantially simultaneously with the carriage return operation; power means adapted to be brought into effective action to operate the character selecting, spacing, justification, and carriage return means, and coded control means for operatively connecting said various operated means with said power means for selective automatic operation.

40. A portable photographic composing machine or the like comprising, in combination, a supporting frame of the approximate size and general configuration of a conventional electric typewriter, a circular master character disc mounted on said frame and having a plurality of concentric, arcuate, radially spaced fonts of characters thereon, said disc having opaque and transparent portions defining between them the characters of the respective fonts, a carriage mounted on said frame for progressive movement therealong in a given direction; a photographic film supported upon said carriage for exposures of successive portions thereof; a source of light on said frame, an optical system carried by said frame and adapted to illuminate the appropriate portion of said character disc from said source to project the image of a character selected from said disc onto said film, means for controllably rotating said master disc upon the frame to present a selected character to the optical system; said optical system comprising a lens for directing a beam of light from said source through said master disc and thence toward the film, a reflecting member positioned in the path of said beam between the disc and the film, means for angling the reflecting member for selectively projecting a character onto said film from one or the other of the radially spaced fonts of the master disc; a shutter member interposed in said optical system normally intercepting the passage of light from said source to said disc but adapted momentarily to permit the passage of light for the projection of the selected character image onto the film, and means for timing said shutter member to expose the film at the proper interval after the selected character has been presented by the rotation of said character disc; variable escapement means for effecting movement of said carriage appropriate to the prescribed width of any selected character, and for character spacing for word spaces and line justification, carriage return means actuatable as for starting a new line of composition; power means adapted to be brought into effective action to operate the character selecting, spacing, justification, and carriage return means, and control means for operatively connecting said various operated means with said power means.

41. A portable photographic composing machine or the like comprising, in combination, a supporting frame of the approximate size and general configuration of a conventional electric typewriter, a circular master character disc mounted on said frame and having a plurality of concentric, arcuate, radially spaced fonts of characters thereon; said disc having opaque and transparent portions defining between them the characters of the respective fonts, each font being divided into arcuate concentric rows of upper case and lower case characters respectively; a carriage mounted on said frame for progressive movement therealong in a given direction; a photographic film suported upon said carriage for exposures of successive portions thereof; a source of light on said frame, an optical system carried by said frame and adapted to illuminate the appropriate portion of said character disc from said source to project the image of a character selected from said disc onto said film, means for controllably rotating said master disc upon the frame to present a selected character to the optical system; said optical system comprising a lens for directing a beam of light from said source through said master disc and thence onto the film, a reflecting member positioned in the path of said beam between the disc and the film, means for angling the reflecting member for selectively projecting a character onto said film from one or the other of the radially spaced fonts on the master disc, and a second reflecting member in the path of the beam, means for angling said second reflecting member to selectively project from one or the other of the rows of case-differentiated characters of either font; a shutter member interposed in said optical system normally intercepting the passage of light from said source to said disc but adapted momentarily to permit the passage of light for the projection of the selected character image onto the film, and means for timing said shutter member to expose the film at the proper interval after the selected character has been presented by the rotation of said character disc; variable escapement means for effecting movement of said carriage appropriate to the prescribed width of any selected character, and for character spacing for word spaces and line justification; carriage return means actuatable as for starting a new line of composition; power means adapted to be brought into effective action to operate the character selecting, spacing, justification, and carriage return means, and control means for operatively connecting said various operated means with said power means.

42. A portable photographic composing machine or the like comprising, in combination, a supporting frame of the approximate size and general configuration of a conventional electric typewriter, a circular master character-disc mounted on said frame and having a plurality of concentric, arcuate, radially spaced fonts of characters thereon; said disc having opaque and transparent portions defining between them the characters of the respective fonts, each font being divided into arcuate concentric rows of upper case and lower case characters respectively; a carriage mounted on said frame for progressive movement therealong in a given direction; a photographic film supported upon said carriage for exposures of successive portions thereof; a source of light on said frame, an optical system carried by said frame and adapted to illuminate the appropriate portion of said character disc from said source to project the image of a character selected from said disc onto said film, means for controllably rotating said master disc upon the frame to present a selected character to the optical system; said optical system comprising a lens for directing a beam of light from said source through said master disc and thence onto the film, a reflecting member positioned in the path of said beam between the disc and the film, means for angling the reflecting member for selectively projecting a character onto said film from one or the other of the radially spaced fonts of the master disc, and a second reflecting member in the path of the beam, means for angling said second reflecting member to selectively project from one or the other of the rows of case-differentiated characters of either font; a mask positioned in the path of said beam in advance of the master disc and having an opening therein outlining a given character in radial column of all case and font variations, and a mask positioned beyond said reflecting means and just before the film and having an opening therein outlining one of the variations of said given character in either case or font depending on the selection afforded by the adjustment of said reflecting means; a shutter member interposed in said optical system normally intercepting the passage of light from said source to said disc but adapted momentarily to permit the passage of light for the projection of the selected character image onto the film, and means for timing said shutter member to expose the film at the proper interval after the selected character has been presented by the rotation of said character disc; variable escapement means for effecting movement of said carriage appropriate to the prescribed width of any selected character, and for character spacing for word spaces and line justification; carriage return means actuatable as for starting a new line of composition; power means adapted to be brought into effective action to operate the character selecting, spacing, justification, and carriage return means, and control means for operatively connecting said various operated means with said power means.

43. In an apparatus for producing type composition or the like, in combination, a first machine comprising an electrically powered high speed typewriter having a keyboard, type bars, and means operatively connecting the keyboard and the type bars to produce a typewriten proof sheet of the desired text, automatic mechanism embodied in said first machine for punching a tape with coded perforations representative of such text, a second machine having means for photographically reproducing the said text in the form of type composition, and means for receiving and reading said coded tape, and means responsive to the signals on said tape for actuating said reproducing means, said second machine including means for preparing composition automatically in differing character fonts, and said first named machine including means for normally setting up a signal in said tape for causing said second machine to shift from one font to another; said last named means including a color shift mechanism in said first machine whereby upon actuation thereof the typewritten copy is produced in a color different from that of normal typography and in which means is incorporated in said first machine operated in response to the actuation of said color shift for setting up the font mixer shift signal in the tape, and said composition preparing means in said second machine including means for sensing said mixer shift signal for reproduction of the predetermined portion of said composition in typography of the shifted font, thus giving a typewritten proof of such shifted font portion in a distinctive color.

44. In a system of the class described, a machine for effecting type composition comprising, in combination, a supporting frame, a master character plate containing a font of characters thereon, the characters in said font arranged in separate series of upper and lower case representations; means for supporting a sheet for progressive movement along said frame to successively receive selected character reproductions from said master plate; means for transmitting selected reproductions from said plate to said sheet, means embodied in said last named means for effecting a selection between upper and lower case characters and between the individual characters for such transmission; said machine adapted to be automatically electrically actuated by a coded member fed thereto and for this purpose embodying a code reader and means appropriately operatively connecting said reader to the case selecting mechanism and the individual character selecting mechanism; means for successively effecting the reading of the individual code signals from said coded member, a time delay relay actuated by said last named means and connected in a circuit controlling said code reader for preventing the reading of a succeeding code for a predetermined period of time, said delay being sufficient to enable case selection procedures to be effected but not sufficient for character selection; and further electrical circuitry effective upon the reading of a character selecting code on said coded member for establishing a longer delay before the reading of the next code.

45. In a system of the class described, a machine for effecting type composition comprising, in combination, a supporting frame, a master character plate containing a plurality of fonts of characters thereon; means for supporting a sheet for progressive movement along said frame to successively receive selected character reproductions from said master plate; means for transmitting selected reproductions from said plate to said sheet, means embodied in said last named means for effecting a selection between the fonts of characters and between the individual characters for such transmission; said machine adapted to be automatically electrically actuated by a coded member fed thereto and for this purpose embodying a code reader and means appropriately operatively connecting said reader to the font selecting mechanism and the individual character selecting mechanism; means for successively effecting the reading of individual code signals from said coded member, a time delay relay actuated by said last named means and connected in a circuit controlling said code reader for preventing the reading of a succeeding code for a predetermined period of time, said delay being sufficient to enable font selection procedures to be effected but not sufficient for character selection; and further electrical circuitry effective upon the reading of a character selecting code on said coded member for establishing a longer delay before the reading of the next code.

46. In a system of the class described, a machine for effecting type composition comprising, in combination, a supporting frame, a master character plate containing a plurality of fonts of characters thereon, the characters in each font arranged in separate series of upper and lower case representations; means for supporting a sheet for progressive movement along said frame to successively receive selected character reproductions from said master plate; means for transmitting selected reproductions from said plate to said sheet, means embodied in said last named means for effecting a selection between upper and lower case characters, between the fonts of characters, and between the individual characters for such transmission; said machine adapted to be automatically electrically actuated by a coded member fed thereto and for this purpose embodying a code reader and means appropriately operatively connecting said reader to the case selecting mechanism, the font selecting mechanism, and the individual character selecting mechanism; means for successively effecting the reading of the individual code signals from said coded member, a time delay relay actuated by said last named means and connected in a circuit controlling said code reader for preventing the reading of a succeeding code for a predetermined period of time, said delay being sufficient to enable case or font selection procedures to be effected but not sufficient for character selection; and further electrical circuitry effective upon the reading of a character code on said coded member for establishing a longer delay before the reading of the next code.

47. In a system of the class described, a machine for effecting type composition comprising, in combination, a supporting frame, a master character plate containing a plurality of fonts of characters thereon, the characters in each font arranged in separate series of upper and lower case representations; means for supporting a sheet for progressive movement along said frame to successively receive selected character reproductions from said master plate; means for transmitting selected reproductions from said plate to said sheet, means embodied in said last named means for effecting a selection between upper and lower case characters, between the fonts of characters, and between the individual characters for such transmission; said machine adapted to be automatically electrically actuated by a coded member fed thereto and for this purpose embodying a code reader and means appropriately operatively connecting said reader to the case selecting mechanism, the font selecting mechanism, and the individual character selecting mechanism; escapement mechanism for said sheet supporting means; means for successively effecting the reading of the individual code signals from said coded member, a time delay relay actuated by said last named means and connected in a circuit controlling said code reader for preventing the reading of a succeeding code for a predetermined period of time, said delay being sufficient to enable case or font selection procedures to be effected but not sufficient for character selection nor for the actuation of the escapement mechanism for said sheet supporting means; and further electrical circuitry effective upon the reading of a character code on said coded member for establishing a longer delay before the reading of the next code.

48. In a system of the class described, a machine for effecting type composition comprising, in combination, a supporting frame, a master character plate containing a font of characters, means for moving the plate and for stopping it at various points for the selection of successive individual characters therefrom; a carriage for supporting a sheet for progressive escapement movement along said frame to successively receive selected character images from said master plate, means for transmitting said selected images from said plate to said sheet; means for initiating the transmission of a character image by said transmitting means; variable escapement mechanism for said carriage, selector means for setting up an appropriate escapement value in said escapement means for the character which is to be transmitted; a unitary cyclic operation-controlling device, means actuated by said transmission initiating means for initiating the movement of said cyclic device and for effecting the appropriate movement of said plate to said stopping point to present the selected character for transmission; means actuated by said cyclic device (a) for effecting the appropriate movement of the carriage according to the escapement value already set up, (b) for effectuating said image transmitting means, and (c) for clearing said variable escapement mechanism for a subsequent cycle of operation for a succeeding character.

49. In a system of the class described, a machine for effecting type composition comprising, in combination, a supporting frame, a master character plate containing a font of characters, means for moving the plate for the selection of successive individual characters therefrom; a carriage for supporting a sheet for progressive escapement movement along said frame to successively receive selected character images from said master plate, means for transmitting said selected images from said plate to said sheet; means for initiating the transmission of a character image by said transmitting means; variable escapement mechanism for said carriage, selector means for setting up an appropriate escapement value in said escapement means for the character to be transmitted; a cyclic operation-controlling device movable through two phases during each cycle involved in the selection and transmission of a character, means actuated by said transmission initiating means for effecting the movement of said cyclic device through its first phase only, and for effecting the appropriate movement of said plate to present the selected character for transmission; means actuated by the arrival of said plate at the point of presentation of the selected character for initiating the movement of said cyclic device through its second phase; and means actuated by said cyclic device during its second phase (a) for effecting appropriate movement of the carriage according to the escapement value already set up, (b) for effectuating said image transmitting means, and for (c) clearing said variable escapement mechanism for a subsequent cycle of operation for a succeeding character.

50. In a system of the class described, a machine for effecting type composition comprising, in combination, a supporting frame, a master character plate containing a font of characters, means for moving the plate for the selection of successive individual characters therefrom; a carriage for supporting a sheet for progressive escapement movement along said frame to successively receive selected character images from said master plate, means for transmitting said selected images from said plate to said sheet; means for initiating the transmission of a character image by said transmitting means; variable escapement mechanism for said carriage, selector means for setting up an appropriate escapement value in said escapement means for the character to be transmitted; a cyclic operation-controlling device; said variable escapement means including escapement magnets adapted to be selectively energized to determine the extent of the carriage escapement for the character selected; electric circuitry including said magnets, switches in said circuitry selectively actuatable according to the appropriate escapement values, escapement relays in said magnet circuitry and adapted to be energized simultaneously with said escapement magnets, throw-out switches in the circuitry in series with said relays; certain circuits adapted to be controlled by said relays, including a holding circuit adapted to lock said relays in when actuated, a second holding circuit establishing a delay in the release of said transmission initiating means, and a circuit including means for regulating the operation of said cyclic operatin controlling device; and first means actuated by said cyclic operation-controlling device for cooperating with said regulating means to start and stop its own movement, second means for effecting the escapement of said carriage according to the values set up in the variable escapement means, and third means for actuating said throw-out switches to release the escapement relays and escapement magnets for subsequent actuation for a succeeding character.

51. In a composing apparatus of the class described, in combination, a supporting frame, a type character presenting device adapted to carry a plurality of interchangeable fonts of characters thereon the characters of at least some of said fonts being of a width which is a multiple of those of corresponding characters of other fonts, a carriage movable progressively along said frame and supporting a sheet for the successive reception of character reproductions from said device, means for transmitting such reproductions of selected characters from said device to said sheet, said last named means including means for effecting a selection between the fonts of characters and between individual characters for such transmission; escapement mechanism for effecting variable successive movements of said carriage according to the width of the character selected, and means operatively connected to said font selecting mechanism and automatically actuatable upon a change in said font selecting mechanism to a font of which the character widths are an even multiple of the primary font used, to effect an exact repetition of the escapement movement to effect double escapement.

52. In a composing apparatus of the class described, in combination, a supporting frame, a type character presenting device adapted to carry a plurality of interchangeable fonts of characters thereon in both upper case and lower case representations, the characters of at least some of said fonts being of a width which is a multiple of those of corresponding characters of other fonts, a carriage movable progressively along said frame and supporting a sheet for the successive reception of character reproductions from said device; means for transmitting such reproductions of selected characters from said device to said sheet, said last named means including means for effecting a selection between the fonts of characters, between upper case and lower case representations from each font, and between individual characters for such transmission; escapement mechanism for effecting variable successive movements of said carriage according to the width of the character selected; means operatively connected to said font selecting mechanism and automatically actuatable upon a change in said font selecting mechanism to a font of which the character widths are an even multiple of the primary font used, to effect an exact repetition of the escapment movement to effect double escapement; and changeable gearing between the escapement mechanism and the sheet supporting carriage operable, upon varying the font selection mechanism from a primary font to a secondary font the characters of which vary in fractional ratios, to proportionately change the escapement distances in the same fractional ratio.

53. An automatic photographic composing machine of the class described comprising, in combination, a supporting frame, a master character disc rotatably mounted on said frame and having a plurality of fonts of characters thereon, the characters of each font further arranged in upper case and lower case groupings; a carriage mounted on said frame for progressive movement therealong, a film carried by said carriage for successively receiving reproductions of said characters from said disc; means for rotating said disc for the selection of successive individual characters therefrom for reproduction; an optical system comprising a source of light and means for projecting successive images of selected characters from said disc onto said film, shift means embodied in said last named means and adjustable for selecting characters from different fonts, and similar shift means adjustable for selecting characters from upper case or lower case groups; variable escapement mechanism carried by the frame and operatively connected with the carriage for effecting movements of the latter corresponding to the distances required for the character spacing required; means automatically actuated by said case shift means for setting up a condition in said escapement means appropriate to upper or lower case operation; reader mechanism in said machine for successively sensing the various codes contained in a coded element adapted to be fed to the machine to control its operation as a composing device, means actuating said reader mechanism to successively read the codes on said element; a code translator operated from said reader mechanism for effecting individual character selection from said disc, initiating the actuation of said case shift, and of said font shift; a selector device also operative from said reader mechanism for setting up a condition in said escapement mechanism appropriate to the spacing of the selected character, whether lower case or upper case, means for introducing a relative brief time delay before the next operation of the reader actuating means sufficient for the effectuation of case shift, font shift, or other functional settings but not sufficient for character selection, projection, and escapement; a cyclic operation control device comprising a rotatable member having a series of cams thereon and means for periodically moving said member through a two-phase cycle; means responsive to the character width setting of the escapement means by the selector mechanism for effecting a holding condition for maintaining the escapement setting, similar means for substantially simultaneously effecting a holding condition for establishing a longer time delay before the next code reading operation by said reader mechanism, and similarly responsive means for substantially simultaneously preparing for the initiation of the movement of said cyclic control device for the first phase of its cycle; means interposed between said escapement mechanism and said carriage for actually effecting the mechanical movement of said carriage for the distance ordered by said escapement mechanism; means operatively associated with said rotatable cams on said rotating cyclic device as follows: one for completing the initiation of the movement of said cyclic member for its first phase, in conjunction with said preparing means set up by the escapement mechanism; one for initiating the movement of said cyclic member for its second phase; means cooperating with said last named means and actuatable upon rotation of said disc to the selected character position for completing the actuation of the cyclic means for its second phase; one for actuating the said means for applying the escapement movement to the carriage; at least one for repeating said last named actuation for multiple escapement; one for releasing all settings of the escapement mechanism; and one for initiating the operation of the reader mechanism for reading the next succeeding code prior to the completion of the operations effected by the instant code; a shutter carried by said cyclic control member and adapted to be effective to expose the film to a character projection during the second phase of its cycle; an operative connection between said second escapement actuating means and the font shift means which is effective to cause multiple escapement in cases where the shifted or secondary font involves character widths which are consistently multiples of the widths of the corresponding characters of the companion primary font.

54. An automatic composing machine of the class described comprising, in combination, a supporting frame, a master character disc rotatably mounted on said frame and having a plurality of fonts of characters thereon, the characters of each font further arranged in upper case and lower case groupings; a carriage mounted on said frame for progressive movement therealong; a sheet carried by said carriage for successively receiving reproductions of said characters from said disc; means for rotating said disc for the selection of successive individual characters therefrom for reproduction; means for transferring reproductions of successive characters, from said disc to said sheet, shift means embodied in said last named means and adjustable for selecting characters from different fonts, and similar shift means adjustable for selecting characters from upper case or lower case groups; variable escapement mechanism carried by the frame and operatively connected with the carriage for effecting movements of the latter corresponding to the distances required for the character spacing required; means automatically actuated by said case shift means for setting up a condition in said escapement means appropriate to upper or lower case operation; reader mechanism in said machine for successively sensing the various codes contained in a coded element adapted to be fed to the machine to control its operation as a composing device, means actuating said reader mechanism to successively read the codes on said element; a code translator operated from said reader mechanism for effecting individual character selection from said disc, initiating the actuation of said case shift, and of said font shift; a selector device also operative from said reader mechanism for setting up a condition in said escapement mechanism appropriate to the spacing of the selected character whether lower case or upper case, means for introducing a relative brief time delay before the next operation of the reader actuating means sufficient for the effectuation of case shift, font shift, or other functional settings but not sufficient for character selection, projection, and escapement; a cyclic operation control device having operating elements thereon and means for periodically moving said device through a two-phase cycle; means responsive to the character width setting of the escapement means by the selector mechanism for effecting a holding condition for maintaining the escapement setting, similar means for substantially simultaneously effecting a holding condition for establishing a longer time delay before the next code reading operation by said reader mechanism, and similarly responsive means for substantially simultaneously preparing for the initiation of the movement of said cyclic control device for the first phase of its cycle; means interposed between said escapement mechanism and said carriage for actually effecting the mechanical movement of said carriage for the distance ordered by said escapement mechanism; means operatively associated with said rotating cyclic device as follows: one for completing the initiation of the movement of said cyclic member for its first phase, in conjunction with said preparing means set up by the escapement mechanism; one for initiating the movement of said cyclic member for its second phase; means cooperating with said last named means and actuatable upon rotation of said disc to the selected character position for completing the actuation of the cyclic means for its second phase; one for actuating the said means for applying the escapement movement to the carriage; one for releasing all settings of the escapement mechanism; and one for initiating the operation of the reader mechanism for reading the next suceeding code prior to the completion of the operations effected by the instant code.

55. An automatic composing machine of the class described comprising, in combination, a supporting frame, a master character plate movably mounted on said frame and having a plurality of fonts of characters thereon, the characters of each font further arranged in upper case and lower case groupings; a carriage mounted on said frame for progressive movement therealong; a sheet carried by said carriage for successively receiving reproductions of said characters from said plate; means for moving said plate for the selection of successive individual characters therefrom for reproduction; means for transferring reproductions of successive characters from said plate to said sheet, shift means embodied in said last named means and adjustable for selecting characters from different fonts, and similar shift means adjustable for selecting characters from upper case or lower case groups; variable escapement mechanism carried by the frame and operatively connected with the carriage for effecting movements of the latter corresponding to the distances required for the character spacing required; means automatically actuated by said case shift means for setting up a condition in said escapement means appropriate to upper or lower case operation; reader mechanism in said machine for successively sensing the various codes contained in a coded element adapted to be fed to the machine to control its operation as a composing device, means actuating said reader mechanism to successively read the codes on said element; a code translator operated from said reader mechanism for effecting individual character selection from said plate, initiating the actuation of said case shift, and of said font shift; a selector device also operative from said reader mechanism for setting up a condition in said escapement mechanism appropriate to the spacing of the selected character whether lower case or upper case; means for introducing a relative brief time delay before the next operation of the reader actuating means sufficient for the effectuation of case shift, font shift, or other functional settings but not sufficient for character selection, projection, and escapement; a cyclic operation control device having operating elements thereon and means for periodically moving said device through a two-phase cycle; means responsive to the character width setting of the escapement means by the selector mechanism for effecting a holding condition for maintaining the escapement setting, similar means for substantially simultaneously effecting a holding condition for establishing a longer time delay before the next code reading operation by said reader mechanism, and similarly responsive means for substantially simultaneously preparing for the initiation of the movement of said cyclic control device for the first phase of its cycle; means interposed between said escapement mechanism and said carriage for actually effecting the mechanical movement of said carriage for the distance ordered by said escapement mechanism; means operatively associated with said rotating cyclic device as follows: one for completing the initiation of the movement of said cyclic member for its first phase, in conjunction with said preparing means set up by the escapement mechanism; one for initiating the movement of said cyclic member for its second phase; means cooperating with said last named means and actuatable upon adjustment of said plate to the selected character position for completing the actuation of the cyclic means for its second phase; one for actuating the said means for applying the escapement movement to the carriage; one for releasing all settings of the escapement mechanism; and one for initiating the operation of the reader mechanism for reading the next succeeding code.

56. An automatic composing machine of the class described comprising, in combination, a supporting frame, a master character plate movably mounted on said frame and having a plurality of fonts of characters thereon; a carriage mounted on said frame for progressive movement therealong, a sheet carried by said carriage for successively receiving reproductions of said characters from said plate; means for moving said plate for the selection of successive individual characters therefrom for reproduction; means for transferring reproductions of successive characters from said plate to said sheet, shift means embodied in said last named means and adjustable for selecting characters from different fonts; variable escapement mechanism carried by the frame and operatively connected with the carriage for effecting movements of the latter corresponding to the distances required for the character spacing required; reader mechanism in said machine for successively sensing the various codes contained in a coded element adapted to be fed to the machine to control its operation as a composing device, means actuating said reader mechanism to successively read the codes on said element; a code translator operated from said reader mechanism for effecting individual character selection from said plate and initiating the actuation of said font shift; a selector device also operative from said reader mechanism for setting up a condition in said escapement mechanism appropriate to the spacing of the selected character, means for introducing a relatively brief time delay before the next operation of the reader actuating means sufficient for the effectuation of font shift, or other functional settings but not sufficient for character selection, projection, and escapement; a cyclic operation control device having operating elements thereon and means for periodically moving said device through a two-phase cycle; means responsive to the character width setting of the escapement means by the selector mechanism for effecting a holding condition for maintaining the escapement setting, similar means for substantially simultaneously effecting a holding condition for establishing a longer time delay before the next code reading operation by said reader mechanism, and similarly responsive means for substantially simultaneously preparing for the initiation of the movement of said cyclic control device for the first phase of its cycle; means interposed between said escapement mechanism and said carriage for actually effecting the mechanical movement of said carriage for the distance ordered by said escapement mechanism; means operatively associated with said rotating cyclic device as follows: one for completing the initiation of the movement of said cyclic member for its first phase, in conjunction with said preparing means set up by the escapement mechanism; one for initiating the movement of said cyclic member for its second phase; means cooperating with said last named means and actuatable upon adjustment of said plate to the selected character position for completing the actuation of the cyclic means for its second phase; one for actuating the said means for applying the escapement movement to the carriage; one for releasing all settings of the escapement mechanism; and one for initiating the operation of the reader mechanism for reading the next succeeding code.

57. An automatic composing machine of the class described comprising, in combination, a supporting frame, a master character plate movably mounted on said frame and having a plurality of fonts of characters thereon; a carriage mounted on said frame for progressive movement therealong, a sheet carried by said carriage for successively receiving reproductions of said characters from said plate; means for moving said plate for the selection of successive individual characters therefrom for reproduction; means for transferring reproductions of successive characters from said plate to said sheet, shift means embodied in said last named means and adjustable for selecting characters from different fonts; variable escapement mechanism carried by the frame and operatively connected with the carriage for effecting movements of the latter corresponding to the distances required for the character spacing required; reader mechanism in said machine for successively sensing the various codes contained in a coded element adapted to be fed to the machine to control its operation as a composing device, means actuating said reader mechanism to successively read the codes on said element; a code translator operated from said reader mechanism for effecting individual character selection from said plate and initiating the actuation of said font shift; a selector device also operative from said reader mechanism for setting up a condition in said escapement mechanism appropriate to the spacing of the selected character, means for introducing a relative brief time delay before the next operation of the reader actuating means sufficient for the effectuation of font shift, or other functional settings but not sufficient for character selection, projection, and escapement; a cyclic operation control device having operating elements thereon and means for periodically moving said device through its cycle of operation; means responsive to the character width setting of the escapement means by the selector mechanism for effecting a holding condition for maintaining the escapement setting, similar means for substantially simultaneously effecting a holding condition for establishing a longer time delay before the next code reading operation by said reader mechanism; means interposed between said escapement mechanism and said carriage for actually effecting the mechanical movement of said carriage for the distance ordered by said escapement mechanism; means operatively associated with said rotating cyclic device as follows: one for actuating the said means for applying the escapement movement to the carriage; one for releasing all settings of the escapement mechanism; and one for initiating the operation of the reader mechanism for reading the next succeeding code.

References Cited in the file of this patent

UNITED STATES PATENTS

| 1,149,490 | Bagge | Aug. 10, 1915 |
|---|---|---|
| 1,166,504 | Webster | Jan. 4, 1916 |
| 1,283,394 | Bawtree | Oct. 29, 1918 |
| 1,732,049 | Hunter | Oct. 15, 1929 |
| 1,756,111 | Wisner | Apr. 29, 1930 |
| 2,231,899 | Freund | Feb. 18, 1941 |
| 2,351,126 | Highton | June 13, 1944 |
| 2,377,801 | Mills | June 5, 1945 |
| 2,378,371 | Tholstrup | June 12, 1945 |
| 2,379,862 | Bush | July 10, 1945 |
| 2,388,961 | Elliott | Nov. 13, 1945 |
| 2,419,474 | Wilcox | Apr. 22, 1947 |
| 2,600,168 | Klyce | June 10, 1952 |
| 2,646,733 | Ackerman | July 28, 1953 |
| 2,699,859 | Caldwell | Jan. 18, 1955 |
| 2,714,842 | Hooven | Aug. 9, 1955 |
| 2,714,843 | Hooven | Aug. 9, 1955 |
| 2,790,362 | Higonnet | Apr. 30, 1957 |
| 2,887,936 | Spievak | May 26, 1959 |

FOREIGN PATENTS

| 469,538 | Germany | Dec. 20, 1928 |